US007079936B2

(12) United States Patent
Honda

(10) Patent No.: US 7,079,936 B2
(45) Date of Patent: Jul. 18, 2006

(54) METHOD AND APPARATUS FOR SAMPLING A SENSOR SIGNAL

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/049,969

(22) Filed: Feb. 4, 2005

(65) Prior Publication Data

US 2005/0166665 A1 Aug. 4, 2005

(30) Foreign Application Priority Data

Feb. 4, 2004 (JP) ............................ 2004-028522

(51) Int. Cl.
*F02D 45/00* (2006.01)
*G01L 7/00* (2006.01)

(52) U.S. Cl. ...................... 701/102; 701/114; 73/35.12

(58) Field of Classification Search ................ 701/102, 701/101, 110, 114; 73/35.02, 35.12, 117.3; 123/406.34, 435, 406.37
See application file for complete search history.

(56) References Cited

U.S. PATENT DOCUMENTS 5,738,074 A 4/1998 Nakamura et al. .......... 123/305
5,778,857 A 7/1998 Nakamura et al. ..... 123/406.37

FOREIGN PATENT DOCUMENTS

| | | | | |
|---|---|---|---|---|
| JP | 9-273437 | | | 10/1997 |
| JP | 10-196429 | A | * | 7/1998 |
| JP | 2000-186611 | A | * | 7/2000 |
| JP | 2001-200747 | | | 7/2001 |

* cited by examiner

*Primary Examiner*—Hieu T. Vo
(74) *Attorney, Agent, or Firm*—Nixon & Vanderhye P.C.

(57) ABSTRACT

In an apparatus, a timing signal outputting unit outputs a timing signal every time interval. The time interval is shorter than a pulse time interval of the pulse signal. A first storage unit stores first information relative to each pulse time interval of the pulse signal. A second storage unit samples a value of the sensor signal each time the timing signal is outputted, and stores the sampled values so that the sampled values are associated with pieces of second information, respectively. Each of the pieces of second information is relative to each of sampled timings of the values. A calculating unit calculates a rotation angle of the rotation shaft corresponding to each of the values of the sensor signal based on a relationship between the first information and the pieces of second information.

17 Claims, 29 Drawing Sheets

FIRST MEMORY M1

*FIG. 2A*

ADDRESSES

| NE TIMING | FREE-RUN TIMER VALUE |
|---|---|
| ⋮ | ⋮ |
| 120°CA | ··· |
| 150°CA | ··· |
| 160°CA | ··· |
| 170°CA | 8333 |
| 180°CA | 10000 |
| 190°CA | 11666 |
| 200°CA | 13333 |
| 210°CA | 14333 |
| 220°CA | 16000 |
| 230°CA | 17666 |
| 240°CA | ··· |
| 250°CA | ··· |
| ⋮ | ⋮ |

FIRST MEMORY M1

*FIG. 2B*

ADDRESSES

| NE TIMING | FREE-RUN TIMER INTERVAL |
|---|---|
| ⋮ | ⋮ |
| 120°CA | T110=1667 |
| 150°CA | T120=1666 |
| 160°CA | T150=5000 |
| 170°CA | T160=1666 |
| 180°CA | T170=1667 |
| 190°CA | T180=1666 |
| 200°CA | T190=1666 |
| 210°CA | T200=1000 |
| 220°CA | T210=1667 |
| 230°CA | T220=1666 |
| 240°CA | T230=1666 |
| 250°CA | T240=1667 |
| ⋮ | ⋮ |

FIG. 3

SECOND MEMORY M2

| ANGULAR COUNT VALUE | DIGITAL PRESSURE VALUE |
|---|---|
| ⋮ | ⋮ |
| 200.00°CA | 1024 |
| 201.00°CA | 1027 |
| 202.00°CA | 1030 |
| 203.00°CA | 1033 |
| 204.00°CA | 1036 |
| 205.00°CA | 1039 |
| 210.00°CA | 1042 |
| 211.67°CA | 1047 |
| 213.33°CA | 1052 |
| 215.00°CA | 1057 |
| 216.67°CA | 1062 |
| 218.33°CA | 1067 |
| ⋮ | ⋮ |

ANGULAR COUNT VALUE STORAGE AREA AR1

DIGITAL PRESSURE VALUE STORAGE AREA AR2

FIG. 4

DM

| | NE TIMING | CORRECTION VALUE | | | |
|---|---|---|---|---|---|
| | | #1 | #3 | #4 | #2 |
| #1TDC → | 0°CA | -100 | 100 | 0 | 100 |
| | 10°CA | -98 | 98 | 0 | 98 |
| | 20°CA | -94 | 94 | 0 | 94 |
| | ⋮ | ⋮ | ⋮ | ⋮ | ⋮ |
| #3TDC → | 170°CA | 98 | -98 | 98 | 0 |
| | 180°CA | 100 | -100 | 100 | 0 |
| | 190°CA | 98 | -98 | 98 | 0 |
| | ⋮ | ⋮ | ⋮ | ⋮ | ⋮ |
| #4TDC → | 360°CA | 0 | 100 | -100 | 100 |
| | ⋮ | ⋮ | ⋮ | ⋮ | ⋮ |
| #2TDC → | 540°CA | 100 | 0 | 100 | -100 |
| | ⋮ | ⋮ | ⋮ | ⋮ | ⋮ |
| | 720°CA | -100 | 100 | 0 | 100 |

FIG. 15

M2

| ANGULAR COUNT VALUE | | |
|---|---|---|
| BEFORE CORRECTION | | AFTER CORRECTION |
| 199.00°CA | 0 | 199.00°CA |
| 200.00°CA | 0 | 200.00°CA |
| 201.00°CA | 0 | 201.67°CA |
| 202.00°CA | 0 | 203.33°CA |
| 203.00°CA | 0 | 205.00°CA |
| 204.00°CA | 0 | 206.67°CA |
| 205.00°CA | 0 | 208.33°CA |
| 210.00°CA | 0 | 210.00°CA |
| 211.67°CA | 0 | 210.83°CA |
| 213.33°CA | 0 | 211.67°CA |
| 215.00°CA | 0 | 212.50°CA |
| 216.67°CA | 0 | 213.33°CA |
| 218.33°CA | 0 | 214.17°CA |
| 219.99°CA | 1 | 215.00°CA |
| 219.99°CA | 2 | 215.83°CA |
| 219.99°CA | 3 | 216.67°CA |
| 219.99°CA | 4 | 217.50°CA |
| 219.99°CA | 5 | 218.33°CA |
| 219.99°CA | 6 | 219.17°CA |
| 220.00°CA | 0 | 220.00°CA |
| 221.00°CA | 0 | 221.00°CA |

R1
R2
R2a
R2b
AR2
ΔCT
AR3
ΔCT×(Tb/Ta)
CTde
AR1
J

M2A SECOND MEMORY

| FREE-RUN TIMER VALUE | DIGITAL PRESSURE VALUE |
|---|---|
| ⋮ | ⋮ |
| 43333 | 1024 |
| 43499 | 1027 |
| 43666 | 1030 |
| 43833 | 1033 |
| 43999 | 1036 |
| 44166 | 1039 |
| 44333 | 1042 |
| 44499 | 1047 |
| 44666 | 1052 |
| 44833 | 1057 |
| 44999 | 1062 |
| 45166 | 1067 |
| ⋮ | ⋮ |

FREE-RUN TIMER VALUE STORAGE AREA AR1A

DIGITAL PRESSURE VALUE STORAGE AREA AR2

FIG. 21

FIRST MEMORY M1

| | NE TIMING | FREE-RUN TIMER VALUE |
|---|---|---|
| | ⋮ | ⋮ |
| | 190°CA | 41666 |
| [*1] | 200°CA | 43333 |
| [*2] | 210°CA | 44333 |
| | 220°CA | 46333 |
| | ⋮ | ⋮ |

M1s

| TIME LENGTH PER 1°CA | |
|---|---|
| ⋮ | |
| 166.6μs/°CA | |
| 166.6μs/°CA | |
| 100.0μs/°CA | [*1] |
| 200.0μs/°CA | [*2] |
| ⋮ | |

SECOND MEMORY M2A

| | FREE-RUN TIMER VALUE → | ANGULAR VALUE | DIGITAL PRESSURE VALUE |
|---|---|---|---|
| | ⋮ | ⋮ | ⋮ |
| | 43166 | 199.00°CA | 1021 |
| | 43333 | 200.00°CA | 1024 |
| | 43499 | 201.66°CA | 1027 |
| | 43666 | 203.33°CA | 1030 |
| | 43833 | 205.00°CA | 1033 |
| [*1] | 43999 | 206.66°CA | 1036 |
| | 44166 | 208.33°CA | 1039 |
| | 44333 | 210.00°CA | 1042 |
| | 44499 | 210.83°CA | 1047 |
| | 44666 | 211.67°CA | 1052 |
| | 44833 | 212.50°CA | 1057 |
| | 44999 | 213.33°CA | 1062 |
| | 45166 | 214.17°CA | 1067 |
| | 45333 | 215.00°CA | 1072 |
| | 45499 | 215.83°CA | 1077 |
| [*2] | 45666 | 216.67°CA | 1082 |
| | 45833 | 217.50°CA | 1087 |
| | 46000 | 218.33°CA | 1092 |
| | 46166 | 219.17°CA | 1097 |
| | 46333 | 220.00°CA | 1102 |
| | ⋮ | ⋮ | ⋮ |

AR2

AR1A

FIG. 25

FREE-RUN TIIMER VALUE (FTst) AT BOOT OF TIMING GENERATOR

26666 — Mst 166.667 — TO TIME INTERVAL OF TIMING GENERATOR

SECOND MEMORY M2B

| Q | CALCULATED FREE-RUN TIMER VALUE → | CRANK ANGLE | DIGITAL PRESSURE VALUE |
|---|---|---|---|
| 1 | 26666 | 100°CA | 230 |
| ⋮ | ⋮ | ⋮ | ⋮ |
| 100 | 43166 | 199.00°CA | 1021 |
| 101 | 43333 | 200.00°CA | 1024 |
| 102 | 43499 | 201.66°CA | 1027 |
| 103 | 43666 | 203.33°CA | 1030 |
| 104 | 43833 | 205.00°CA | 1033 |
| 105 | 43999 | 206.66°CA | 1036 |
| 106 | 44166 | 208.33°CA | 1039 |
| 107 | 44333 | 210.00°CA | 1042 |
| 108 | 44499 | 210.83°CA | 1047 |
| 109 | 44666 | 211.67°CA | 1052 |
| 110 | 44833 | 212.50°CA | 1057 |
| 111 | 44999 | 213.33°CA | 1062 |
| 112 | 45166 | 214.17°CA | 1067 |
| 113 | 45333 | 215.00°CA | 1072 |
| 114 | 45499 | 215.83°CA | 1077 |
| 115 | 45666 | 216.67°CA | 1082 |
| 116 | 45833 | 217.50°CA | 1087 |
| 117 | 46000 | 218.33°CA | 1092 |
| 118 | 46166 | 219.17°CA | 1097 |
| 119 | 46333 | 220.00°CA | 1102 |
| ⋮ | ⋮ | ⋮ | ⋮ |

AR2

AR1A AR3

FIG. 28

SECOND MEMORY M2A

| | FREE-RUN TIMER VALUE | DIGITAL PRESSURE VALUE | |
|---|---|---|---|
| | ⋮ | ⋮ | |
| | 43166 | 1021 | |
| | 43333 | 1024 | |
| | 43499 | 1027 | |
| | 43666 | 1030 | |
| | 43833 | 1033 | |
| [*1] | 43999 | 1036 | |
| [*1] | 44166 | 1039 | |
| | 44333 | 1042 | |
| | 44499 | 1047 | |
| | 44666 | 1052 | |
| | 44833 | 1057 | AR2 |
| AR1A | 44999 | 1062 | |
| | 45166 | 1067 | |
| | 45333 | 1072 | |
| | 45499 | 1077 | |
| [*2] | 45666 | 1082 | |
| [*2] | 45833 | 1087 | |
| | 46000 | 1092 | |
| | 46166 | 1097 | |
| | 46333 | 1102 | |
| | ⋮ | ⋮ | |

FIRST MEMORY M1

| NE TIMING | FREE-RUN TIMER VALUE |
|---|---|
| ⋮ | ⋮ |
| 190°CA | 41666 |
| 200°CA | 43333 |
| 210°CA | 44333 |
| 220°CA | 46333 |
| ⋮ | ⋮ |

M4

| | ANGULAR VALUE | FREE-RUN TIMER VALUE | DIGITAL PRESSURE VALUE |
|---|---|---|---|
| | – | – | – |
| | 200°CA | 43333 | 1024.0 |
| | 201°CA | 43433 | 1025.8 |
| | 202°CA | 43533 | 1027.6 |
| | 203°CA | 43633 | 1029.4 |
| | 204°CA | 43733 | 1031.2 |
| | 205°CA | 43833 | 1033.0 |
| | 206°CA | 43933 | 1034.8 |
| [*1] | 207°CA | 44033 | 1036.6 |
| | 208°CA | 44133 | 1038.4 |
| | 209°CA | 44233 | 1040.2 |
| | 210°CA | 44333 | 1042.0 |
| | 211°CA | 44533 | 1048.0 |
| | 212°CA | 44733 | 1054.0 |
| | 213°CA | 44933 | 1060.0 |
| | 214°CA | 45133 | 1066.0 |
| | 215°CA | 45333 | 1072.0 |
| | 216°CA | 45533 | 1078.0 |
| [*2] | 217°CA | 45733 | 1084.0 |
| | 218°CA | 45933 | 1090.0 |
| | 219°CA | 46133 | 1096.0 |
| | 220°CA | 46333 | 1102.0 |
| | ⋮ | ⋮ | ⋮ |

M2D SECOND MEMORY

| FREE-RUN TIMER VALUE | DIGITAL PRESSURE VALUE | | | |
|---|---|---|---|---|
| | #1 | #2 | #3 | #4 |
| ⋮ | ⋮ | ⋮ | ⋮ | ⋮ |
| 44499 | 1047 | 1070 | 200 | 200 |
| 44666 | 1052 | 1066 | 200 | 200 |
| 44833 | 1057 | 1062 | 201 | 200 |
| 44999 | 1062 | 1058 | 201 | 200 |
| 45166 | 1067 | 1054 | 202 | 200 |
| ⋮ | ⋮ | ⋮ | ⋮ | ⋮ |

A/D CONVERSION TIME INTERVAL = 5μs
#1 → 0μs
#2 → 5μs
#3 → 10μs
#4 → 15μs

| FREE-RUN TIMER VALUE | FREE-RUN TIMER VALUE TO BE USED | | | |
|---|---|---|---|---|
| | #1 | #2 | #3 | #4 |
| ⋮ | ⋮ | ⋮ | ⋮ | ⋮ |
| 44499 | 44499 | 44504 | 44509 | 44514 |
| 44666 | 44666 | 44671 | 44676 | 44681 |
| 44833 | 44833 | 44838 | 44843 | 44848 |
| 44999 | 44999 | 45004 | 45009 | 45014 |
| 45166 | 45166 | 45171 | 45176 | 45181 |
| ⋮ | ⋮ | ⋮ | ⋮ | ⋮ |

METHOD AND APPARATUS FOR SAMPLING A SENSOR SIGNAL

CROSS REFERENCE TO RELATED APPLICATION

This application is based on Japanese Patent Application 2004-028522 filed on Feb. 4, 2004 and claims the benefit of priority therefrom, so that the descriptions of which are all incorporated herein by reference.

BACKGROUND OF THE INVENTION

1. Field of the Invention

The present invention relates to a method and an apparatus for sampling a sensor signal, such as a combustion pressure signal, outputted from a sensor, such as a combustion pressure sensor. More particularly, the present invention relates to a combustion pressure signal processing apparatus.

2. Description of the Related Art

An example of conventional engine controls is disclosed in, for example, Japanese Unexamined Patent Publication No. H09-273437. In this publication, combustion pressure sensors, each of which is also called as a combustion-cylinder pressure sensor, are mounted on the cylinder head of an engine to measure pressures in the cylinders of the engine, respectively. Values are sampled from a combustion pressure signal outputted from each combustion pressure sensor at predetermined points in each engine combustion cycle, and the sampled values are converted into digital data values. The digital data values of each cylinder allow calculation of a combustion ratio thereof. The term "combustion ratio" means a ratio of fuel burned while the crankshaft of the engine rotates at a certain crank angle to the fuel burned in each engine combustion cycle. The calculated combustion ratio of each cylinder allows control of an ignition timing and an air-fuel ratio of each cylinder.

The digital data values obtained based on the combustion pressure signal outputted from a combustion pressure sensor can be used for detections of various items of information related to the engine, such as misfire detection, knock detection, intake airflow detection, and discrimination of a cylinder in which the air/fuel mixture is being ignited.

For example, monitoring the rising of the waveform based on the digital data values depending on a crank angle after ignition of the air/fuel mixture in a cylinder allows determination of whether the air/fuel mixture normally ignites in the cylinder or misfire occurs therein. In addition, performing digital filtering of digital data values obtained based on the combustion pressure signal permits determination of whether knocking occurs.

In order to apply the combustion pressure signal to such detections of various items of information related to the engine, it is desirable to increase the sampling rate of the combustion pressure signal so as to allow the digital data values sampled based on the increased sampling rate to trace a wavelength of the combustion pressure signal.

This desire leads to increasing the sampling rate of the combustion pressure signal to allow sampling of the combustion pressure signal every crank angle (CA) of 1 degree. Specifically, the combustion pressure signal can be sampled every rotation of the crankshaft of an engine at 1 degree.

Concerning this point, an example of conventional engine control units each having a function of operating a fuel injection valve and an igniter in synchronization with the rotation of an engine's crankshaft is disclosed in, for example, Japanese Unexamined Patent Publication No. 2001-200747.

The engine control unit disclosed in the publication utilizes a rotation signal, which is also called as a crank signal, outputted from a crankshaft sensor. The rotation signal consists of a train of crank pulses corresponding to angular positions of a crankshaft as it rotates. The pulse cycle of the pulse train corresponds to a predetermined angular interval of the crankshaft rotation, such as a predetermined crank angle (CA) of, for example, 10 degrees.

The engine control unit is operative to multiply the frequency of the rotation signal, thereby generating a multiplication clock signal. For details, the multiplication clock signal consists of a train of clock pulses whose clock cycle is a positive integral submultiple of the pulse cycle of the rotation signal. The engine control unit is also operative to increment an angular counter indicative of the crank angle of the crankshaft every clock cycle of the multiplication clock signal. The engine control unit is further operative to control the engine based on the count value of the angular counter in synchronization with the rotation of the engine's crankshaft (the engine speed). The configuration of the engine control unit makes it possible to grasp the crank angle with a resolution higher than that of the rotation signal.

For generating the multiplication clock signal, the engine control unit has an edge time interval measuring counter configured to measure a time interval between each significant pulse edge of the rotation signal corresponding to each of the predetermined crank angles. The engine control unit also has an edge time storing unit. The edge time storing unit is configured to divide, by a number N of multiplication, each time interval measured by the edge time interval measuring counter in response to when each significant pulse edge appears in the rotation signal, thereby storing therein the divided time intervals. The engine control unit further has a multiplication counter configured to generate pulses as the multiplication clock signal whose pulse cycle corresponds to each of the divided time intervals stored in the edge time storing unit. Specifically, a pulse cycle of the multiplication clock signal ranging from a current significant pulse edge of the rotation signal to a next significant pulse edge thereof is determined based on a current time interval between the current significant pulse edge of the rotation signal and a previous significant pulse edge thereof.

This type of engine control unit determines a guard value for each significant pulse edge of the rotation signal. The guard value represents a value that the angular counter should take at a timing of the next significant pulse edge of each significant pulse edge of the rotation signal. Even if the engine accelerates or decelerates, the engine control unit would accurately determine, based on the guard value, the count value of the angular counter at the timing of the next significant pulse edge of each significant pulse edge of the rotation signal.

An example of the operations of the engine control unit will be explained in FIGS. 33 and 34. In this example, it is assumed that the angular counter is incremented in response to the multiplication clock signal whose frequency is 32 times that of the rotation signal NE, in other words, the number of multiplication of the multiplication clock signal is set to "32". It is also assumed that, as shown in FIG. 33, part of the rotation signal NE is represented as a train of crank pulses Pn−1, Pn, Pn+1. In this assumption, during a current pulse time interval Tn between the temporally adjacent crank pulses Pn+1 and Pn, the angular counter is incremented every time that is one-thirty second ($\frac{1}{32}$) of a previous pulse tine interval Tn−1 between the temporally adjacent crank pulses Pn and Pn−1.

Assuming that the engine speed is constant, the angular counter is incremented at regular time intervals during any pulse interval in the rotation signal. For example, as shown in FIG. 33, when the significant pulse edge of the rotation signal, in other words the leading edge, is generated every crank angle (CA) of 10 degrees, the angular counter is incremented with a resolution of the crank angle (CA) of 0.3125 degree, which corresponds to LSB (Least Significant Bits). This is because the frequency of the multiple clock signal is 32 times that of the rotation signal.

When the engine suddenly accelerates so that a pulse time interval of the rotation signal becomes short, a next significant pulse edge may be generated before the count value of the angular counter is incremented by 32. This may result in that the count value of the angular counter may be shifted to be small from the value of "32". Similarly, when the engine suddenly decelerates so that a pulse time interval of the rotation signal becomes long, the count value of the angular counter may be shifted to be large from the value of "32".

In order to prevent the count value from being shifted from the multiplication value, such as "32", as shown in FIG. 34, the guard value is set every significant pulse edge of the rotation signal. The guard value represents a value that the angular counter should take at a timing of each significant pulse edge of the rotation signal.

When the engine suddenly accelerates during, for example, the current pulse time interval "Tn", the count value of the angular counter is forcibly incremented at the next significant pulse edge (the start tiring of the next pulse time interval "Tn+1") in response to an internal clock signal whose cycle is short from that of the multiplication clock signal. This allows the count value of the angular counter to be reached up to the guard value set at the current significant pulse edge (the start timing of the current pulse time interval Tn).

It is assumed that the engine suddenly decelerates during, for example, the previous pulse time interval "Tn−1". In this assumption, when the count value of the angular counter gets to the guard value set at the previous significant pulse edge (the start timing of the previous pulse time interval "Tn−1"), the increment of the angular counter is forced to be terminated until the next significant pulse edge (the start timing of the current pulse time interval Tn) is generated.

As described above, when sampling values from a combustion pressure signal outputted from a combustion pressure sensor with high sampling rate, for example, every crank angle of 1 degree, it is to be considered to generate the sampling timing of each value based on the count value of the angular counter; the angular counter is incremented in response to the multiple clock signal whose frequency is N times that of the rotation signal. For example, a value is sampled from the combustion pressure signal each time the count value of the angular counter is incremented by a value corresponding to the crank angle of 1 degree so that the sampled values are converted into digital data values. The digital data values are used to control the engine.

SUMMARY OF THE INVENTION

The present invention is made on the background so that preferable embodiments of the present invention aim at improving conventional signal sampling methods and systems, and conventional combustion pressure signal processing apparatuses.

According to an aspect of the present invention, there is provided an apparatus for sampling a sensor signal indicative of physical quantity related to a target based on a pulse signal whose pulse appears each time a rotating shaft rotates at a predetermined angle. The apparatus comprises a timing signal outputting unit outputting a timing signal every time interval. The time interval is shorter than a pulse time interval of the pulse signal. The apparatus also includes a first storage unit configured to store first information relative to the pulse time interval of the pulse signal, and a second storage unit. The second storage unit is configured to sample a value of the sensor signal each time the timing signal is outputted, and store the sampled values so that the sampled values are associated with pieces of second information, respectively. Each of the pieces of second information is relative to each of sampled timings of the values. The apparatus comprises a calculating unit configured to calculate a rotation angle of the rotation shaft corresponding to each of the values of the sensor signal based on a relationship between the first information and the pieces of second information.

According to another aspect of the present invention, there is provided a combustion pressure signal processing apparatus for sampling a combustion pressure signal indicative of combustion pressure in a cylinder of an engine using a pulse signal whose pulse appears each time a crankshaft rotates at a predetermined angle. The apparatus comprises a counter unit having a counter whose count value is indicative of each of the predetermined angles of the crankshaft. The counter unit is configured to calculate a first time interval that is a positive integer submultiple of a second pulse time interval of the pulse signal, and to cause the counter to count every calculated first pulse time interval. The apparatus also comprises a timing signal outputting unit outputting a timing signal every time interval, the time interval being shorter than each pulse time interval of the pulse signal. The apparatus comprises a first storage unit configured to store time information relative to a time interval between each of the predetermined angles of the crankshaft, and a second storage unit. The second storage unit is configured to sample a value of the combustion pressure signal each time the timing signal is outputted, obtain the count values of the counter unit when the values of the combustion pressure signal are sampled by the sampling unit, and store the sampled values so that the sampled values are associated with the corresponding count values of the counter unit, respectively. The apparatus comprises a correcting unit configured to correct each of the count values stored in the second storage unit based on the time information stored in the first storage unit.

According to a further aspect of the present invention, there is provided a combustion pressure signal processing apparatus for sampling a combustion pressure signal indicative of combustion pressure in a cylinder of an engine using a pulse signal whose pulse appears each time a crankshaft rotates at a predetermined angle. The apparatus comprises a timing signal outputting unit outputting a timing signal every time interval. The time interval is shorter than each pulse time interval of the pulse signal. The apparatus comprises a first storage unit configured to store first time information indicative of a temporally distinct tuning when each pulse appears in the pulse signal, and a second storage unit. The second storage unit is configured to sample a value of the combustion pressure signal each time the timing signal is outputted, and store the sampled values so that the sampled values are associated with pieces of second time information, respectively. Each of the pieces of second time information is relative to a sampled timing of each of the sampled values. The apparatus comprises a calculating unit configured to calculate a rotation angle of the crankshaft when each of the values of the combustion pressure signal is sampled by the second storage unit based on the first time information and the pieces of second information.

According to a still further aspect of the present invention, there is provided a combustion pressure signal processing apparatus for sampling a combustion pressure signal indicative of combustion pressure in a cylinder of an engine using a pulse signal whose pulse appears each time a crankshaft rotates at a predetermined angle. The apparatus comprises a timing signal output unit outputting a timing signal every time interval. The time interval is shorter than each pulse time interval of the pulse signal. The apparatus comprises a first storage unit configured to store first time information indicative of a temporally distinct timing when each pulse appears in the pulse signal, and a second storage unit. The second storage unit is configured to sample a value of the combustion pressure signal each time the timing signal is outputted, and store the sampled values. The apparatus comprises a start time storing unit configured to store second time information indicative of a temporally distinct tinning when the timing signal is outputted first from the timing signal outputting unit. The apparatus comprises a time calculating unit configured to calculate third time information indicative of a temporally distinct timing at which each of the timing signals is outputted from the timing signal outputting unit based on the time interval and the second time information. The apparatus comprises a rotation angle calculating unit configured to calculate a rotation angle of the crankshaft based on the first time information and the calculated third time information.

According to a still further aspect of the present invention, there is provided a combustion pressure signal processing apparatus for sampling a combustion pressure signal indicative of combustion pressure in a cylinder of an engine using a pulse signal whose pulse appears each time a crankshaft rotates at a first predetermined angle. The apparatus comprises a counter unit having a counter whose count value is indicative of each of the first predetermined angles of the crankshaft. The counter unit is configured to calculate a time interval that is a positive integer submultiple of a pulse time interval of the pulse signal, and to cause the counter to count every calculated pulse time interval. The apparatus comprises a timing signal outputting unit outputting a timing signal every time interval, the time interval being shorter than each pulse time interval of the pulse signal. The apparatus comprises a first storage unit configured to store time information relative to a time interval between each of the predetermined angles of the crankshaft, and a second storage unit. The second storage unit is configured to sample a value of the combustion pressure signal each time the timing signal is outputted, obtain the count values of the counter unit when the values of the combustion pressure signal are sampled by the sampling unit, and store the sampled values so that the sampled values are associated with the corresponding count values of the counter unit, respectively, The apparatus comprises a calculating unit configured to calculate a value of the combustion pressure signal when the crankshaft rotates at a second predetermined angle based on the sampled values and the count values stored in the second storage unit, and the time information stored in the first storage unit. The second predetermined angle is smaller than the first predetermined angle.

According to a still further aspect of the present invention, there is provided a combustion pressure signal processing apparatus for sampling a combustion pressure signal indicative of combustion pressure in a cylinder of an engine using a pulse signal whose pulse appears each time a crankshaft rotates at a first predetermined angle. The apparatus comprises a timing signal outputting unit outputting a timing signal every tune interval. The time interval is shorter than each pulse time interval of the pulse signal. The apparatus comprises a first storage unit configured to store first time information indicative of a temporally distinct timing when each pulse appears in the pulse signal, and a second storage unit. The second storage unit is configured to sample a value of the combustion pressure signal each time the timing signal is outputted, and store the sampled values so that the sampled values are associated with pieces of second time information, respectively. Each of the pieces of second twine information is relative to a sampled timing of each of the sampled values. The apparatus comprises a calculating unit configured to calculate a value of the combustion pressure signal when the crankshaft rotates at a second predetermined angle based on the sampled values and the pieces of second time information stored in the second storage unit, and the first time information stored in the first storage unit. The second predetermined angle is smaller than the first predetermined angle.

According to a still further aspect of the present invention, there is provided a combustion pressure signal processing apparatus for sampling a combustion pressure signal indicative of combustion pressure in a cylinder of an engine using a pulse signal whose pulse appears each time a crankshaft rotates at a first predetermined angle. The apparatus comprises a timing signal output unit outputting a timing signal every time interval. The time interval is shorter than each pulse time interval of the pulse signal. The apparatus comprises a first storage unit configured to store first time information indicative of a temporally distinct timing when each pulse appears in the pulse signal, and a second storage unit. The second storage unit is configured to sample a value of the combustion pressure signal each time the timing signal is outputted, and store the sampled values. The apparatus comprises a start time storing unit configured to store second time information indicative of a temporally distinct tiring when the timing signal is outputted first from the timing signal outputting unit. The apparatus comprises a time calculating unit configured to calculate third time information indicative of a temporally distinct timing at which each of the timing signals is outputted from the timing signal outputting unit based on the time interval and the second time information. The apparatus comprises a calculating unit configured to calculate a value of the combustion pressure signal when the crankshaft rotates at a second predetermined angle based on the sampled values stored in the second storage unit, the third time information, and the first time information stored in the first storage unit. The second predetermined angle is smaller than the first predetermined angle.

According to a still further aspect of the present invention, there is provided a method of sampling a sensor signal indicative of physical quantity related to a target based on a pulse signal whose pulse appears each time a rotating shaft rotates at a predetermined angle. The method comprises outputting a timing signal every time interval. The time interval is shorter than a pulse time interval of the pulse signal. The method comprises first storing first information relative to the pulse time interval of the pulse signal, and sampling a value of the sensor signal each time the timing signal is outputted. The method comprises secondary storing the sampled values so that the sampled values are associated with pieces of second information, respectively. Each of the pieces of second information is relative to each of sampled timings of the values. The method comprises calculating a rotation angle of the rotation shaft corresponding to each of the values of the sensor signal based on a relationship between the first information and the pieces of the second information.

BRIEF DESCRIPTION OF THE DRAWINGS

Other objects and aspects of the invention will become apparent from the following description of embodiments with reference to the accompanying drawings in which:

FIG. 2A is a view schematically illustrating an example of configuration of a first memory shown in FIG. 1;

FIG. 2B is a view schematically illustrating another example of configuration of a first memory shown in FIG. 1;

FIG. 3 is a view schematically illustrating an example of configuration of a second memory shown in FIG. 1;

FIG. 4 is a view schematically illustrating an example of configuration of a third memory shown in FIG. 1;

FIG. 15 is an explanation view schematically explaining the process executed by the CPU shown in FIG. 14;

FIG. 21 is an explanation view schematically explaining the process executed by the CPU shown in FIG. 20;

FIG. 25 is a view schematically illustrating an example of a configuration of the second memory according to the third embodiment;

FIG. 28 is a view schematically illustrating an example of a configuration of the second memory and that of a fourth memory according to the fourth embodiment;

DETAILED DESCRIPTION OF EMBODIMENTS OF THE INVENTION

Embodiments of the present invention will be described hereinafter with reference to the accompanying drawings. In the embodiments, combustion pressure signal processing apparatuses as examples of apparatuses for sampling a sensor signal are applied to engine control units, respectively. In each of the embodiments, the engine control unit is operative to a four-cylinder engine installed in a vehicle.

First Embodiment

Figure 1:
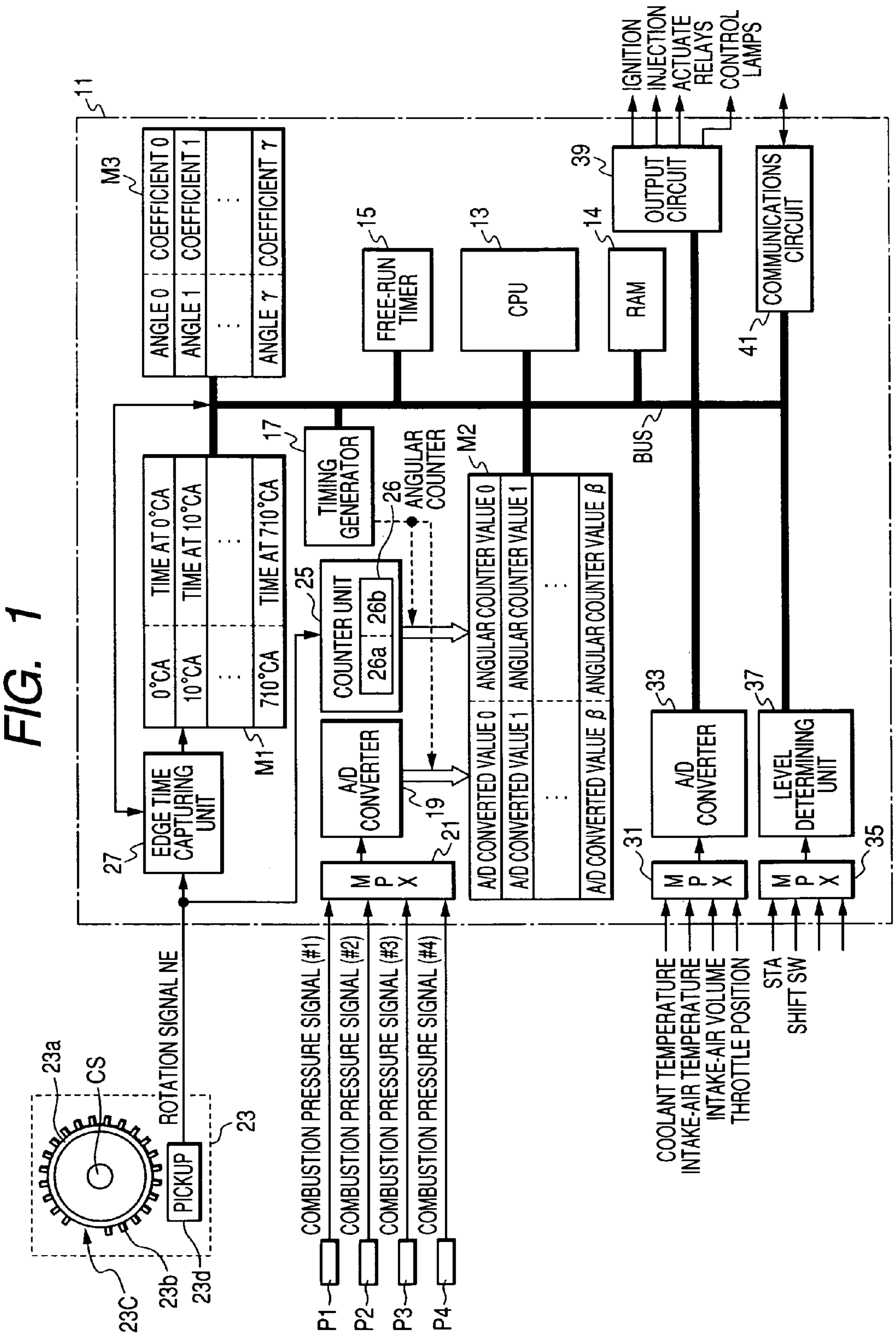
FIG. 1 is a block diagram of an engine control unit according to a first embodiment of the present invention.

As shown in FIG. 1, an engine control unit 11 according to a first embodiment of the present invention is provided with a well-known CPU (Central Processing Unit) 13, and a RAM (random access memory) 14 accessible by the CPU 13. The engine control unit 11 is provided with a free-run timer 15 constantly incrementing (counting up) its free-run timer value in response to, for example, its internal clock whose frequency is set to a constant frequency, such as 1 MHz. The engine control unit 11 is provided with a timing generator 17 operative to output a timing signal every constant time established by the CPU 13, and first to third memories M1 to M3. The CPU 13, the free-run timer 15, the timing generator 17, and the first to third memories M1 to M3 are electrically connected to each other through a bus.

The engine control unit 11 is provided with an analog to digital converter (A/D converter) 19 connected to the CPU 13 through the bus. The A/D converter 19 is operative to sample analog pressure values from each of combustion pressure signals indicative of pressures in cylinders #1 to #4 of a four-cylinder engine (not shown) and outputted from first to fourth combustion pressure sensors P1 to P4, respectively. The A/D converter 19 is operative to convert the sampled analog pressure values into digital data values (A/D converted data values), respectively. Incidentally, the A/D converted data values are also referred to as digital pressure values.

The engine control unit 11 is provided with a multiplexer (MPX) 21 to which the combustion pressure signals of the cylinders #1 to #4 outputted from the sensors P1 to P4 are inputted. The MPX 21 is connected to the CPU 13 through the bus and configured to sequentially select one of the combustion pressure signals, thereby supplying the selected signal to the A/D converter 19.

The engine control unit 11 is provided with a counter unit 25 and an edge time capturing unit 27. A rotation signal NE outputted from a crank sensor (angular sensor) 23 is entered into the counter unit 25 and the edge time capturing unit 27, respectively.

The engine control unit 11 is provided with a multiplexer (MPX) 31 and an A/D converter 33, which are connected to the CPU 13 through the bus. To the MPX 31, various sensor signals, such as a coolant temperature signal, an intake-air temperature signal, an intake-air volume signal, a throttle position signal, and the like are inputted. The MPX 31 is configured to sequentially select one of the inputted sensor signals to supply the selected signal to the A/D converter 33. The A/D converter 33 is operative to sample analog values from each of the inputted sensor signals to convert them into digital data values, respectively.

Similarly, the engine control unit 11 is provided with a multiplexer (MPX) 35 and a level determining unit 37, which are connected to the CPU 13 through the bus. To the MPX 35, various switch signals including a starter switch signal, a shift switch signal indicative of a shift position, and the like are inputted. The MPX 35 is configured to sequentially select one of the inputted switch signals to supply the selected signal to the level determining unit 37. The level determining unit 37 is operative to determine whether each of the inputted switch signals is in a logical high level or a logical low level. The A/D converter 33 and the level determining unit 37 are electrically connected to the CPU 13 thorough the bus.

Specifically, the digital data values of the various sensor signals, which are converted by the A/D converter 33, and the logical levels of the switch signals, which are determined by the level determining unit 37, are captured into the CPU 13 through the bus, respectively.

The engine control unit 11 is provided with an output circuit 39 electrically connected through the bus to the CPU 13. The output circuit 39 is connected to various actuators, such as ignites, fuel injection valve actuators, relays, and lamp actuators and configured to drive the various actuators, respectively, based on instructions sent from the CPU 13.

The engine control unit 11 is provided with a communications circuit 41 electrically connected through the bus to the CPU 13 to allows communications between the CPU 13 and other units, such as, other control units, for example, installed in the vehicle.

As shown in FIG. 1, the crankshaft sensor 23 preferably has a reluctor disc 23*a* having a plurality of teeth 23*b* spaced at angle intervals of, for example, 10 degrees around the periphery of the disc 23*a*. The reluctor disc 23*a* is mounted on a crankshaft CS of the engine. The reluctor disc 23*a* has, for example, a tooth missing portion 23*c* composed of, for example, two adjacent teeth missing. The tooth missing portion 23*c* corresponds to a reference position of the rotational position of the crankshaft CS. The crankshaft sensor 23 preferably has a pickup 23*d* operative to magnetically detect the teeth 23*b* of the reluctor disc 23*a* on the crankshaft CS as it rotates to generate the rotation signal NE based on the detected result.

Figure 7:
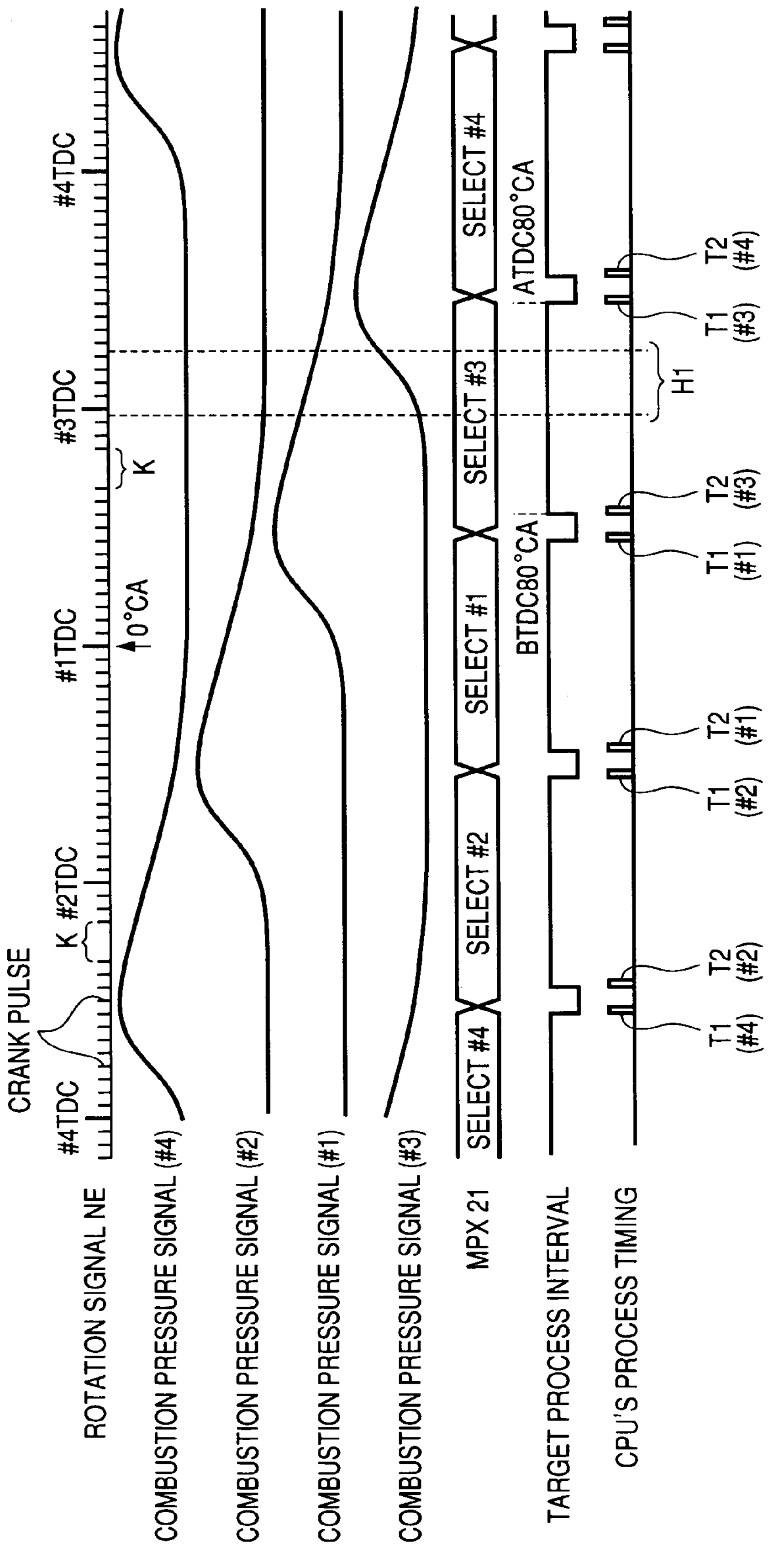
FIG. 7 is a time chart schematically illustrating process timings of a CPU shown in FIG. 1 with combustion pressure signals according to the first embodiment.
Figure 16:
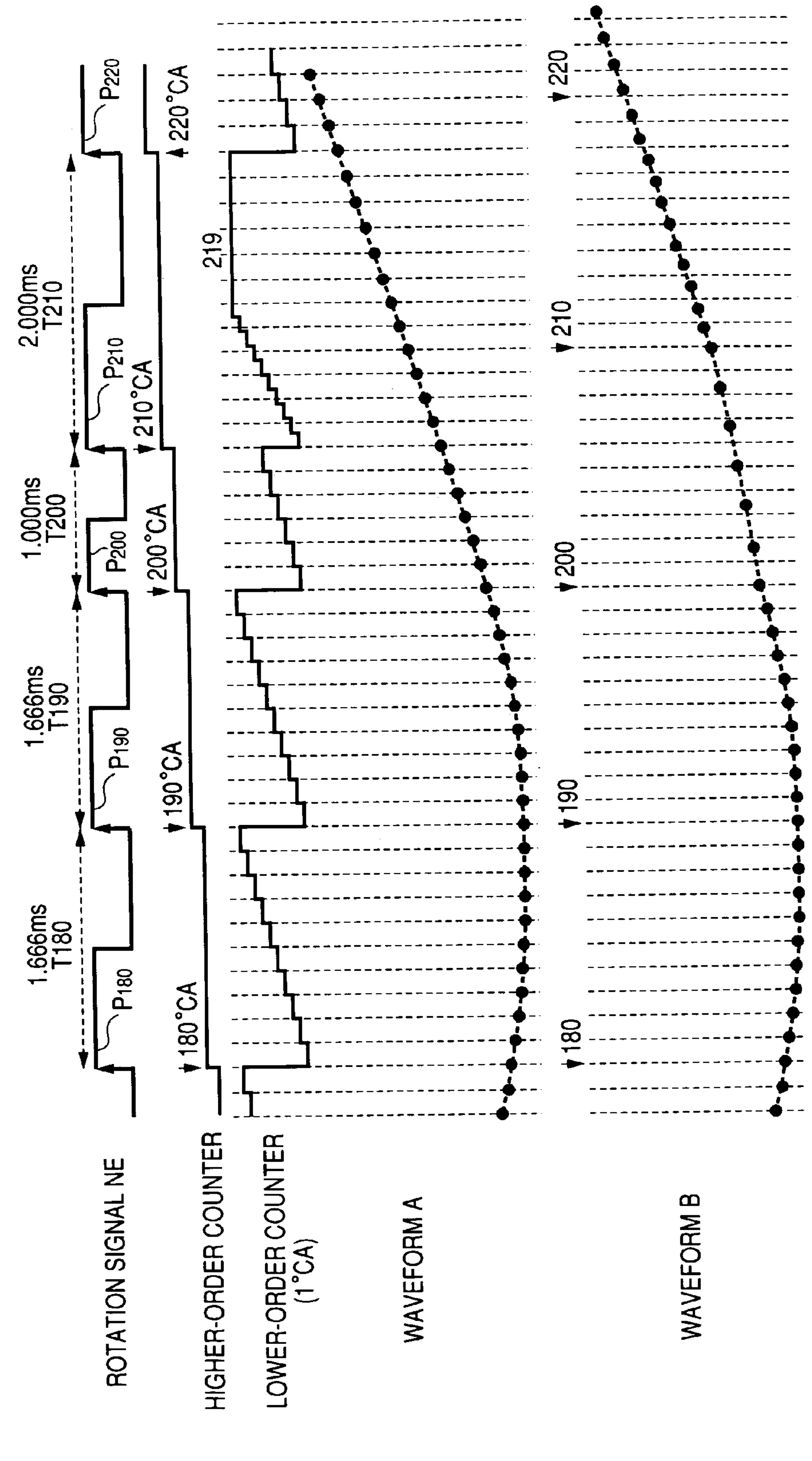
FIG. 16 is a time chart schematically illustrating an example of operations of the engine unit shown in FIG. 1.

For details, as shown in FIGS. 7 and 16, the rotation signal NE outputted from the crankshaft sensor 23 consists of a train of crank pulses. Each leading edge of each crank pulse appears each time the crankshaft CS rotates at a predetermined angle (crank angle) of, for example, 10 degrees during a first period for which the rotational position of the crankshaft CS does not reach the reference position. Incidentally, each leading edge of each crank pulse corresponds to each significant edge thereof. In other words, the crank pulses are spaced at time intervals each corresponding to the crank angle of 10 degrees during the first period for which the rotational position of the crankshaft CS does not reach the reference position.

The rotation signal NE is also composed of a pulse-missing portion K. The pulse-missing portion K corresponds to the tooth missing portion 23*c* of the crankshaft sensor 23 in which a predetermined number M of crank pulses, for example two, are skipped in the train of the crank pulses during a second period for which the rotational position of the crankshaft CS reaches the reference position. That is, the pulse time interval between the leading edges of temporally adjacent crank pulses during the second period corresponds to the crank angle of 30 degrees. The pulse-missing portion K appears twice (the crank angle of 720 degrees).

The edge time capturing unit 27 is electrically connected through the bus to the free-run timer 15. The edge time capturing unit 27 is operative to store and update therein the free-run timer value of the free-run timer 15 each time one of the leading edges of the crank pulses appears in the rotation signal NE. In the first embodiment, as described above, the clock frequency of the free-run timer 15 is set to, for example, 1 MHz, so that the free-run timer value of the free-run timer 15 is represented in microseconds.

The counter unit 25 has the following function modules (a) to (c).

The functional module (a) measures the pulse time interval between each leading edge of each pulse of the rotation signal NE. Subsequently, when a currently measured pulse time interval is equal to or larger than a predetermined length of time that is obtained by multiplying a previous measured pulse time interval by a predetermined determining ratio, such as 3, the functional module (a) determines that the currently measured pulse time interval corresponds to the pulse missing portion K This functional module (a) is also called as "pulse missing portion determining functional module".

The functional module (b) divides, by a number N of multiplication, each pulse time interval (the crank angle of 10 degrees) in response to when each significant pulse edge appears in the rotation signal NE in cases where the functional module (a) does not determine that the currently measured pulse time interval corresponds to the pulse missing portion K. Specifically, the functional module (b) calculates time intervals each corresponding to the rotation of the crankshaft CS at "10° (CA)/N", where N represents the number N of multiplication, and "10° (degrees) (CA)" represents the crank angle of 10 degrees. The functional module (b) generates multiplication clock pulses as the multiplication clock signal whose pulse cycle corresponds to each of the divided pulse time intervals.

However, in cases where the functional module (a) determines that the currently measured pulse time interval corresponds to the pulse missing portion K, the functional module (b) divides, by the product of the number N of multiplication and the predetermined determining ratio (3), the pulse time interval corresponding to the pulse missing portion K. After the dividing process, the functional module (b) generates a multiplication clock pulse of the multiplication clock signal whose pulse cycle corresponds to the divided pulse time interval. This is because the pulse time interval of the rotation signal NE during each pulse missing portion K is three times each pulse time interval thereof except during each pulse missing portion K.

The functional module (c) increments an angular counter 26 installed in the counter unit 25 every pulse cycle of the multiplication clock signal generated by the functional module (b).

To describe the configuration of the angular counter 26 in more detail, the angular counter 26 is designed so that its count value represents the crank angle of the crankshaft CS during each combustion cycle (four-stroke cycle) of the engine. Specifically, the angular counter 26 is incremented to wrap around zero every engine combustion cycle corresponding to every crank angle of 720 degrees. Incidentally, in the first embodiment, when the piston is at the top dead center (TDC) of the cylinder #1 in each compression stroke of the engine, this timing is established to the crank angle of 0 degrees dung each combustion cycle of the engine (see the top in FIG. 7). The count value of the angular counter 26 is set to "0" at the tiring of the crank angle of 0 degrees.

In the first embodiment, the angular counter 26, as shown in the second from the top in FIG. 16, is composed of a higher-order counter 26*a* corresponding to higher-order bits thereof. The LSB of the higher-order counter 26*a* corresponds to a resolution of the crank angle (CA) of 10 degrees. The angular counter 10, as shown in the third from the top in FIG. 16, is composed of a lower-order counter 26*b* corresponding to lower-order bits thereof, which are lower than the higher-order bits. The LSB of the lower-order counter 26*b* corresponds to a resolution of the "10 degrees (CA)/N". For example, the higher-order counter 26*a* and the lower-order counter 26*b* are 8-bit counter, respectively, so that the angular counter 26 serves as "16 (=8+8)"-bit counter.

In the first embodiment, the number N of multiplication is set to $2^n$ (n is a positive integer), and the number of bits of the lower-order counter 26*b* is n. In FIG. 16, to give a high priority to viewability, the number N of multiplication is set to "10" so that the LSB of the lower-order counter 26*b* is 1 degree (CA).

The higher-order counter 26*a* is incremented in response to each leading edge of the rotation signal NE, and the lower-order counter 26*b* is configured to count up by 1 in synchronization with the clock cycle of the multiplication clock signal. That is, the lower-order counter 26*b* is configured to be incremented by 1 in response to each leading edge of the multiplication clock signal. The lower-order counter 26*b* is configured to be cleared in synchronization with the pulse cycle of the rotation signal NE. That is, the lower-order counter 26*b* is cleared in response to each leading edge of the rotation signal NE. In other words, the lower-order counter 26*b* is configured so that the count value of the lower-order counter 26*b* is initialized back to zero in response to each leading edge of the rotation signal NE.

Wrap around operations (overflow operations) of the lower-order counter 26*b* are prevented while the functional module (a) does not determine that the currently measured pulse time interval corresponds to the pulse missing portion K. This prevention of the wrap around operations results in that, when the count value of the lower-order counter 26*b* reaches the maximum value of "$2^n-1$" corresponding to all bits of "1" of the lower-order counter 26*b*, the count value of the lower-order counter 26*b* is stopped (guarded) to the maximum value of "$2^n-1$".

In contrast, the lower-order counter 26*b* is configured to wrap around (overflow) by the crank-pulse skipped number of M (=2 in the first embodiment) during the pulse missing portion K of the rotation signal NE corresponding to 30 degrees (CA). This allows the higher-order counter 26*a* to be incremented by 1 each time the lower-order counter 26*b* wraps around so that the count value thereof returns to "0" and the carry is generated. This permits the count value of the higher-order counter 26*a* to advance by up to the sum of the crank-pulse skipped number of M (=2) and 1, that is "M+1 (=3)" during the pulse-missing portion K in the rotation signal NE.

For example, as shown in FIG. 16, it is assumed that part of the rotation signal NE is represented as a train of crank pulses P180, P190, P200, P210, P220. It is also assumed that a pulse time interval between the leading edges of the temporally adjacent crank pulses P180 and P190 is represented as T180, and a pulse time interval between the leading edges of the temporally adjacent crank pulses P190 and P200 is represented as T190. The pulse time interval T180 corresponds to the period between 180 degrees (CA) and 190 degrees (CA), and the pulse time interval T190 corresponds to the period between 190 degrees (CA) and 200 degrees (CA). Furthermore, it is assumed that a pulse time interval between the leading edges of the temporally adjacent crank pulses P200 and P210 is represented as T200, and a pulse time interval between the leading edges of the temporally adjacent crank pulses P210 and P220 is represented as T210. The pulse time interval T200 corresponds to the period between 200 degrees (CA) and 210 degrees (CA), and the pulse time interval T210 corresponds to the period between 210 degrees (CA) and 220 degrees (CA).

In a case where the engine suddenly accelerates during the pulse time interval T200 of the rotation signal NE in which the count value of the higher-order counter 26*a* is in "200" so that the pulse time interval T200 of the rotation signal becomes short. In this case, however, the count value of the angular counter 26 is forcibly set to a correct value, such as "210" in response to the leading edge of the next crank pulse P210 corresponding to the end timing of the pulse interval T200. The correct value "210" of the count value of the angular counter 26 represents a value that the angular counter 26 should take at the timing of the leading edge of the next crank pulse P210 corresponding to the end timing of the pulse interval T200

Similarly, in a case where the engine suddenly decelerates during the pulse time interval T210 of the rotation signal NE in which the count value of the higher-order counter 26*a* is in "210" so that the pulse time interval T210 of the rotation signal becomes long. In this case, however, the count value of the angular counter 26 is stopped to a correct value "219" in response to the leading edge of the next crank pulse P220. The leasing edge of the next crank pulse P220 corresponds to the end tuning of the pulse time interval T210. The correct value "219" of the count value of the angular counter 26 represents a value one count-timing before the value that the angular counter 26 should take at the timing of the leading edge of the next crank pulse P220 corresponding to the end timing of the pulse interval T210. After that, when the leading edge of the next crank pulse P220 appears in the rotation signal NE, the count value of the angular counter 26 is set to the value that the angular counter 26 should take at the timing of the leading edge of the next crank pulse P220.

Incidentally, U.S. patent application, which is filed on Oct. 29, 2004 by the same applicant as this application and is correspondent to Japanese Patent Application 2003-369365, whose serial U.S. patent application number is not assigned yet at the present time, describes the counting operations of the angular counter in detail as counting operations of a crank counter. Therefore, the disclosure of the U.S. patent application is incorporated totally herein by reference.

As shown in FIG. 2A, sequential addresses are set to an address space, which is referred to as "NE TIMING", in the first memory M1. The addresses identify locations in the first memory M1. Each of the sequential addresses represents each of the crank angles (CA) which corresponds to each leading edge in the rotation signal NE during at least one engine combustion cycle corresponding to 0 degrees (CA) to 720 degrees (CA). Incidentally, the crank angles (CA) are also referred to as "NE timing crank angles" hereinafter.

In synchronization with each leading edge that appears in the rotation signal NE, each free-run timer value corresponding to each count value of the higher-order counter 26*a*, which represents each crank angle corresponding to each leading edge, is transferred from the edge time capturing unit 27 to be stored in each corresponding address in the first memory M1.

Specifically, calculation of a difference between both of the free-run timer values stored in adjacent addresses in the first memory M1 allows a pulse time interval of the rotation signal NE between the crank angles (CA) corresponding to the adjacent addresses in the first memory M1 to be obtained. The free-run timer value, which is stored in each address in the first memory M1 each time one of the leading edges appears in the rotation signal NE, identifies time information indicative of a time interval between each crank angle corresponding to each leading edge in the rotation signal NE.

The top address in the first memory M1 corresponds to the 0 degrees (CA) when the count value of the angular counter 26 reaches to "0".

The address next to the address "120° (CA) is set to "150° (CA)" because, in the first embodiment, the pulse time interval of the rotation signal NE between the 120° (CA) and the 150° (CA) corresponds to the pulse missing portion K.

In addition, as shown in FIG. 3, the court value of the angular counter 26 and the A/D converted data value (digital pressure value) corresponding to the sampled value of the combustion pressure signal are stored to be associated to each other in the second memory M2 each time the timing signal is generated from the timing generator 17. The count value of the angular counter 26 is referred to as "angular count value" hereinafter.

Specifically, the angular count values of the angular counter 26 and the digital pressure values corresponding to the combustion pressure signal are stored in the second memory M2 so that it is possible to identify which angular count values correspond to which digital pressure values.

How to store the angular count values of the angular counter 26 and the digital pressure values in the second memory M2 is described, for example, as follows. In the second memory M2, an angular count value storage area AR1 and a digital pressure value storage area AR2 are prepared.

The angular count values and the digital pressure values, which correspond to each other, are sequentially stored at locations in the storage area A1 and those in the storage area N2, respectively. The first angular count value is stored in one of the locations in the first storage area A1 to which a top address is assigned. The remaining angular count values are stored at the remaining locations in the storage area A1, respectively. To the remaining locations, relative addresses each indicative of an offset value with respect to the top address are assigned, respectively.

Similarly, the first digital pressure value corresponding to the first angular count value is stored in one of the locations in the second storage area A2 to which a top address is assigned. The remaining digital pressure values are stored at the remaining locations in the storage area A2, respectively. To the remaining locations, relative addresses each indicative of an offset value with respect to the top address are assigned, respectively.

This allows a relative address of one of the angular count values from the top address in the first storage area A1 to coincide with that of a corresponding one of the digital pressure values from the top address in the second storage area A2. Linking the top address in the first storage area A1 and that of the second storage area A2 thereof makes it possible to associate the angular count values stored in the first storage area A1 with the digital pressure values stored in the second storage area A2, respectively.

In addition, as shown in FIG. 4, a data map DM is stored. In the data map DM, control coefficients to be used for engine control are stored every 10° (CA) between 0° (CA) and 720° (CA) corresponding to at least one engine combustion cycle, respectively. In the first embodiment, as the control coefficients, digital correction values to correct the digital pressure values corresponding to the combustion pressure signal are stored in the data map DM so that they are associated with the corresponding crank angles 0° (CA), 10° (CA), . . . , 720° (CA) in steps of 10° (CA), respectively (see the field "NE TIMING" in the data map DM in FIG. 4).

For example, in the four stroke cycle of the engine, it is assumed that the intake air in each cylinder of the engine is hermetically kept therein. In this assumption, even if combustion and expansion of the air-fuel mire in each cylinder do not take place by ignition of the air-fuel mixture therein, the pressure in each cylinder varies depending on the change in the crank angle, in other words, the upward and downward strokes of the piston therein (see the waveform Wp in FIG. 5).

Figure 5:
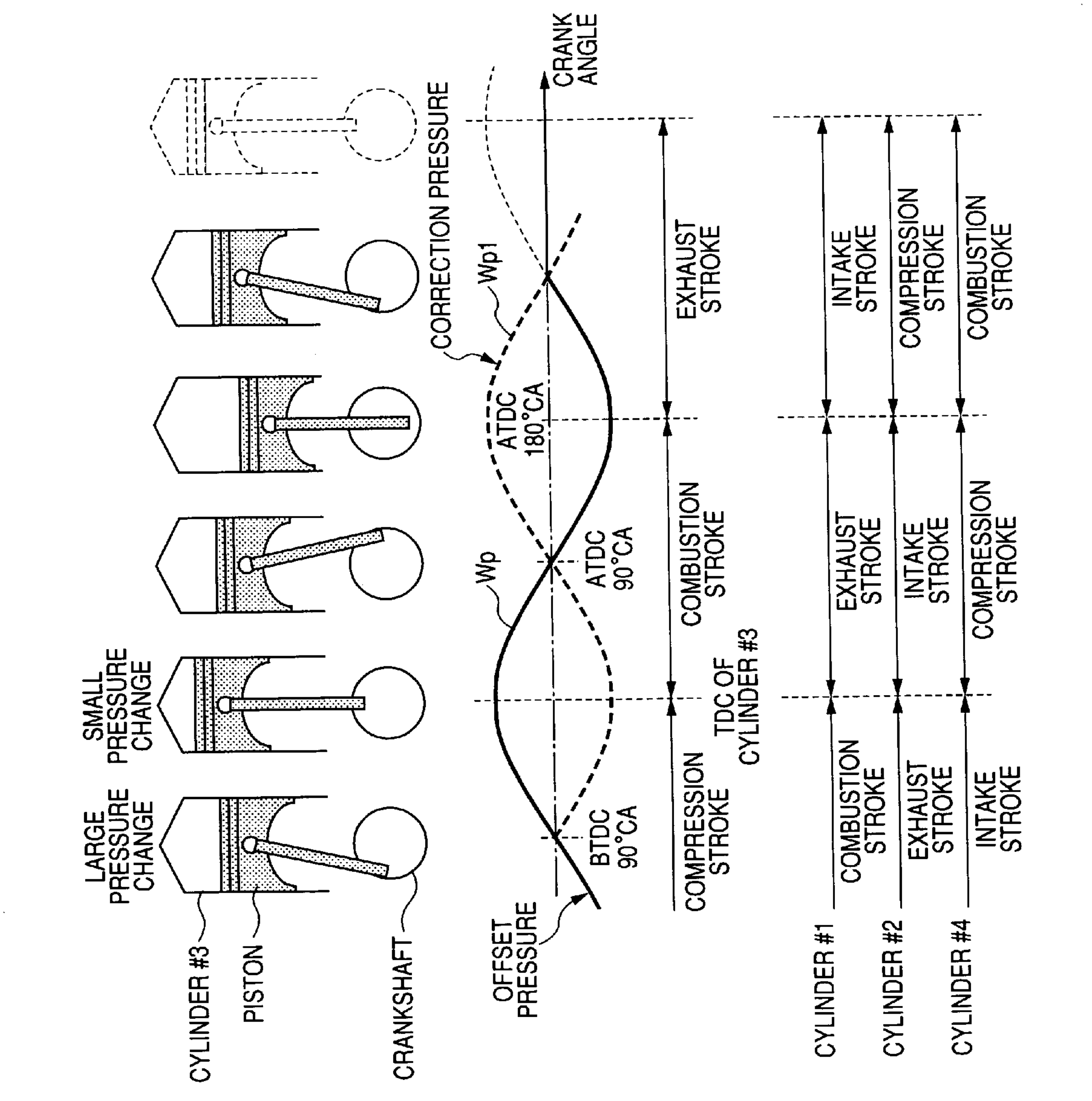
FIG. 5 is a view schematically illustrating the change of a pressure in a cylinder due to the strokes of a piston according to the first embodiment.
Figure 6:
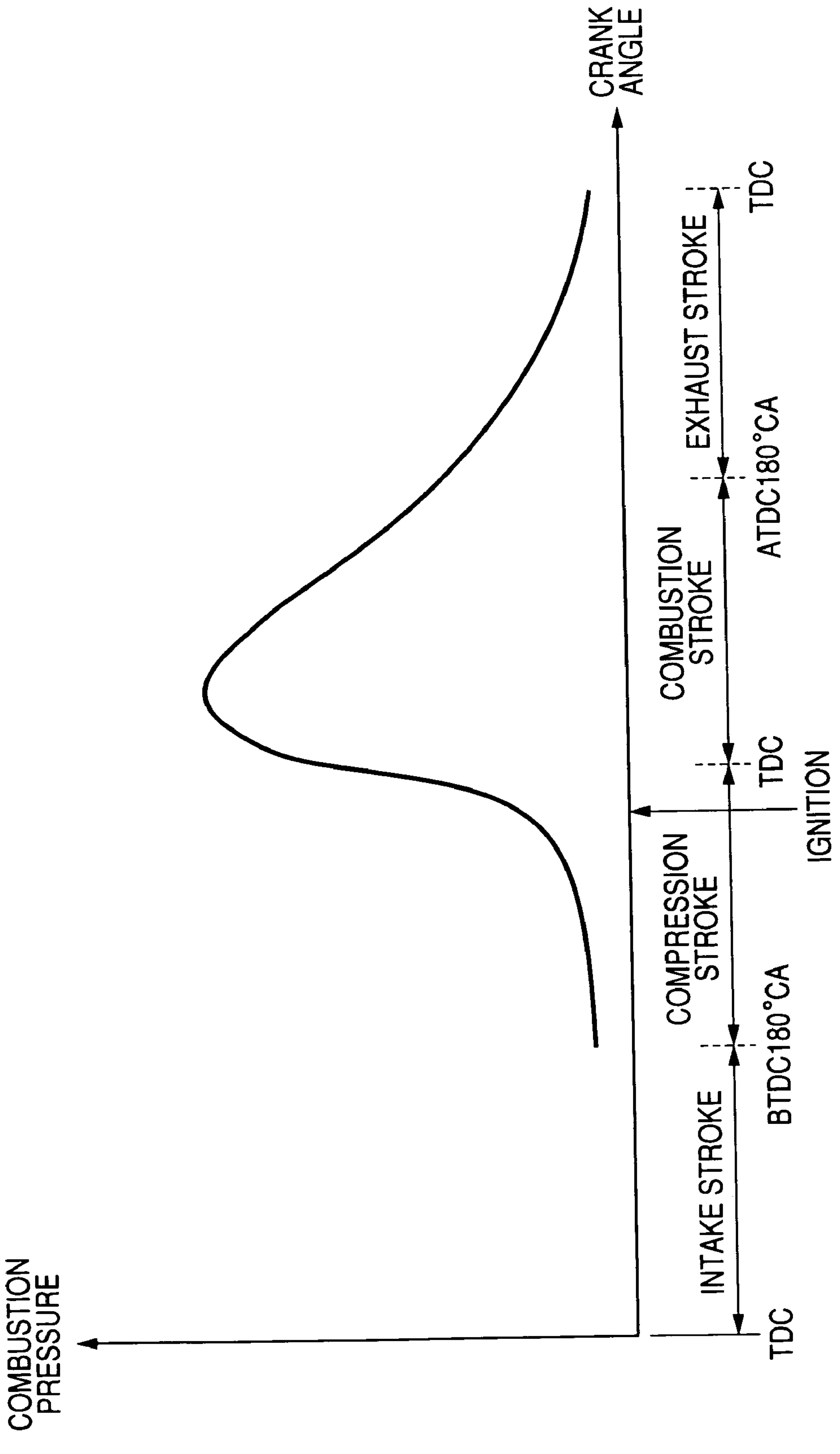
FIG. 6 is a view illustrating an example of the waveform of a combustion pressure signal according to the first embodiment.

The combustion pressure signal outputted from each of the combustion pressure sensors P1 to P4 represents the waveform shown in FIG. 6; the analog pressure values of the combustion pressure signal depend on the pressure variation due to the strokes of the piston shown in FIG. 5. Incidentally, in FIG. 5, as a typical example, the analog pressure values of the combustion pressure signal corresponding to the cylinder #3 is illustrated; the analog pressure values depend on the pressure variation caused by the piston strokes.

In order to obtain correct digital pressure values depending on only ignition control from the combustion pressure signal, it is necessary to correct the digital pressure values converted from the analog pressure values of the combustion pressure signal to cancel the pressure components varying like the waveform Wp shown in FIG. 5 as an offset pressure.

Specifically, as shown in FIG. 5, digital correction pressure values (correction pressure) whose waveform Wp1 varies in the opposite curve of the waveform Wp of the offset pressure depending on the change in the crank angle are stored for each of the cylinders #1 to #4. Adding the correction pressure values corresponding to each of the cylinders #1 to #4 to the digital pressure values corresponding to the combustion pressure signal sensed from each of the cylinders #1 to #4 allows the correction pressure values in each of the cylinders #1 to #4 depending on only the ignition control to be obtained.

In FIGS. 5 and 6, the term "BTDC 90° (CA)" represents a crank angle temporally before the TDC by 90° (CA), and "ATDC 180° (CA)" represents a crank angle temporally after the TDC by 180° (CA).

As shown in FIG. 5, each of the four strokes in the cylinder #1 is shifted by 180° (CA) before each of the four strokes in the cylinder #3 so that the TDC of the cylinder #1 is shifted by 180° (CA) before the TDC of the cylinder #3. As shown in FIG. 4, each of the correction pressure values for the cylinder #3 corresponding to the range from 180° (CA) to 720° (CA) therefore coincides with each of the correction pressure values for the cylinder #1 corresponding to the range from 0° (CA) to 540° (CA). Similarly, each of the correction pressure values for the cylinder #3 corresponding to the range from 0° (CA) to 180° (CA) therefore coincides with each of the correction pressure values for the cylinder #1 corresponding to the range from 540° (CA) to 720° (CA).

Each of the four strokes in the cylinder #2 is shifted by 360° (CA) after each of the four strokes in the cylinder #3 so that the TDC of the cylinder #2 is shifted by 360° (CA) next to the TDC of the cylinder #3. As shown in FIG. 4, each of the correction pressure values for the cylinder #3 corresponding to the range from 180° (CA) to 360° (CA) therefore coincides with each of the correction pressure values for the cylinder #2 corresponding to the range from 540° (CA) to 720° (CA). Similarly, each of the correction pressure values for the cylinder #3 corresponding to the range from 0° (CA) to 180° (CA) therefore coincides with each of the correction pressure values for the cylinder #2 corresponding to the range from 360° (CA) to 540° (CA).

Each of the four strokes in the cylinder #4 is shifted by 180° (CA) after each of the four strokes in the cylinder #3 so that the TDC of the cylinder #4 is shifted by 180° (CA) next the TDC of the cylinder #3. As shown in FIG. 4, each of the correction pressure values for the cylinder #3 corresponding to the range between 180° (CA) and 540° (CA) therefore coincides with each of the correction pressure values for the cylinder #4 corresponding to the range between 360° (CA) and 720° (CA). Similarly, each of the correction pressure values for the cylinder #3 corresponding to the range between 0° (CA) and 180° (CA) therefore coincides with each of the correction pressure values for the cylinder #4 corresponding to the range between 180° (CA) and 360° (CA).

The 720° (CA) in the field of "NET TIMING" in the data map DM is identical with the 0° (CA). Incidentally, in place of the digital correction values, as the control coefficients, target pressure values for the combustion pressure sensors P1 to P4 can be stored in the third memory M3, respectively. In addition, the control coefficients can be stored in the third memory M3 every predetermined angle except for the 10° (CA), such as every 5° (CA) or every 20° (CA). In addition, the control coefficients can also be stored in the third memory M3 every different angular interval.

Next, the operations of the CPU 13 of the engine control unit will be described hereinafter.

FIG. 7 is a time chart illustrating the process timings of the CPU 13 and the combustion pressure signals corresponding to the cylinder #1 to #4, which are corrected based on the correction pressure values stored in the data map DM.

Figure 8:
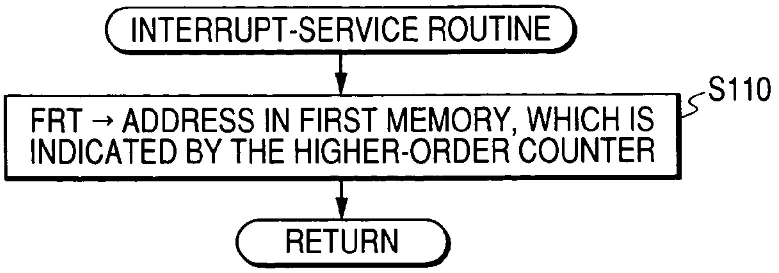
FIG. 8 is a flowchart schematically illustrating an example of a process executed by the CPU according to the first embodiment.

While the CPU 13 performs a main routine related to, for example, the control of the engine, the CPU 13 executes an interrupt-service routine (see FIG. 8) each time one of the leading edges appears in the rotation signal NE (see the top in FIG. 7).

Specifically, the CPU 13 reads out the free-run timer value, which is referred to "FRT", from the edge time capturing unit 27 in synchronization with one of the leading edges in the signal NE. The CPU 13 selects one address (one crank angle) of the addresses in the first memory M1, which corresponds to the count value of the higher-order counter 26*a* at the timing of one of the leading edges. The CPU 13 stores the read FRT in the selected address in the first memory M1 (FIG. 8; step S110), returning to the main routine.

This operation of the CPU 13 allows the free-run timer values corresponding to the leading edges in the rotation signal NE to be sequentially stored in the addresses in the first memory M1, respectively. The addresses in which the free-run timer values are stored correspond to the crank angles corresponding to the leading edges in the rotation signal NE, respectively (see FIG. 2A).

Incidentally, as shown in FIG. 2B, each time one of the leading edges appears in the rotation signal NE, the CPU 13 can subtract the previous free-run timer value stored in the edge time capturing unit 27 at the tiring of the previous leading edge from the current free-run timer value corresponding to the current leading edge. The CPU 13 can store the subtracted value, which corresponds to the pulse time interval between the current leading edge and the previous leading edge, in the address in the first memory M1 associated with the crank angle corresponding to the current leading edge in the rotation signal NE.

As shown in FIG. 7, the CPU 13 detects each timing "ATDC 80° (CA)", which represents the turning after the TDC of each of the cylinders #1 to #4 by 80° (CA), based on the angular count value of the angular counter 26. For example, when the TDC of the first cylinder #1 corresponds to the crank angle of 0 degrees (0° (CA)), the timing "ATDC 80°" of the first cylinder #1 is represented as "T1(#1)", which corresponds to 80° (CA) in FIG. 7. Similarly, the timings "ATDC 80°" of the second to third cylinders #2 to #4 are represented as "T1(#2)", "T1(#3)", and "T1(#4)"in FIG. 7. The T1(#2) corresponds to the crank angle of 620° (CA), the T1(#3) corresponds to the crank angle of 260° (CA), and the T1(#4) corresponds to the crank angle of 440°, respectively.

In response to the detection of each timing "ATDC 80° (CA)" of any one of the cylinders #1 to #4, the CPU 13 causes the MPX 21 to select any one of the combustion pressure signals #1 to #4, which will be ignited next, thereby sending it to the A/D converter 19 so that any one of the combustion pressure signals #1 to #4 is conversed into the digital pressure values.

Subsequently, the CPU 13 detects the timing "BTDC 80° (CA)", which represents the timing before the TDC of any one of the cylinders #1 to #4 by 80° (CA), based on the angular count value of the angular counter 26. For example, the timing "BTDC 80°" of the first cylinder #1 is represented as "T2(#1)" in FIG. 7. Similarly, the timings "BTDC 80° " of the second to third cylinders #2 to #4 are represented as "T2(#2)", "T2(#3)", and "T2(#4)" in FIG. 7.

Figure 9:
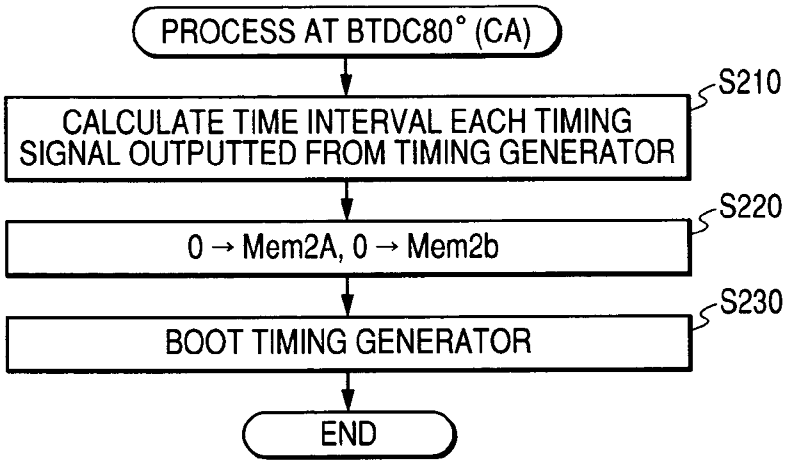
FIG. 9 is a flowchart schematically illustrating an example of a process executed by the CPU according to the first embodiment.

In response to the detection of the timing "BTDC 80° (CA)" of any one of the cylinders X1 to #4, the CPU 13 performs the process shown in FIG. 9.

In step S210, the CPU 13 calculates the time interval between each timing signal outputted from the timing generator 17.

The time interval between each timing signal is established to be a constant time shorter than the pulse time interval of the rotation signal NE at the maximum engine speed. In other words, the time interval between each timing signal is set to be shorter than the minimum pulse time interval in all of the pulse time intervals in the rotation signal NE.

Specifically, in the first embodiment, for establishing the time interval between each timing signal to a value inversely proportional to the engine speed, the CPU 13 calculates an average value of a time length substantially corresponding to a predetermined crank angle, such as 1° (CA), which is shorter than the 10° (CA) to set the calculated average value as the time interval. For example, the CPU 13 divides a time length substantially corresponding to the 180° (CA) by 180 to set the divided time length as the time interval between each tang signal.

Incidentally, the time interval between each timing signal can be obtained by dividing a time length substantially corresponding to 160° (CA) between previous BTDC 80° (CA) and previous ATDC 80° (CA) with respect to the current timing "BTDC 80° (CA)" by 160. In addition, the time interval between each timing signal can be obtained by dividing a time length of 10° (CA) immediately prior to the current timing "BTDC 80° (CA)" by 10. The time interval between each timing signal can be previously calculated to be stored in, for example, RAM 14. In this case, the CPU 13, in step S210, reads out the time interval from the RAM 14.

In subsequent step S220, the CPU 13 initializes a pointer Mem2A, which is a variable indicative of an address in the angular count value storage area AR1 of the second memory M2 in which an angular count value of the angular counter 26 is stored, to zero representing the top address in the storage area AR1. Similarly, the CPU 13 initializes a pointer Mem2B, which is a variable indicative of an address in the digital pressure value storage area AR2 of the second memory M2 in which a digital pressure value of the combustion pressure signal is stored, to zero representing the top address in the storage area AR2.

In next step S230, the CPU 13 boots up the timing generator 17 based on the established timing interval, terminating the process shown in FIG. 9. The booted timing generator 17 outputs a first timing signal at its booting timing, and after that, outputs the timing signals every established timing interval. The tuning generator 17 stops the output of the timing signals based on the control of the CPU 13 in step S410 of FIG. 12, described hereinafter, in response to when the timing "ATDC 80° (CA)" of a cylinder currently being ignited is reached.

Incidentally, the timing generator 17 can keep the output of the timing signals while the established time interval of each timing signal is maintained constant during each target process timing.

Figure 10:
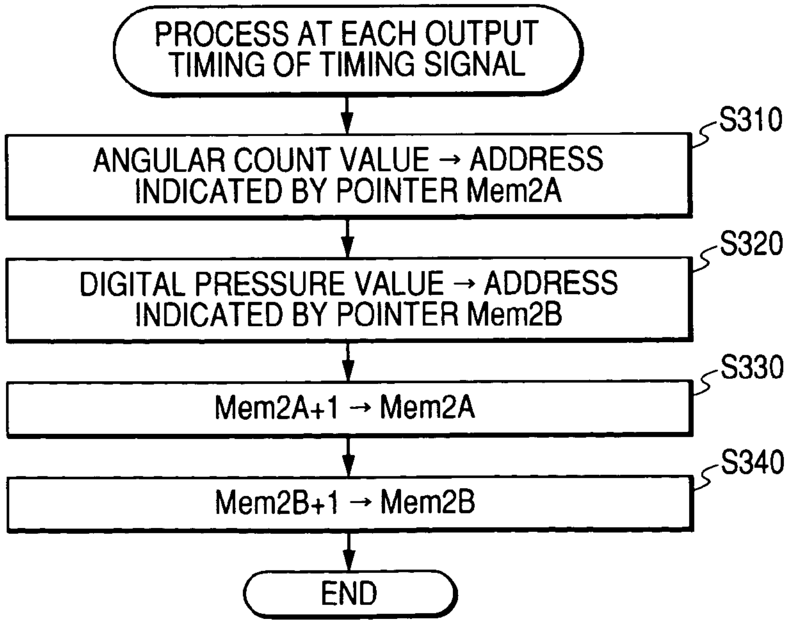
FIG. 10 is a flowchart schematically illustrating an example of a process executed by the CPU according to the first embodiment.

Next, the CPU 13 executes the process shown in FIG. 10 each time the timing signal is outputted from the timing generator 17.

In step S310, the CPU 13 reads out the angular count value of the angular counter 26 at the time to store the readout angular count value in the address that is indicated by the pointer Mem2A in the angular value storage area AR1 of the second memory M2. In subsequent step S320, the CPU 13 reads out the digital pressure value of the combustion pressure signal from the A/D converter 19 to store the readout digital pressure value in the address that is indicated by the pointer Mem2B in the digital pressure value storage area AR2 of the second memory M2.

In next step S330, the CPU 13 increments the pointer Mem2A by 1, and in subsequent step S340, the CPU 13 increments the pointer Mem2B by 1, terminating the process shown in FIG. 10.

Specifically, the process shown in FIG. 10 is executed by the CPU 13 each time the timing signal is outputted from the timing generator 17 during the interval corresponding to 160° (CA) between the BTDC 80° (CA) and the ATDC 80° (CA) of one of the cylinders #1 to #4 including its ignition timing thereof. In the first embodiment, for example, the interval corresponding to 160° (CA) between the BTDC 80° (CA) and the ATDC 80° (CA) of one of the cylinders #1 to #4 is referred to as "target process interval". This allows the angular count values and the digital pressure values corresponding thereto of one of the cylinders #1 to #4 are stored to be associated with each other in the second memory M2 (see FIG. 3).

Incidentally, in step S320, the CPU 13 can select any one of two different ways to use the A/D converter 19 as follows.

Figure 11A:
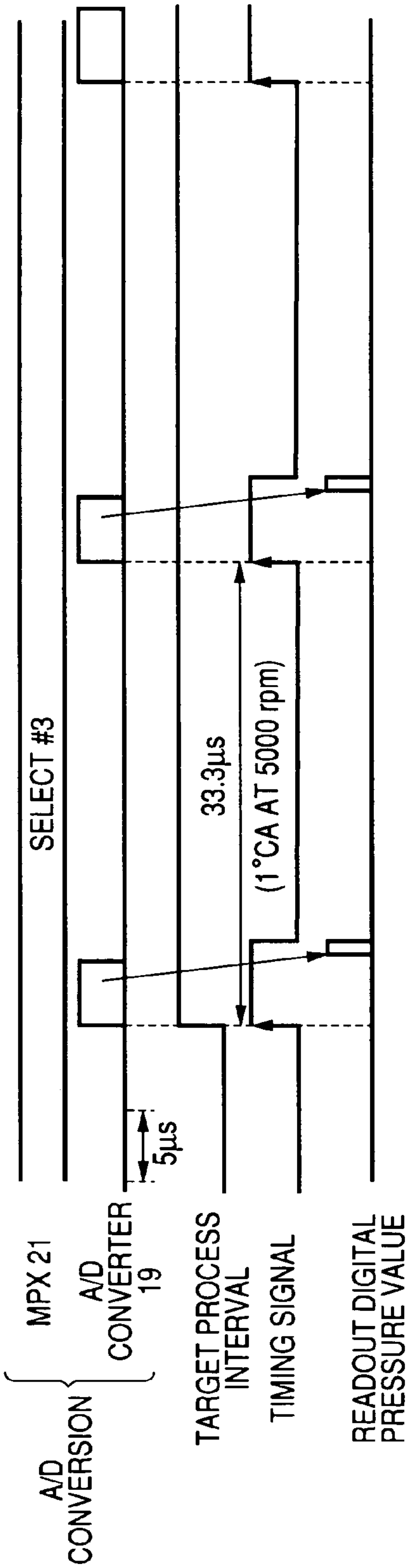
FIG. 11A is a time chart schematically illustrating an example of operation timings of an A/D converter shown in FIG. 1.

As the first way, the CPU 13 causes the A/D converter 19 to convert the combustion pressure signal into the digital pressure values each time the timing signal is generated to read out the digital pressure signal from the A/D converter 19 (see FIG. 11A). In FIG. 11A, for example, the time interval between each timing signal is set to 33.3 μs (microseconds) corresponding to 1° (CA) at the engine speed of 5000 rpm.

Incidentally, the CPU 13 can cause the A/D converter 19 to convert the combustion pressure signal into the digital pressure values at the timing earlier by a time length required for the A/D conversion process than each tiring when the timing signal is generated.

As the second way, the CPU 13 causes the A/D converter 19 to convert the combustion pressure signal into the digital pressure value every short interval of, for example, 5 μs, which is shorter than the time interval between each timing signal of, for example, 33.3 μs, thereby latching the digital pressure values. The CPU 13 reads out currently latched digital pressure values in synchronization with each leading edge of each timing signal outputted from the timing generator 17 (see FIG. 11B).

Figure 11B:
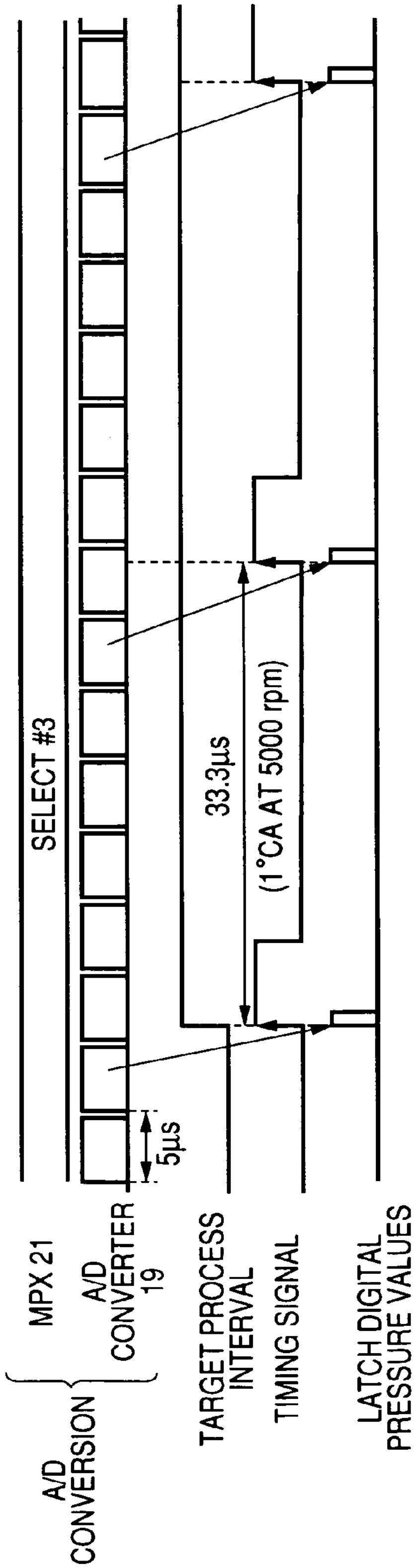
FIG. 11B is a time chart schematically illustrating another example of operation timings of the A/D converter shown in FIG. 1.

The first way allows the number of A/D conversion of the combustion pressure signal to decrease. The second way allows the process of the CPU 13 in step S320 to be simple. Incidentally, FIGS. 11A and 11B illustrate the operation timings of the A/D converter 19 in a case where the combustion pressure signal (#3) outputted from the combustion pressure sensor P3 is selected by the MPX 21.

Subsequently, in response to the detection of the timing "ATDC 80° (CA)" of one of the cylinders #1 to #4 based on the angular count value of the angular counter 26, in other words, the detection of the end timing in the target process interval, the CPU 13 performs the process shown in FIG. 12.

In step S410, the CPU 13 operates to stop the timing signal output operation of the timing generator 17, terminating the target process interval of one of the cylinders #1 to #4 to be processed.

In next step S420, the CPU 13 performs arithmetic computations based on each of the angular count values ard digital pressure values corresponding thereto stored in the second memory M2 at the current end timing of the target process interval of one of the cylinders #1 to #4, and the free-run timer values stored in the first memory M1 at the current end timing of the target process interval.

The arithmetic computations related to the first embodiment include correction of each of the angular count values corresponding to each of the digital pressure values stored in the second memory M2 (see FIG. 3) based on each of the free-run timer values stored in the first memory M1. In particular, each of the angular count values represents a crank angle at which the combustion pressure signal is converted into each of the digital pressure values. Details of the arithmetic computations will be described hereinafter.

In step S430, the CPU 13 stores each of the angular count values corrected by the arithmetic computations and each of the digital pressure values corresponding thereto in, for example, the RAM 14. This allows the CPU 13 to perform the controls of the engine based on each of the control coefficients (correction values), each of the angular count values and each of the digital pressure values.

Specifically, as shown in FIG. 4, as the control coefficients, the digital correction values to correct the digital pressure values corresponding to the combustion pressure signal are stored in the data map DM of the third memory M3 so that they are associated with the corresponding crank angles 0° (CA), 10° (CA), . . . , 720° (CA) in steps of 10° (CA). That is, each correction value corresponding to each of the crank angles represented by each of the corrected angular court values is obtained based on the digital correction values stored in the data map DM by interpolation. Using each correction value allows correction of each of the digital pressure values of the combustion pressure signal, which corresponds to each correction value, permitting each of the corrected digital pressure values to match the change of pressure in one of the cylinders #1 to #4 depending on only the ignition control. This makes it possible to perform the engine controls based on the corrected digital pressure values.

In subsequent step S440, the CPU 13 causes the MPX 21 to select another one of the combustion pressure signals of another one of the cylinders, which will reach the TDC next, thereby sending it to the A/D converter 19 so that another one of the combustion pressure signals is converted into the digital pressure values.

Specifically, when the angular count value of the angular counter 26 corresponds to 80° (CA) (see T1(#1) in FIG. 7), the CPU 13 causes the MPX 21 to select the combustion pressure signal (#3) of the cylinder #3, which will reach the TDC next, thereby sending it to the A/D converter 19. When the angular count value of the angular counter 26 corresponds to 260° (CA) (see T1(#3) in FIG. 7), the CPU 13 causes the MPX 21 to select the combustion pressure signal (#4) of the cylinder #4, which will reach the TDC next, thereby sending it to the A/D converter 19.

When the angular count value of the angular counter 26 corresponds to 440° (CA) (see T1(#4) in FIG. 7), the CPU 13 causes the MPX 21 to select the combustion pressure signal (#2) of the cylinder #2, which will reach the TDC next, thereby sending it to the A/D converter 19. When the angular count value of the angular counter 26 corresponds to 620° (CA) (see T1(#2) in FIG. 7), the CPU 13 causes the MPX 21 to select the combustion pressure signal (#1) of the cylinder #1, which will reach the TDC next, thereby sending it to the A/D converter 19.

Figure 12:
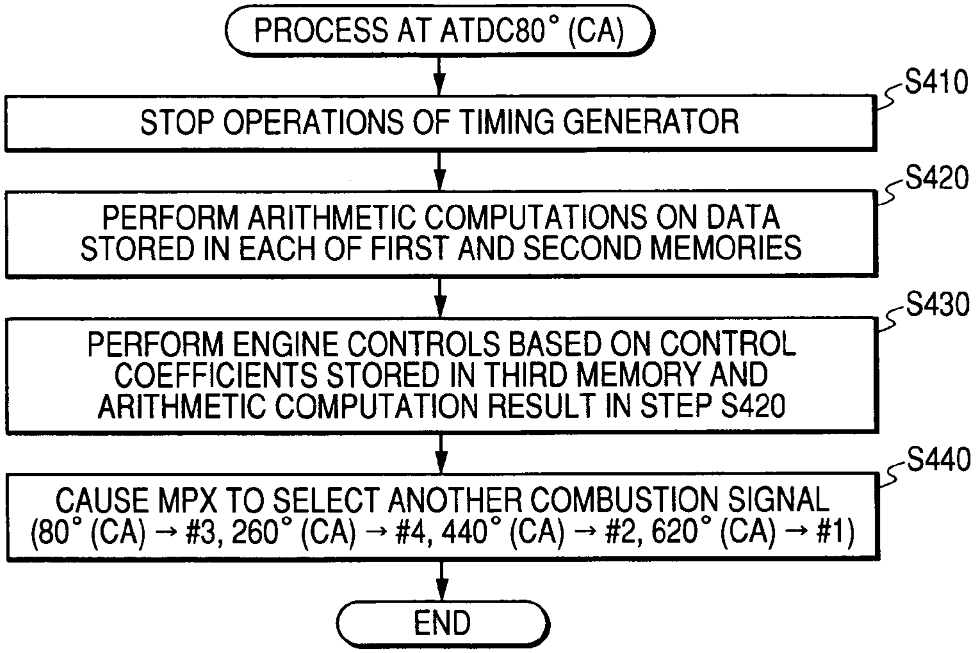
FIG. 12 is a flowchart schematically illustrating an example of a process executed by the CPU according to the first embodiment.

After the operations in step S440, the CPU 13 terminates the process shown in FIG. 12.

An example of the arithmetic computations of the CPU 13 in step S420 will be described in detail hereinafter using FIG. 13.

Figure 13:
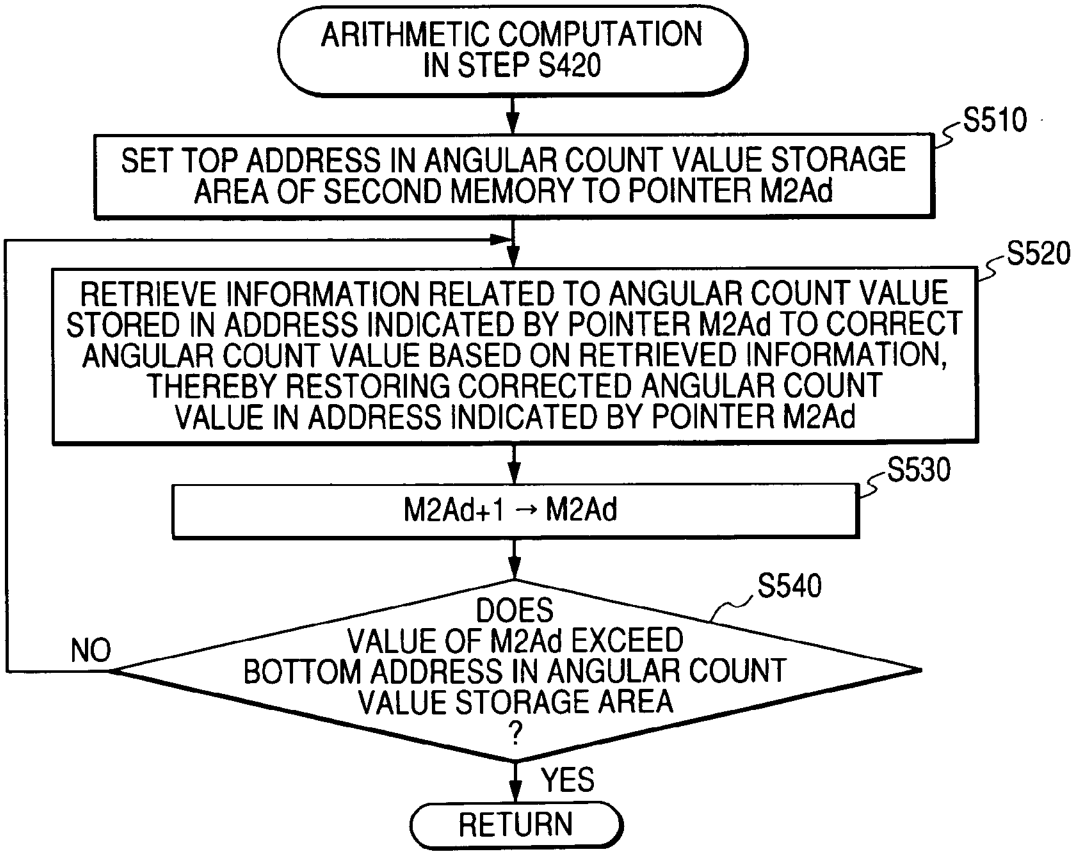
FIG. 13 is a flowchart schematically illustrating an example of a process executed by the CPU according to the first embodiment.

As shown in FIG. 13, in step S510, the CPU 13 sets the top address in the angular count value storage area AR1 of the second memory M2 to a pointer M2Ad.

In next step S520, the CPU 13 reads out the angular count value stored in the address indicated by the pointer M2Ad in the angular count value storage area AR1 of the second memory M2. The CPU 13 retrieves information, that is, the free-run timer value, related to the readout angular count value from the first memory M1 to correct the readout counter value based on the information (free-run counter value), thereby restoring the corrected angular count value in the address indicated by the pointer M2Ad.

After the operations in step S520, the CPU 13 increments the pointer M2Ad by 1 in step S530, and in next step S540, the CPU 13 determines whether the value of the pointer M2Ad exceeds the bottom address in the angular count value storage area AR1 of the second memory M2.

When determining that the value of the pointer M2Ad does not exceed the bottom address in the angular count value storage area AR1 of the second memory M2, the determination in step S540 is NO. Next, the CPU 13 returns to step S520 to correct the angular count value stored in the next address indicted by the pointer M2Ad in the angular count value storage area AR1.

When determining that the value of the pointer M2Ad exceeds the bottom address in the angular count value storage area AR1 of the second memory M2, the CPU 13 terminates the arithmetic computations in step S420 because all angular count values stored in the angular count value storage area AR1 of the second memory M2 are corrected, respectively, shifting to step S430.

Next, an example of the operations in step S520 will be described in detail hereinafter.

Figure 14:
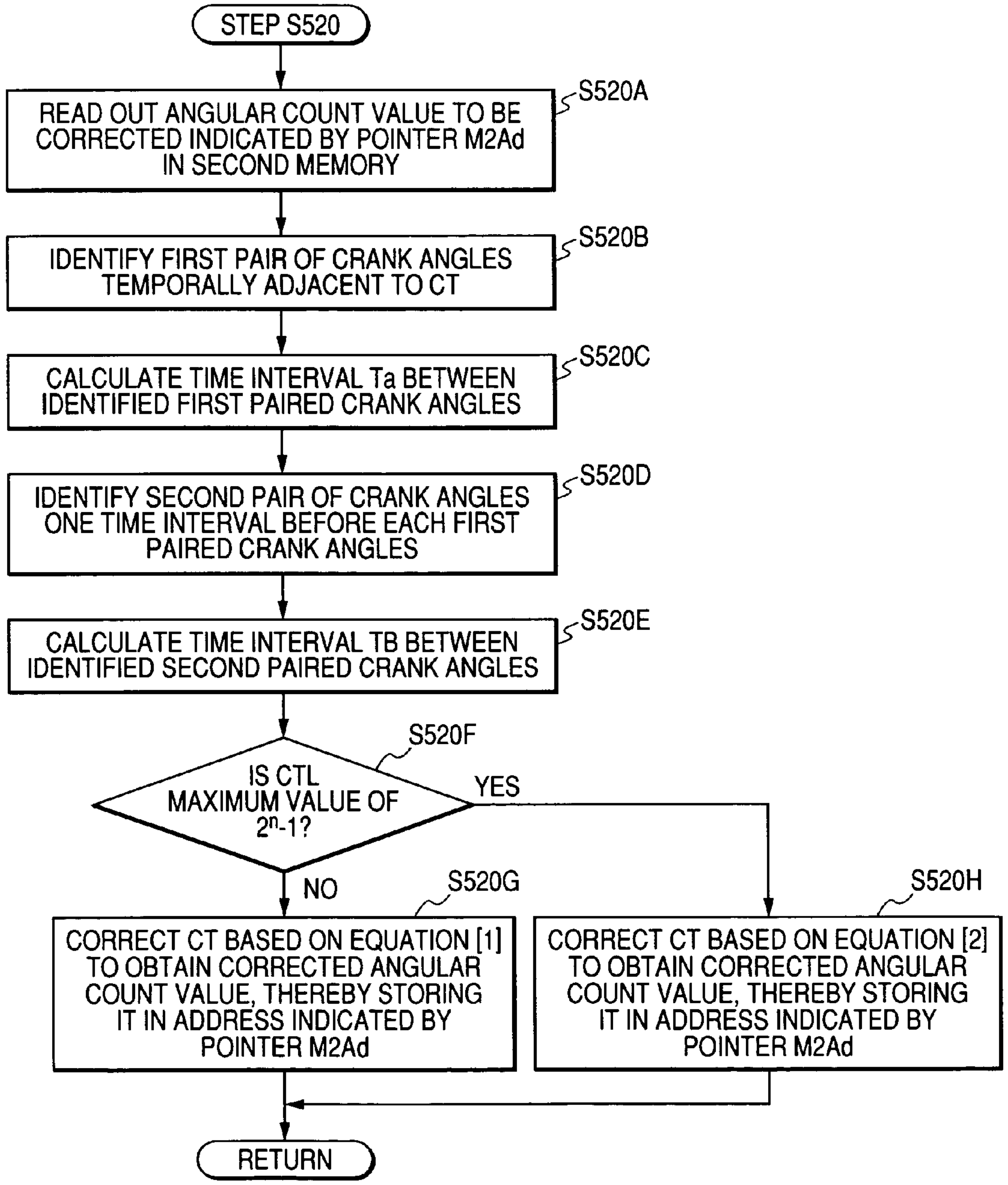
FIG. 14 is a flowchart schematically illustrating an example of a process executed by the CPU according to the first embodiment.

In step 520A in FIG. 14, the CPU 13 reads out the angular count value as a target for correction stored in the address indicated by the pointer M2Ad in the angular count value storage area AR1 of the second memory M2. The angular count value as the target for correction is referred to as CT hereinafter.

In subsequent step S520B, the CPU 13 identifies a first pair of NE timing crank angels temporally adjacent to the CT in each NE timing crank angle corresponding to each leading edge in the rotation signal NE. One of the first pair of crank angles appears just before the CT, and the other thereof appears just after the CT.

In step S520C, the CPU 13 calculates a time interval Ta between the identified first paired crank angles based on the free-run timer values stored in the first memory M1.

Specifically, as shown in FIG. 2A, the free-run timer values are stored to be associated with corresponding NE timing crank angles in the first memory M1, respectively, for indicating the times of the crank angles. This enables the CPU 13 to identify the free-run timer values corresponding to the first paired crank angles temporally adjacent to the CT and to obtain the difference between the free-run timer values as the time interval Ta. That is, the obtained time interval Ta represents the current pulse time interval at the time of storing the CT in the second memory M2.

As shown in FIG. 2B, when the pulse time intervals are stored to be associated with corresponding NE timing crank angles in the first memory M1, respectively, the CPU 13 can read out one of the time intervals as the Ta, which corresponds to the CT.

If the first paired crank angles temporally adjacent to the CT correspond to the pulse missing portion K in the rotation signal NE, the CPU 13 further divides the calculated time interval Ta by 3 to reset the divided value as the time interval Ta.

In next step S520D, the CPU 13 identifies a second pair of NE timing crank angels one time interval before each of the first paired NE timing crank angles. In other words, one of the second pair of NE timing crank angles appears just before the CT, and the other thereof appears just before one of the second pair of NE timing crank angles.

In step S520E, the CPU 13 calculates a time interval Tb between the identified second paired crank angles based on the free-run timer values stored in the first memory M1, which is similar to the operations in step S520C. That is, the obtained time interval Tb represents the previous pulse time interval at the time of storing the CT in the second memory M2.

If the identified second pair of crank angles corresponds to the pulse missing portion K in the rotation signal NE, the CPU 13 divides the time interval Tb by 3 to reset the divided value as the time interval Tb.

In subsequent step S520F, the CPU determines whether CTL representing the lower-order n-bits of the CT corresponding to the count value of the lower-order counter 26*b* is the maximum value of "$2^n-1$".

It is determined that the CTL is not the maximum value of "$2^n-1$" so that the determination in step S520F is NO. In this case, the CPU 13 corrects the CT in accordance with the following equation [1] to obtain the corrected angular count value, referred to as CTd, thereby restoring the corrected angular count value CTd in the address indicated by the pointer M2Ad in the storage area AR1 of the second memory M2:

$$CTd=CTH+CTL\times(Tb/Ta) \qquad [1]$$

Where CTH represents the higher-order bits of the CT higher than the lower-order n-bits, which correspond to the count value of the higher-order counter 26*a*. In other words, the CTH represents a value corresponding to the CT whose lower-order n-bits are all set to zero.

In contrast, it is determined that the CTL is the maximum value of "$2^n-1$" so that the determination in step S520F is YES. In this case, the CPU 13 corrects the CT in accordance with the following equation [2] to obtain the corrected angular count value, referred to as CTd:

$$CTd=CTde+\Delta CT\times(Tb/Ta)\times J \qquad [2]$$

Where CTde represents a current corrected crank angle calculated by the equation [1], ΔCT represents a crank angle interval per 1 sampling. Specifically, the ΔCT represents a difference between any one pair of adjacent crank angles within the range from the crank angle just before the CT to the crank angle before the CTde in all of the crank angles stored in the second memory M2. In addition, J represents what number of the crank angle corresponding to the CT as the target for correction is in some of the crank angles whose CTLs are continuously set to the maximum values, respectively.

A case where the operations shown in FIG. 14 in steps SS20A to S520H that are performed at the timing of ATDC 80° (CA) of the cylinder #3 (see FIG. 7) will be described hereinafter as an example.

In the second memory M2, as shown in FIG. 16, angular count values 199.00° (CA), 200.00° (CA), . . . , 221.00° (CA) are previously stored.

As shown in the top in FIG. 16, the pulse time interval T180 within the range between 180° (CA) and 190° (CA) is set to the free-run timer value of 1.666 ms (milliseconds). Similarly, the pulse time interval T190 within the range between 190° (CA) and 200° (CA) is set to the free-run timer value of 1.666 ms, and the pulse time interval T200 within the range between 200° (CA) and 210° (CA) is set to the free-run timer value of 1.000 ms. The pulse time interval T210 within the range between 210° (CA) and 220° (CA) is set to the free-run timer value of 2.000 ms.

The above free-run tuner values are previously stored to be associated with the corresponding crank angles in the first memory M1. In FIG. 16, the range H1 illustrated in FIG. 7 is enlarged in FIG. 16.

In this case, each of the angular count values before correction within the region R1 corresponding to the range between 200° (CA) and 210° (CA) is data within the pulse time interval T200 that is shorter than the pulse time interval T190 while the engine accelerates. This causes the lower-order n-bits of each of the angular count values of the angular counter 26 not to become the maximum value.

This allows each of the angular count values within the region R1 before correction to be corrected in accordance with the equation [1] where Ta=T200=1.000 ms, Tb=T190=1.666 ms. This results in that, for example, the angular count value "203.00° (CA)" in FIG. 15 is corrected based on the equation [1]:

$$CTd=200+3.00\times(1.666/1.000)=205.00° \text{ (CA)} \qquad [1]$$

In addition, each of the angular count values before correction within the region R2 corresponding to the range between 210° (CA) and 220° (CA) is data within the pulse time interval T210 that is longer than the pulse time interval T200 while the engine decelerates. This causes the lower-order n-bits of each of the angular count values in the first half region R2*a* of the region R2 not to become the maximum value.

In contrast, the lower-order n-bits of each of the angular count values in the second half region R2*b* of the region R2 become the maximum value. In FIG. 15, for example, the number N of multiplication is set to 1024, and the number n of bits of the lower-order counter 26*b* is set to 10. The maximum value of the lower-order n-bits is 9.99.

Each of the count values within the first half region R2*a* is corrected in accordance with the equation [1] where Ta=T210=2.000 ms, Tb=T200=1.000 ms. This results in that, for example, the angular count value "218.33° (CA)" in FIG. 15 is corrected based on the equation [1]:

$$CTd=210+8.33\times(1.000/2.000)=214.17° \text{ (CA)} \qquad [1]$$

In addition, each count value, such as 219.99° (CA) within the second half region R2*b* is corrected in accordance with the equation [2] where Ta=T210=2.000 ms, Tb=T200=1.000 ms. In this correction, as shown by the solid arrow AR1 in FIG. 15, as CTde, the value of 214.17°

(CA) is used, and as shown by the curved arrows AR2 in FIG. 15, as ΔCT, the value of 1.67° (CA), which is, for example, obtained by subtracting 215.00° (CA) from 216.67° (CA), is used. This results in that, for example, the third angular count value in the second half region R2*b* in FIG. 15, because J=3, is corrected based on the equation [2]:

$$CTd=214.17+1.67\times(1.000/2.000)\times3=216.67°\ (CA) \qquad [2]$$

In place of ΔCT in the equation [2], as shown in the arrow AR3 in FIG. 15, the difference between temporally adjacent angular count values after correction within the first half region R2*a* can be obtained so that the obtained difference value can be used in place of "ΔCT×(Tb−Ta)" in the equation [2]. When calculating the value "ΔCT×(Tb−Ta)" and/or the value "ΔCT", it is possible to use an average value of a plurality of the values each indicated as "ΔCT×(Tb−Ta)", and/or an average value of a plurality of the values each indicated as "ΔCT".

In the first embodiment, the timing generator 17, for example, corresponds to a timing signal outputting unit of the present invention, and the first memory M1, for example, corresponds to a first storage unit thereof. In addition, the operation of the CPU 13 in step S320 of FIG. 10 and the second memory M2, for example, correspond to a second storage unit of the present invention. Moreover, the operation of the CPU 13 in step S420 of FIG. 12, for example, corresponds to each of a calculating unit and a correcting unit of the present invention.

As described above in detail, in the first embodiment of the present invention, as shown by the waveform A in FIG. 16, the digital pressure values converted from each pressure combustion signal by the A/D converter 19 are not synchronized with the angular count values of the angular counter 26 (higher-order counter 26*a* and the lower-order counter 26*b*), but synchronized with the timing signals whose time interval is constant outputted from the timing generator 17. The digital pressure values are sampled (stored) to be associated with the corresponding angular count values of the angular counter 26 in the second memory M2. The operations illustrated in FIGS. 13 and 14 are performed so that the angular count values stored in the second memory M2 are corrected based on the data representing each time of each of the pulse time intervals in the rotation signal NE.

This allows each of the angular count values after correction to accurately represent each of the crank angles at which each of the digital pressure values is stored in the second memory M2 independently of the change of the engine speed (rotational speed of the rotation shaft RS).

The information composed of each of the digital pressure values and each of the corrected angular count values corresponding thereto permits the CPU 13 to accurately grasp which crank angles correspond to which digital pressure values.

In addition, when plotting the corrected digital pressure values stored in the second memory M2 against the crank angle as the horizontal ads, as shown by the waveform B in FIG. 16, the waveform B recreated based on the corrected digital pressure values has no lack of data and data skip. This prevents, when using the digital pressure values stored in the second memory M2 for engine controls, the control state of the engine from suddenly changing.

In contrast, it is assumed that an engine control unit without comprising at least the first and second memories M1 and M2 and at least the functions shown in FIGS. 13 and 14, as compared with engine control unit 11 according to the first embodiment of the present invention, is used.

Figure 17:
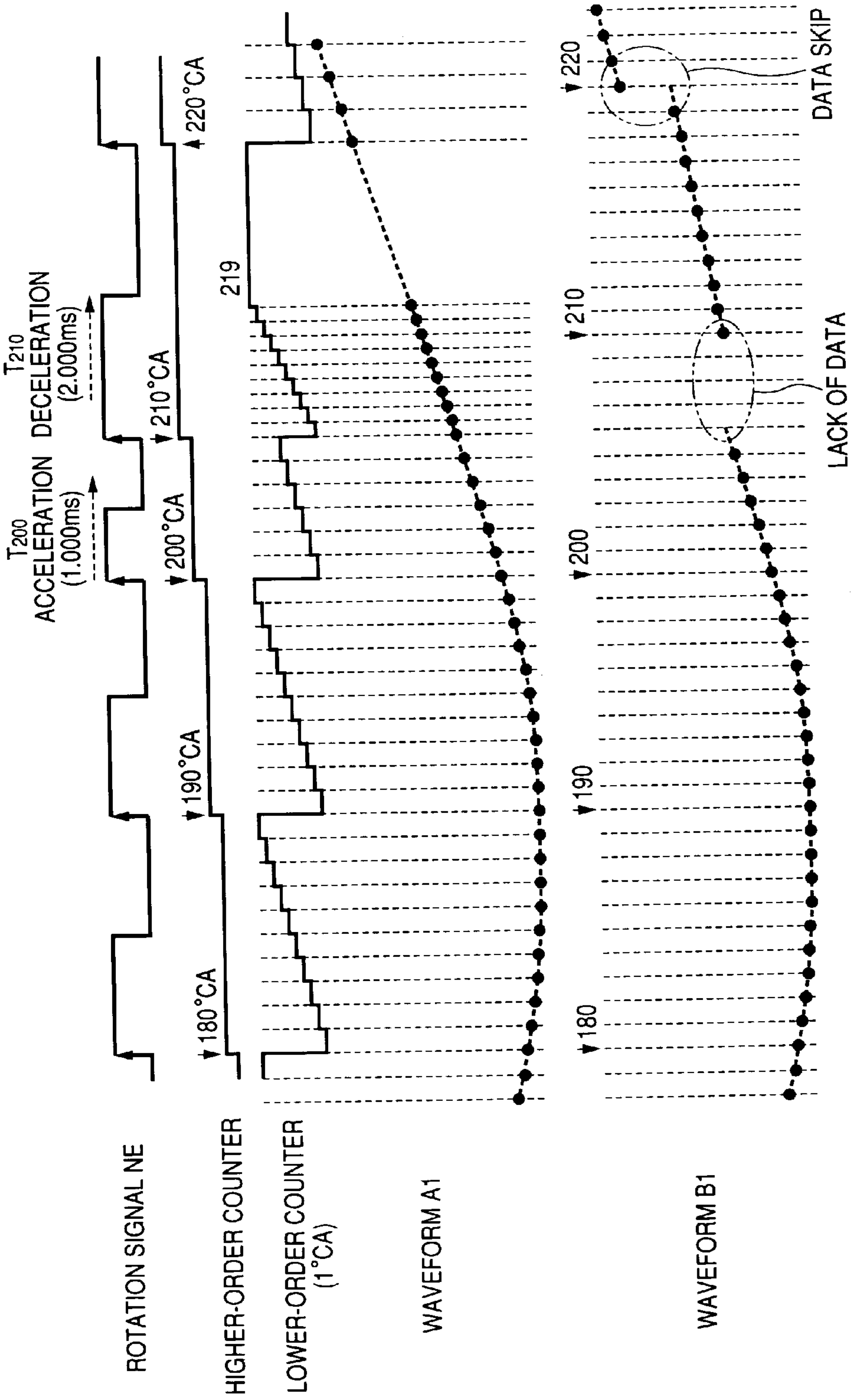
FIG. 17 is a time chart schematically illustrating operations of an engine control unit.

In this assumption, the waveform A1 generated by plotting digital pressure values converted from each pressure combustion signal by the A/D converter 19 is shown by a waveform A1 in FIG. 17.

As shown in FIG. 17, when the pulse time interval T200 is shorter than the pulse time interval T190 because of the engine acceleration, the number of the timings generated every 1° (CA) is supposed to appear in the pulse time interval T200, but the number of the timings may be reduced. This may cause, when plotting the digital pressure values converted from each pressure combustion signal by the A/D converter 19 every constant crank angle of, for example, 1° (CA), which is illustrated as a waveform B1 in FIG. 17, the lack of data to take place.

Moreover, in this assumption, when the pulse time interval T210 is longer than the pulse time interval T200 because of the engine deceleration, after the timings are generated every 1° (CA) nine times, no timings may be generated every 1° (CA) until the next leading edge in the rotation signal NE appears. This may cause, as shown by the waveform B1 in FIG. 17, data indicative of at least one of data values in the waveform B1 to rapidly skip.

As described above, however, in the first embodiment, because the waveform B recreated based on the corrected digital pressure values has no lack of data and data skip (see FIG. 16). This prevents, when using the digital pressure values stored in the second memory M2 for engine controls, the control state of the engine from suddenly changing.

Incidentally, in FIG. 16, each fig of storing the digital pressure values is substantially synchronized with each timing of 1° (CA), but can be asynchronized therewith. While the engine accelerates, each of the intervals for storing digital pressure values in the second memory M2 is wide. In this case, it is possible to set each time interval between each timing signal from the timing generator 17 to, for example, a time length corresponding to 0.5° (CA).

In the first embodiment, it is sufficient to perform the arithmetic computations shown in FIG. 13 only once, reducing the processing load of the CPU 13.

The digital pressure values of the combustion pressure signal stored in the second memory M2 are stored every constant time interval, making it possible to apply the digital pressure values for both of the operations depending on the crank angle, such as misfire detection, and time-dependent operations, such as digital filtering operations for knock detection.

Furthermore, in the engine control unit 11 according to the first embodiment, it is possible to calculate control coefficients accurately corresponding to the corrected angular count values stored in the second memory M2 based on the data map DM prepared in the third memory M3 (see FIG. 4).

That is, each of the calculated control coefficients accurately corresponds to each of the digital pressure values stored in the second memory M2, which allows control of the engine based on the accurately associated control coefficients and one digital pressure values.

This makes it possible to improve the control accuracy of the engine.

In addition, when as the control coefficients, target pressure values for the combustion pressure sensors P1 to P4 are stored in the data map of the third memory M3, respectively, it is possible to calculate target pressure values accurately corresponding to the corrected angular count values stored in the second memory M2 based on the data map.

Namely, each of the calculated target pressure values accurately corresponds to each of the digital pressure values stored in the second memory M2, which allows accurate determination of a magnitude relationship between each of the calculated target pressure values and each of the digital pressure values stored in the second memory M2.

Incidentally, in the first embodiment, the target process intervals for the cylinders #1 to #4 are established without overlapping them, but the present invention is not limited to the structure. When establishing the target process intervals for the cylinders #1 to #4 with them partially overlapped, it can be necessary to provide the second memory M2, or each cylinder to perform the operations described hereinbefore according to the first embodiment for each cylinder. This modification will be described hereinafter as a fifth embodiment of the present invention.

Second Embodiment

An engine control unit 11A according to a second embodiment of the present invention will be described hereinafter. In other embodiments of the present invention including the second embodiment, the hardware structure of each of the other embodiments is substantially the same as that of the first embodiment, so that reference characters of elements of each of the other embodiments are substantially the same as those of the elements of the first embodiment.

The engine control unit 11A according to the second embodiment has different points as compared with the engine control unit 11 as follows.

Figures 18, 19:
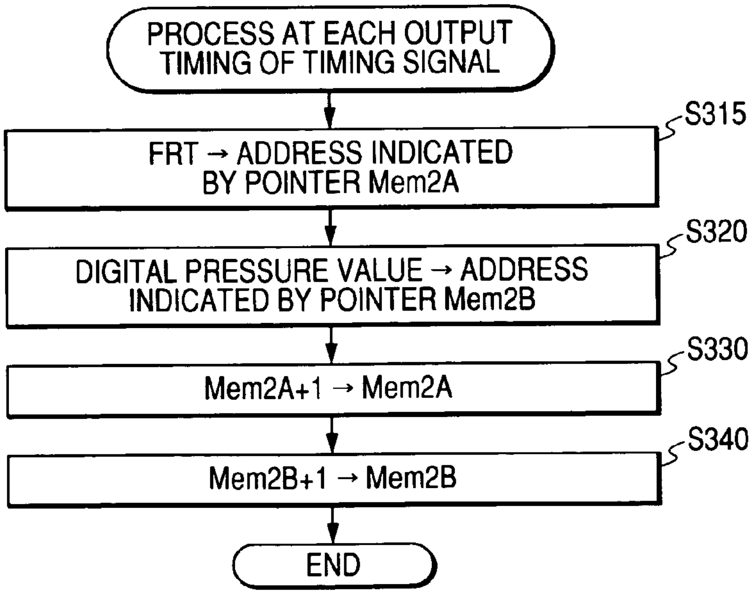
FIG. 18 is a view schematically illustrating an example of a configuration of the second memory according to a second embodiment of the present invention.
FIG. 19 is a flowchart schematically illustrating an example of a process executed by the CPU according to the second embodiment.

As the first different point, in a second memory M2A, as shown in FIG. 18, the free-run timer values are stored in the second memory M2A in place of the angular count values.

Specifically, the CPU 13 executes the process shown in FIG. 19, in place of that shown in FIG. 10, each time the timing signal is outputted from the timing generator 17.

In step S315, the CPU 13 reads out the free-run timer value FRT from the edge time capturing unit 27 at the output timing of the timing signal. The CPU 13 stores the readout free-run timer value FRT in the address that is indicated by the pointer Mem2A in an free-run timer value storage area ARIA corresponding to the angular value storage area AR1 of the second memory M2A. In the second embodiment, the pointer Mem2A is a variable indicative of an address in the free-run timer value storage area AR1A of the second memory M2A. The remaining steps S320 to S340 in FIG. 19 are substantially identical with those in FIG. 10, and therefore, the descriptions of which are omitted.

Specifically, the process shown in FIG. 19 is executed by the CPU 13 each time the timing signal is outputted from the tuning generator 17 during each target process interval corresponding to 160° (CA) between the BTDC 80° (CA) and the ATDC 80° (CA) of each of the cylinders #1 to #4. This allows the free-run timer values and the digital pressure values corresponding thereto of each cylinder are stored to be associated with each other in the second memory M2A (see FIG. 18).

Figure 20:
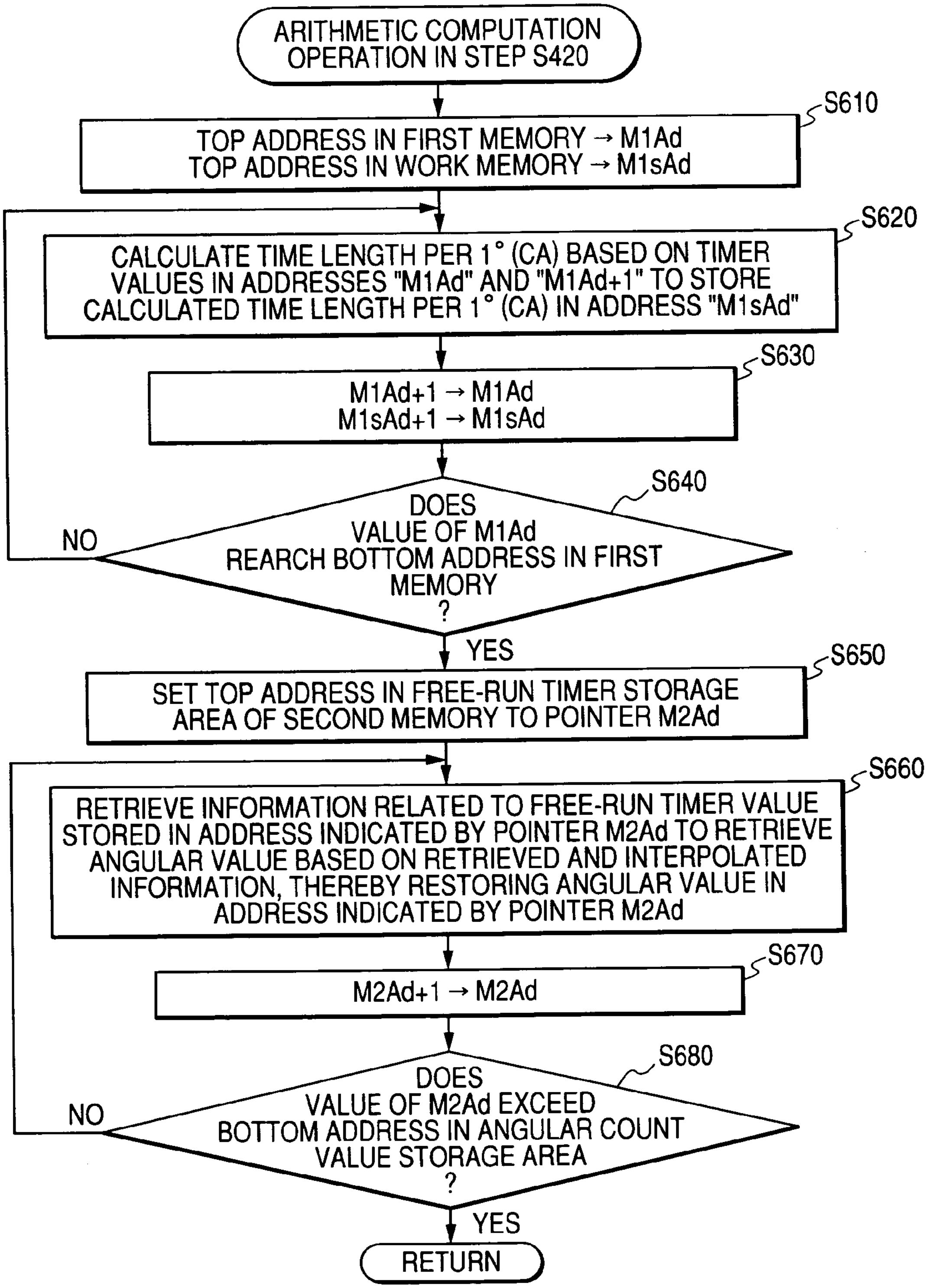
FIG. 20 is a flowchart schematically illustrating an example of a process executed by the CPU according to the second embodiment.

As the second different point, in the second embodiment, the CPU 13 executes the arithmetic computations in step S420, which are shown, as an example, in FIG. 20 in place of FIG. 13.

Specifically, in step S610, the CPU 13 sets the top address in the first memory M1 to a pointer M1Ad, and sets the top address in a work memory M1*s* previously prepared in the RAM 14 (see FIG. 21) a pointer M1*s*Ad.

In next step S620, the CPU 13 reads out the free-run timer value stored in the address indicated by the pointer MAd in the first memory M1. The address indicated by the pointer M1Ad is referred to as address "M1Ad". The CPU 13 reads out the free-run timer value stored in the next address "M1Ad+1" next the address "M1Ad". The CPU 13 calculates the difference between the free-run timer value stored in the "address "M1Ad" and that stored in the next address "M1Ad+1" hereinafter. The CPU 13 calculates a time length per 1° (CA) between both NE timing crank angles corresponding to both adjacent addresses "M1Ad" and "M1Ad+1" based on the calculated difference, thereby storing the calculated time length in the address indicated by the pointer M1*s*Ad in the work memory M1*s*. The address indicated by the pointer M1*s*Ad is referred to as "M1*s*Ad" hereinafter.

The time length per 1° (CA) can be calculated in accordance with the following equation [3]:

$$\text{Time length per } 1° \text{ (CA)}=(FT2)-(FT1)/(CA2-CA1) \quad [3]$$

Where FT1 represents the free-run timer value stored in the address "M1Ad", FT2 represents the free-run timer value stored in the address "M1Ad+1", CA1 represents the crank angle corresponding to the address "M1Ad", and CA2 represents the crank angle corresponding to the address "M1Ad+1".

In next step S630, the CPU 13 increments each of the pointer M1Ad and M1*s*Ad by 1, and determines whether the value of the pointer M1Ad reaches the bottom address in the first memory M1.

When determining that the value of the pointer M1Ad does not reach the bottom address in the first memory M1 (the determination in step S640 is NO), the CPU 13 returns to step S620 to calculate the time length per 1° (CA) between the next NE timing crank angles.

When determining that the value of the pointer M1Ad reaches the bottom address in the first memory M1, the CPU 13 goes to step S650 because each time length per 1° (CA) between each of the NE timing crank angles has already being completed.

The operations of the CPU 13 in steps S610 to S640 allow each time length per 1° (CA) between each NE timing crank angle to be calculated based on each free-run timer value corresponding to each NE timing crank angle. Each time length per 1° (CA) calculated by the CPU 13 is sequentially stored in the work memory M1*s* from its top address (see FIG. 21). For example, the time length per 1° (CA) between 200° (CA) and 210° (CA) is calculated in accordance with the equation [3]:

$$100.0\ \mu s=(44333)-(43333)/10° \text{ (CA)} \quad [3]$$

In addition, the time length per 1° (CA) between 210° (CA) and 220° (CA) is calculated in accordance with the equation [3]:

$$200.0\ \mu s=(46333)-(44333)/10° \text{ (CA)} \quad [3]$$

Each address in the work memory M1*s*, as well as each address in the first memory M1, corresponds to each NE timing crank angle, which allows the CPU 13 to retrieve a time length per 1° (CA) between desired NE timing crank angles from the work memory M1*s*.

Subsequently, in step S650, the CPU 13 sets the top address in the free-run timer value storage area ARIA, in which each free-run timer value is sequentially stored, of the second memory M2A to a pointer M2Ad.

In next step S660, the CPU 13 reads out the free-run timer value stored in the address indicated by the pointer M2Ad in the free-run timer value storage area ARIA of the second memory M2A. The CPU 13 retrieves information related to the readout free-run timer value from the first memory M1 and the work memory M1*s* to perform interpolation based on the retrieved information to calculate a crank angle corresponding to the readout free-run timer value, thereby restoring the calculated angular value of the crank angle in the address indicated by the pointer M2Ad.

After the operations in step S660, the CPU 13 increments the pointer M2Ad by 1 in step S670, and in next step S680, the CPU 13 determines whether the value of the pointer M2Ad exceeds the bottom address in the free-run timer value storage area AR1A of the second memory M2A.

When determining that the value of the pointer M2Ad does not exceed the bottom address in the free-run timer value storage area ARIA of the second memory M2A, the determination in step S680 is NO. Next, the CPU 13 returns to step S660 to convert the free-run timer value stored in the next address indicted by the pointer M2Ad into a crank angle corresponding thereto.

When determining that the value of the pointer M2Ad exceeds the bottom address in the free-run timer value storage area ARIA of the second memory M2A, the determination in step S680 is YES. Subsequently, the CPU 13 terminates the arithmetic computations in step S420 because all free-run timer values stored in the free-run timer value storage area ARIA of the second memory M2A are converted into crank angles corresponding thereto, respectively, shifting to step S430.

Next, an example of the operations in step S660 will be described in detail hereinafter.

Figure 22:
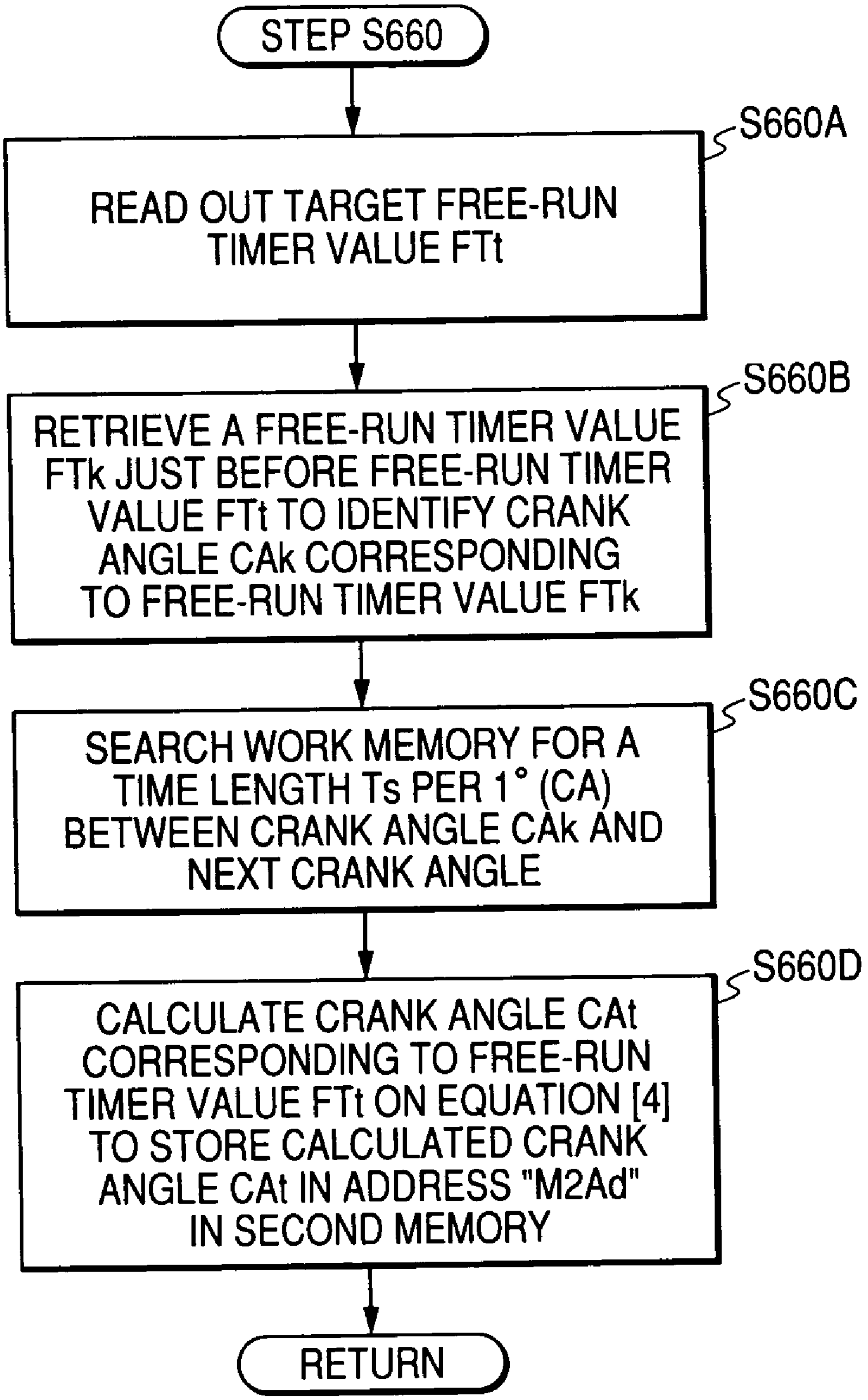
FIG. 22 is a flowchart schematically illustrating an example of a process executed by the CPU according to the second embodiment.

In step 660A in FIG. 22, the CPU 13 reads out the free-run timer value as a target stored in the address indicated by the pointer M2Ad in the free-run timer value storage area ARIA of the second memory M2A. The target free-run timer value is referred to as "FTt" hereinafter.

In subsequent step S660B, the CPU 13 retrieves a free-run timer value FTk just before the free-run timer value FTt from the first memory M1 to identify the NE timing crank angle CAk corresponding to the free-run timer value FTk.

In step S660C, the CPU 13 searches the work memory M1*s* for a time length Ts per 1° (CA) between the crank angle CAk and the crank angle next the crank angle CA1S. The time length Ts is a pulse time interval in the rotation signal NE containing the freeman timer value FTt per 1° (CA).

In step S660D, the CPU 13 calculates the crank angle CAt corresponding to the free-run timer value FTt in accordance with the following equation [4] to store the calculated crank angle CAt in the address "M2Ad" in the second memory M2A. The crank angle Cat is the crank angle at which the digital pressure value stored to be associated with the free-run timer value FTt in the second memory M2A.

$$Cat = CAk + (FTt - FTk)/Ts \qquad [4]$$

For example, as shown in FIG. 21, when the value "43999" is set to the target free-run timer value FTt in each of the free-run timer values stored in the second memory M2A, the value "43333" is read out from the first memory M1 as the free-run timer value FT, and the NE timing crank angle CAk corresponding to the free-run timer value FTk is identified as 200° (CA).

100 μs representing the time length per 1° (CA) between 200° (CA) and 210° (CA) from the work memory M1*s* as the Ts. The crank angle CAt is calculated in accordance with the equation [4] (see the [*1] in FIG. 21):

$$CAt = 200^\circ\ (CA) + (43999) - (43333)/100 = 206.66^\circ\ (CA) \qquad [4]$$

Similarly, when the value "45666" is set to the target free-run timer value FTt in each of the free-run timer values stored in the second memory M2A, the value "44333" is read out from the first memory M1 as the free-nin timer value FTk, and the NE timing crank angle CAk corresponding to the free-run timer value FTk is identified as 210° (CA).

200 μs representing the time length per 1° (CA) between 210° (CA) and 220° (CA) from the work memory M1*s* as the Ts. The crank angle CAt is calculated in accordance with the equation [4] (see the [*2] in FIG. 21):

$$CAt = 210^\circ\ (CA) + (45666) - (44333)/200 = 216.67^\circ\ (CA) \qquad [4]$$

In the second embodiment, in step S430, the CPU 13 stores each of the angular values calculated by the arithmetic computations ard each of the digital pressure values corresponding thereto in, for example, the RAM 14. This allows the CPU 13 to perform the controls of the engine based on each of the control coefficients (correction values), each of the angular values and each of the digital pressure values.

Incidentally, in the second embodiment, the operation of the CPU 13 in step S320 of FIG. 19 and the second memory M2A, for example, correspond to a second storage unit of the present invention. Moreover, the process of the CPU 13 in FIG. 20, for example, corresponds to a calculating unit of the present invention.

Figure 23:
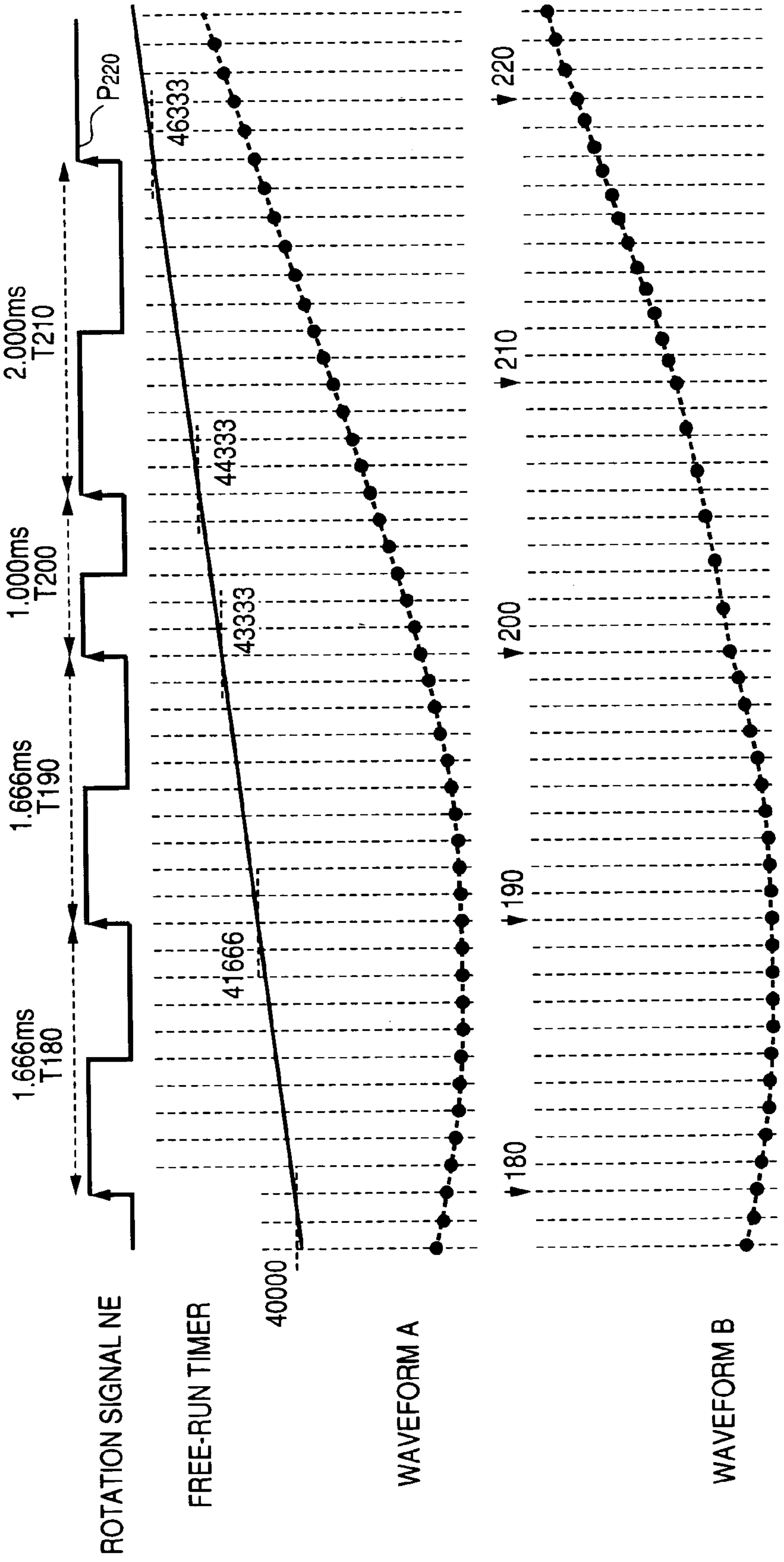
FIG. 23 is a time chart schematically illustrating an example of operations of the engine unit according to the second embodiment.

As described above in detail, in the engine control unit 11A according to the second embodiment, as shown by the waveform A in FIG. 23, the digital pressure values of each pressure combustion signal are stored every constant cycle of the timing signals outputted from the timing generator 17. The digital pressure values are associated with the corresponding free-run timer values in the second memory M2A. The operations illustrated in FIGS. 20 and 22 are performed. The operations allows calculation of each crank angle accurately representing the timing when each digital pressure value is stored in the second memory M2A based on each free-run timer value stored in second memory M2A and each free-run timer value corresponding each crank angle stored in the first memory M1.

That is, each free-run timer value associated with each digital pressure value stored in the second memory M2A represents each time when each digital pressure value is stored in the second memory M2A. Each free-run timer value stored in the second memory M2A is converted into each crank angle corresponding to each time when each digital pressure value is stored in the second memory M2A based on the information stored in the first memory M1.

This allows each crank angle calculated by the operations in FIGS. 20 and 22 to accurately represent each crank angle at which each digital pressure value is stored in the second memory M2A independently of the change of the engine speed (rotational speed of the rotation shaft RS).

The information composed of each of the digital pressure values and each of the calculated crank angles corresponding thereto permits the CPU 13 to accurately grasp which crank angles correspond to which digital pressure values.

In addition, when plotting the digital pressure values stored in the second memory M2A against the calculated crank angle as the horizontal axis, as shown by the waveform B in FIG. 23, the waveform B has no lack of data and data skip. This prevents, when using the digital pressure values stored in the second memory M2A for engine controls, the control state of the engine from suddenly changing.

As set forth above, the engine control unit 11A according to the second embodiment obtains the same effects as the first embodiment.

Further more, in the engine control unit 11A according to the second embodiment, it is possible to omit the multiplication clock signal generating function from the counter unit 25 so that the angular counter 26 is simply designed to count up in response to the leading edges in the rotation signal NE. This makes it possible to simply the structure and the operations of the engine control unit according to the second embodiment, as compared with the first embodiment.

Third Embodiment

An engine control unit 11B according to a third embodiment of the present invention will be described hereinafter.

The engine control unit 11B according to the third embodiment has different points as compared with the engine control unit 11A according to the second embodiment as follows.

As the first different point, the process executed each time the timing signal is outputted from the timing generator 17 does not include the operation in step S315.

In a second memory M2B, each time the timing signal is outputted from the timing generator 17 during each target process interval corresponding to 160° (CA) between the BTDC 80° (CA) and the ATDC 80° (CA) of each of the cylinders #1 to #4, the digital pressure values of each cylinder are sequentially stored. In the second memory M2B, similar to the second embodiment, a free-run timer value storage area is prepared for storing the free-run timer values to be associated with the corresponding digital pressure values, respectively.

Figure 24:
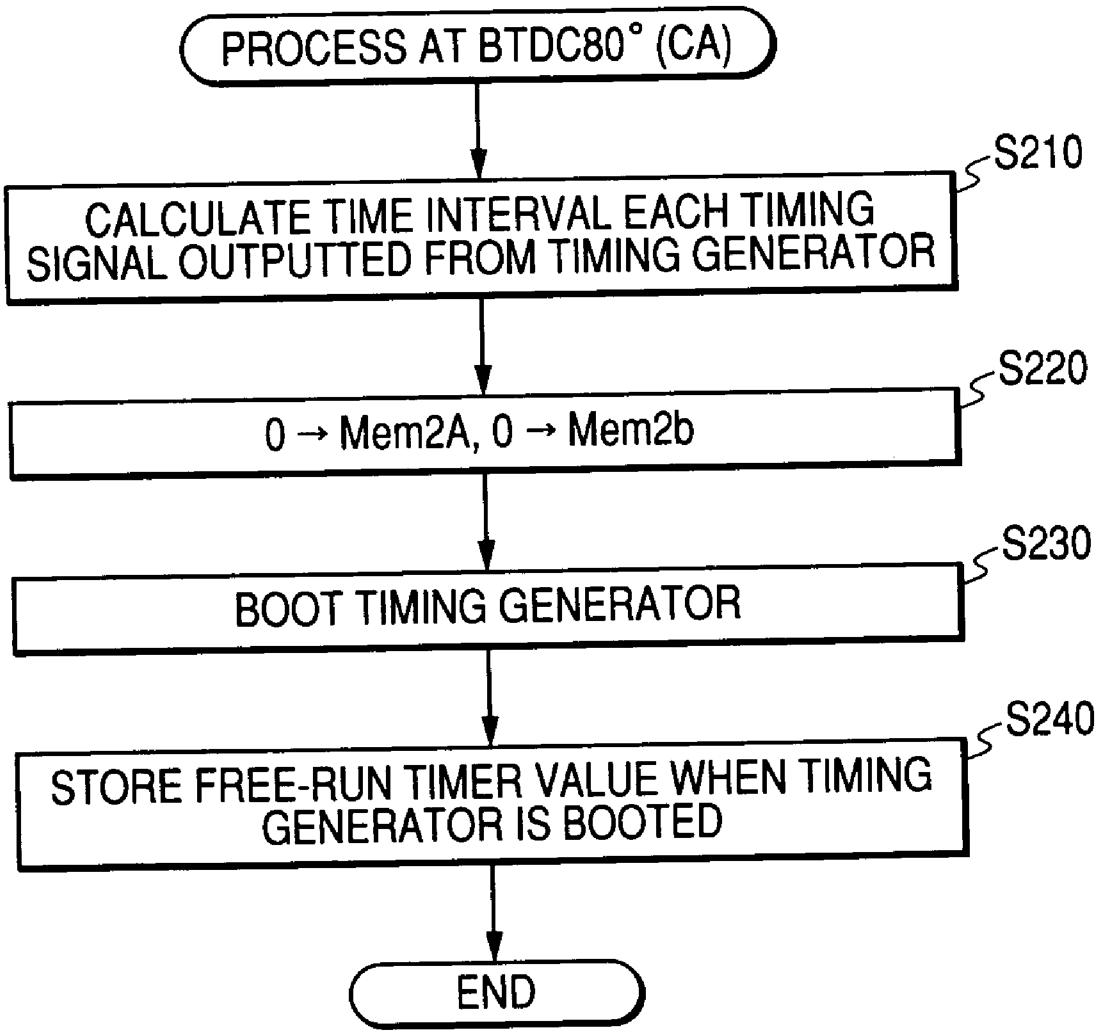
FIG. 24 is a flowchart schematically illustrating an example of a process executed by the CPU according to a third embodiment of the present invention.

As the second different point, in response to the detection of the timing "BTDC 80° (CA)" of any one of the cylinders #1 to #4, the CPU 13 performs the process shown in FIG. 24 in place of that shown in FIG. 9.

The steps S210 to S230 in FIG. 24 are substantially identical with those in FIG. 9, and therefore, the descriptions of which are omitted.

Specifically, in subsequent step S240, the CPU 13 stores the free-run timer value at which the timing generator 17 is booted in a start time memory Mst prepared in, for example, the RAM 14 (see FIG. 25). The free-run timer value stored in the start time memory Mst represents a time when the timing signal is outputted first from the timing generator 17.

Figure 26:
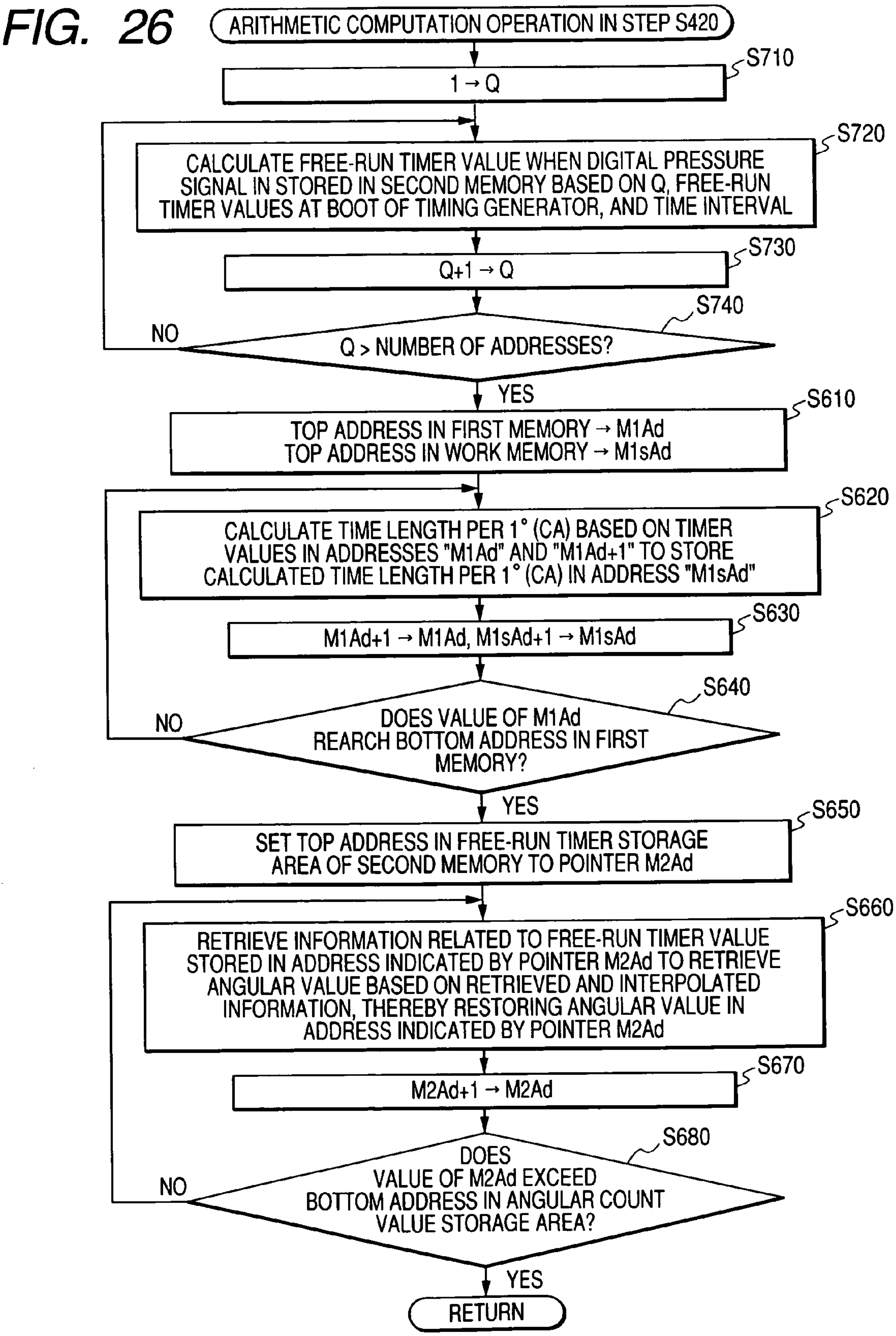
FIG. 26 is a flowchart schematically illustrating an example of a process executed by the CPU according to the third embodiment of the present invention.

As the third different point, in the third embodiment, the CPU 13 executes the arithmetic computations in step S420, which are shown, as an example, in FIG. 26 in place of FIG. 13.

Specifically, in step S710, the CPU 13 initializes a variable Q to 1.

In step S720, the CPU 13 reads out the free-run timer value FTst at which the timing generator 17 is booted from the start time memory Mst, and the time interval To established in step S210 to calculate the free-run timer value FTq at which the timing generator 17 outputs the Q-th timing signal within the current target process interval. The free-run timer value FTq represents the timing when the Q-th digital pressure value is stored in the second memory M2B in accordance with the equation [5]. The CPU 13 stores the calculated FTq in the Q-th address from the top address in the free-run timer storage area AR1A.

$$FTq=FTst+To\times(Q-1) \quad [5]$$

In step S730, the CPU 13 increments the variable Q by 1, and in step S740, the CPU 13 determines whether the variable Q exceeds the number of addresses in the free-run timer storage area ARIA.

When the variable Q does not exceed the number of addresses in the free-run timer storage area AR1A (the determination in step S740 is NO), the CPU 13 returns to step S720. When the variable Q exceeds the number of addresses in the free-run timer storage area ARIA (the determination in step S740 is YES), the CPU 13 determines that each of the free-run timer values corresponding to each of the timings when each of the digital pressure values is stored in the second memory M2, shifting step S610.

In FIG. 26, the operations in steps S610 to S680 are substantially identical with those in steps S610 to S680 shown in FIG. 20. That is, in the third embodiment, the CPU 13 executes steps S710 to S740 before the step S610 in FIG. 20.

In the third embodiment, therefore, each of the free-run timer values calculated in steps S710 to S740 is converted into each of the crank angels representing each timing when each of the digital pressure values is stored (see steps S610 to S680 in FIG. 26). Each of the crank angles is restored in the free-run timer value storage area ARIA of the second memory M2B.

As shown in FIG. 25 for example, the free-run timer value FTs stored in the start time memory Mst is set to 26666, and the time interval To between each timing signal is set to 166.67 [μs], the free-run timer value representing the timing when the 105-th digital pressure values are stored in the second memory M2B is calculated in accordance with the equation [5]:

$$26666+166.667\times(105-1)=43999. \quad [5]$$

The free-run timer value 43999 is converted into the target free-nun timer value FTt based on the equation [4] so as to be further converted into the crank angle of 206.66° (CA). The free-run timer value at which the 115-th digital pressure value is stored in the second memory M2 is calculated in accordance with the equation [5]:

$$26666+166.667\times(115-1)=45666 \quad [5]$$

The free-run timer value 45666 is converted into the target free-run timer value FTt based on the equation [4] so as to be further converted into the crank angle of 216.675° (CA).

As described above, in the third embodiment, as compared with the second embodiment, each of the free-run timer values representing each of the timings when each of the digital pressure values is stored in the second memory M2B within the target process interval is not stored in the second memory M2B, but calculated based on the free-run timer value FTst at which the timing signal is outputted first and the time interval To between each of the timing signals.

It is possible to obtain the same effects as the engine control unit 11 according to the second embodiment without storing the free-run timer values in the second memory M2B within the target process interval.

Incidentally, in the third embodiment, the operation of the CPU 13 in step S320 of FIG. 19 and the second memory M2B, for example, correspond to a second storage unlit of the present invention. Moreover, the start time memory Mst, for example, corresponds to a start time storing unit of the present invention, and the operations of the CPU 13 in steps S710 to S740 of FIG. 26, for example, correspond to a time calculating unit of the present invention. The operations of the CPU 13 in steps S610 to S580 of FIG. 26, for example, correspond to a rotating angle calculating unit of the present invention.

On the other hand, in the third embodiment, before performing the steps S610 to S680, the CPU 13 calculates all of the free-run timer values at which the digital pressure values are stored in the second memory M28. However, the CPU 13 can calculate individually the free-run timer values each time the CPU 13 calculates the crank angle at which each digital pressure value is sampled in the second memory M2B.

Specifically, the free-run timer values are not really stored in the free-run timer value storage area AR1A, but the crank angles calculated in step S660 shown in FIG. 26 at which the digital pressure values are sampled in the second memory M2B are sequentially stored in a predetermined storage area of the second memory M2B. The storage area is referred to as "crank angle storage area AR3" (see FIG. 25).

That is, in this modification, the CPU 13 skips the steps S710 to S740 to execute steps S610 to S640 described above.

In step S650, the CPU 13 sets the top address in the crank angle storage area AR3 of the second memory M2B to a pointer M2Ad.

In next step S660, assuming that the address "M2Ad" indicates the Q-th address in the crank angle storage area AR3 from its top address, the CPU 13 calculates the free-run timer value at which the digital pressure value stored in the Q-th address in the digital pressure value storage area AR2 of the second memory M2B based on the equation [5]. Furthermore, the CPU 13 regards the calculated free-run timer value as the target free-run timer value FTt to execute the operations in steps S660A to S660D, thereby calculating the crank angle at which the Q-th digital pressure value is stored in the digital pressure value storage area AR2 of the second memory M2B. Subsequently, the CPU 13 stores the calculated crank angle in the address "M2Ad" in the crank angle storage area AR3 of the second memory M2B. In these operations, to the variable Q in the equation [5], the order of the address "M2Ad" in the crank angle storage area AR3 from its top address (the first order address).

The modification set forth above allows the engine control unit 11B not to store all of the free-run timer values corresponding all of the digital pressure values in the second memory M28, making it possible to save space on the second memory M2B.

Fourth Embodiment

An engine control unit 11C according to a fourth embodiment of the present invention will be described hereinafter.

The engine control unit 11C according to the fourth embodiment has a different point as compared with the engine control unit 11A according to the second embodiment as follows.

Figure 27:
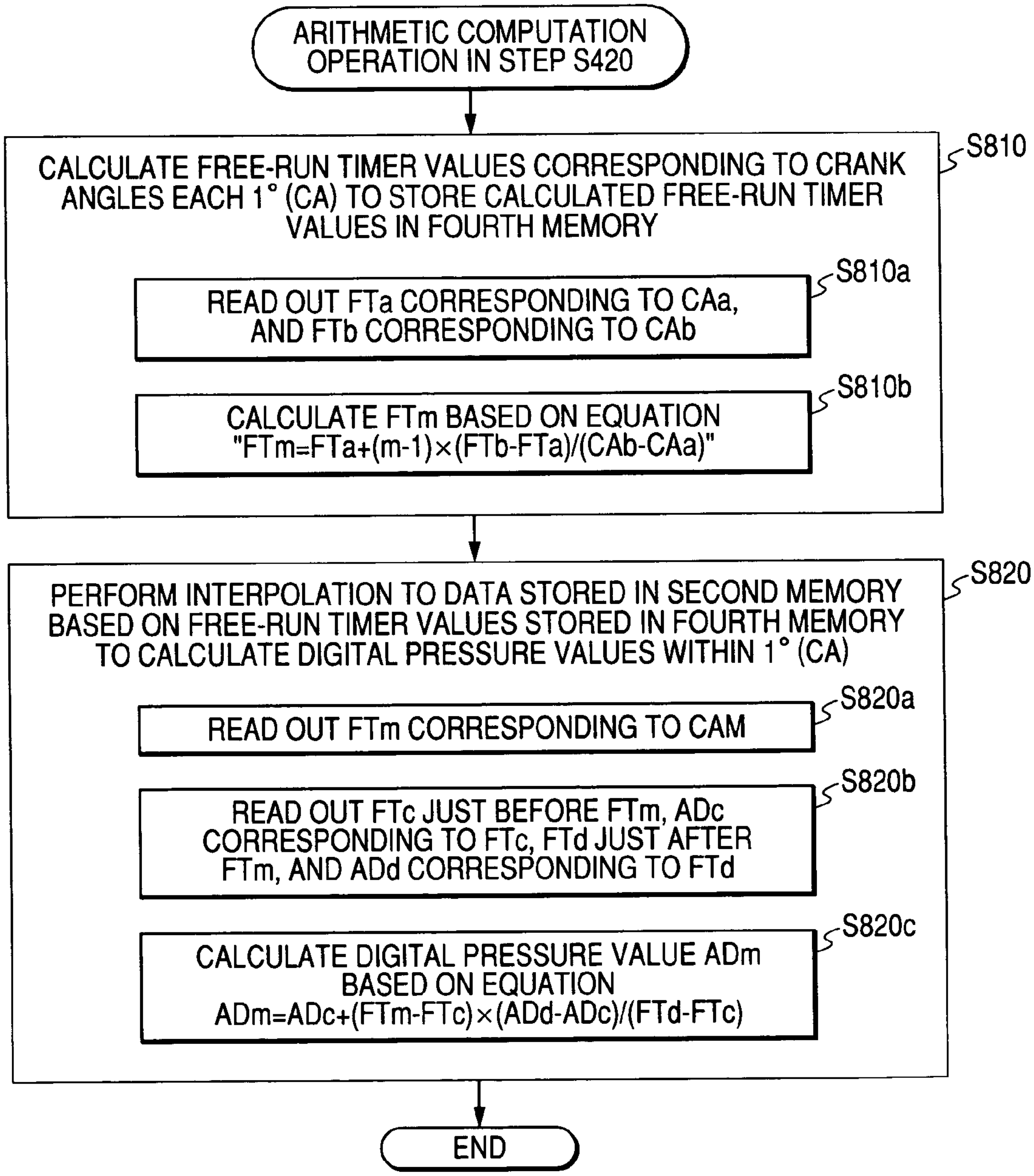
FIG. 27 is a flowchart schematically illustrating an example of a process executed by the CPU according to a fourth embodiment of the present invention.

Specifically, the CPU 13 executes, for example, the following process shown in FIG. 27 in place of the process of the operations in steps S610 to S680 shown in FIG. 20.

First, as shown in FIG. 28, a fourth memory M4 is prepared in, for example, the RAM 14. The fourth memory M4 is designed to store the crank angles each 1° (CA) within a current target process interval and the digital pressure values sampled at the crank angles each 1° (CA) to be associated with each other. Incidentally, in this specification, preparation of memories means to reserve storage areas for the memories. In a case where addresses from the top address in the fourth memory M4 can correspond to the crank angles each 1 (CA), it is unnecessary to store in the fourth memory M4 the crank angles each 1° (CA).

That is, in step S810, the CPU 13 calculates the free-run timer values corresponding to the crank angles each 1° (CA) within the current target process interval based on each of the free-run timer values stored in the first memory M1 to store the calculated free-run timer values in the fourth memory M4 so that they are associated with the crank angles each 1° (CA).

Specific operations for calculating one of the free-run timer values, referred to as "FTm", based on the corresponding one of the crank angles per 1° (CA), referred to as "CAm" will be described hereinafter.

Assuming that the NE timing crank angle just before the crank angle CAm is referred to as "CAa", and the NE timing crank angle just after the crank angle CAm is referred to as "CAb", the CPU 13 reads out the free-run timer value FTa corresponding to the crank angle CAa and the free-run timer value FTb corresponding to the crank angle CAb from the first memory M1, respectively, in step S810*a*.

In next step S810*b*, assuming that the crank angle CAm is m-th crank angle when counting from the crank angle CAa being regarded as first order, the CPU 13 calculates the free-run timer value FTm based on the following equation [6]:

$$FTm=FTa+(m-1)\times(FTb-FTa)/(CAb-CAa) \quad [6]$$

For example, as shown in FIG. 28, to calculate the free-run timer values corresponding to the crank angles each 1° (CA) within the target process interval ranging between 200° (CA) and 210° (CA), where CAa=200, CAb=210, FTa=43333, FTb=44333 in the equation [6], the free-run, timer values are values ranging from 43333 to 44333 with increasing in steps of 100 μs.

Similarly, for computing the free-run timer values corresponding to the crank angles each 1° (CA) within the target process interval ranging between 210° (CA) and 220° (CA), where CAa=210, CAb=220, FTa=44333, FTb=46333 in the equation [6], the free-run timer values are values ranging from 44333 to 46333 with increasing in steps of 200 μs.

Subsequently, in step S820, the CPU 13 performs interpolation with respect to data stored in the second memory M2A based on the free-run timer values stored in the fourth memory M4 to calculate digital pressure values of the combustion pressure signal corresponding to the crank angles each 1° (CA) within the current target process interval. The CPU 13 stores the calculated the digital pressure values in the fourth memory M4 to be associated with the corresponding crank angles each 1° (CA).

Specifically, for calculating a digital pressure value ADm corresponding to the crank angle CAm, the CPU 13 reads out the free-run timer value FTm corresponding to the crank angle CAm from the fourth memory M4 in step S820*a*. Next, the CPU 13 reads out the free-run timer value FTc just before the free-run timer FTm, the digital pressure value ADc corresponding to the free-run timer value FTc, the free-run timer value FTd just after the free-run timer FTm, and the digital pressure value ADd corresponding to the free-run timer value FTd from the second memory M2A in step S820*b*.

The CPU 13 calculates the digital pressure value ADm based on the following equation [7] in step 820*c:*

$$ADm=ADc+(FTm-FTc)\times(ADd-ADc)/(FTd-FTc) \quad [7]$$

For example, as shown in FIG. 28, when the CAm equals to 207° (CA), where FTm=44033, FTc=43999, ADc=1036, FTd=44166, ADd=1039 in the equation [7], the digital pressure value ADm is calculated based on the equation [7]:

$$\begin{aligned} ADm &= 1036 + (44033-43999)\times(1039-1036)/(44166-43999) \\ &= 1036.6 \end{aligned}$$

Which is shown in the characters [*1] in FIG. 28.

Similarly, as shown in FIG. 28, when the CAm equals to 217° (CA), where FTm=45733, FTc=45666, ADc=1082, FTd=45833, ADd=1087 in the equation [7], the digital pressure-value ADm is calculated based on the equation [7]:

$$ADm = 1082 + (45733 - 45666) \times (1087 - 1082) / (45833 - 45666) = 1084.0$$

Which is shown in the characters [*2] in FIG. 28).

Figure 29:
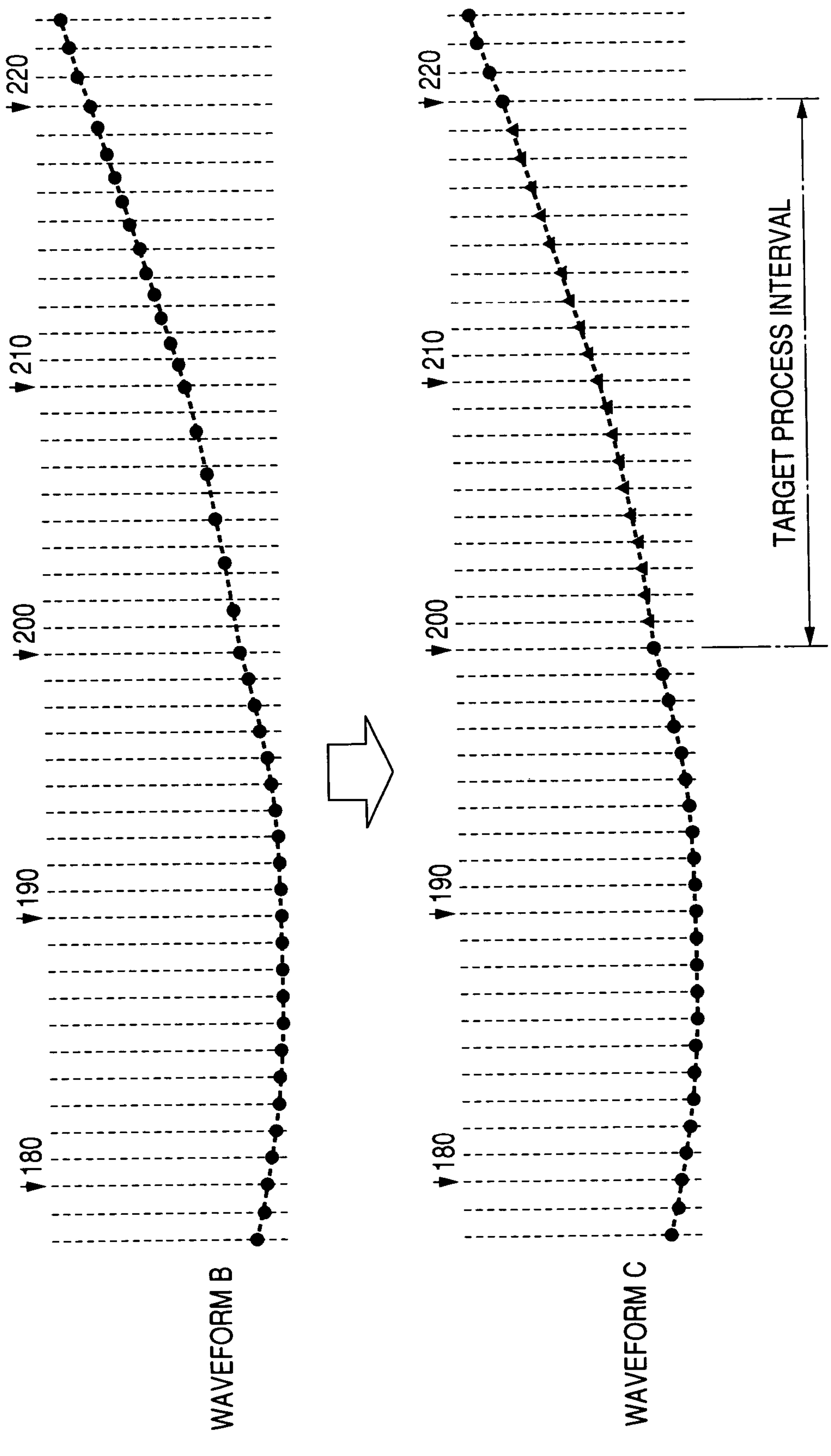
FIG. 29 is a time chart schematically illustrating operations of the engine unit according to the fourth embodiment.

As described above, in the engine control unit 11*c* according to the fourth embodiment, the digital pressure values sequentially stored in the second memory M2A are interpolated within a predetermined target process interval, for example, between 200° (CA) and 220° (CA), so that the digital pressure values with intervals of 1° (CA) are calculated (see waveform C in FIG. 29). Incidentally, waveform B which is the same waveform illustrated in FIG. 23 is illustrated to compare the waveform C therewith.

The digital pressure values of the combustion pressure signal with intervals of 1° (CA), which is shorter than the angle interval of the leading edges in the rotation signal NE, are therefore accurately obtained, making it possible to improve the accuracy of the engine control requiring such a high resolution of the digital pressure values of the combustion pressure signal with intervals of 1° (CA).

In the fourth embodiment, the CPU 13 calculates all of the free-run timer values each 1° (CA) within the target process interval to store them in the fourth memory M4, but the CPU 13 can calculate individually the free-run timer values each time the CPU 13 calculates each of the digital values with intervals of 1° (CA) based on the equation [7]. Specifically, in the steps S810 and S820, the CPU 13 can sequentially perform calculations based on the equations [6] and [7] to obtain each digital value corresponding to each crank angle of 1° (CA), which makes it possible to save space on the fourth memory M4.

In the fourth embodiment, the CPU 13 can perform the process shown in FIG. 27 in addition to the process of the operations in steps S610 to S680 shown in FIG. 20.

In the fourth embodiment, the CPU 13 calculates the digital pressure values with the intervals of 1° (CA), but the CPU 13 can calculate them with other constant intervals of, for example, 0.5° (CA) or 0.2° (CA).

Incidentally, in the fourth embodiment, the operation of the CPU 13 in step S320 of FIG. 19 and the second memory M2A, for example, correspond to a second storage unit of the present invention, and the operations of the CPU 13 in steps S810 and S820 of FIG. 27, for example, correspond to a calculating unit of the present invention.

On the other hand, as a first modification of the present invention, in the engine control unit 11B according to the third embodiment, when the operations in steps S710 to S740 shown in FIG. 26 are completed, in other words, all of the free-run timer values corresponding to the digital pressure values stored in the second memory M2A are calculated to be stored in the free-run timer value storage area AR1A, the CPU 13 can perform the operations in steps S810 and S320. After these operations, the CPU 13 can perform the operations in steps S610 to S680 shown in FIG. 26. In this first modification, the CPU 13 can calculate the digital pressure values with intervals of 1° (CA) without executing the operations in steps S610 to S680.

In the first modification of the fourth embodiment, the operation of the CPU 13 in step S320 of FIG. 19 and the second memory M2B, for example, correspond to a second storage unit of the present invention, and the operations of the CPU 13 in steps S810 and S820 of FIG. 27, for example, correspond to a calculating unit of the present invention.

Incidentally, as a second modification of the invention, in the engine control unit 11 according to the first embodiment, the CPU 13 can calculate the digital pressure values with intervals of, for example, 1° (CA) based on the information stored in the first memory M1, and the angular count values and the digital pressure values stored in the second memory M2.

For example, the CPU 13 performs interpolation with respect to the information stored in the second memory M2 whose angular count values are corrected based on the operations in steps S510 to S540 to calculate the digital pressure values with intervals of 1° (CA). The second memory M2 whose angular count values are corrected based on the operations in steps 5510 to S540 is referred to as "corrected second memory M2" hereinafter.

Specifically, for calculating a digital pressure value ADm corresponding to the crank angle CAm of 1° (CA), the CPU 13 reads out the angular count value CT1 just before the crank angle CAm, the digital pressure value AD1 corresponding to the angular count value CT1, the angular count value CT2 just after the crank angle CAm, and the digital pressure value AD2 corresponding to the angular count value CT2 from the corrected second memory M2, which is similar in step S820*b*. The CPU 13 calculates the digital pressure value ADm using the readout data of CT1, CT2, AD1, and AT2 based on the following equation [8]:

$$ADm = AD1 + (CAm - CT1) \times (AD2 - AD1) / (CT2 - CT1) \quad [8]$$

For example, in the corrected memory M2 shown in FIG. 15, though the illustration of digital pressure values is omitted, it is assumed that the digital pressure value corresponding to the 206.67° (CA) after correction is 1036, and the digital pressure value corresponding to the 208.33° (CA) after correction is 1039. In this assumption, when the CAm equals to 207° (CA), where CT1=206.67, AD1=1036, CT2=208.33, AD2=1039 in the equation [8], the digital pressure value ADm is calculated based on the equation [8]:

$$ADm = 1036 + (207 - 206.67) \times (1039 - 1036) / (208.33 - 206.67) = 1036.6$$

In the second modification of the fourth embodiment, the operation of the CPU 13 in step S320 of FIG. 19 and the second memory M2, for example, correspond to a second storage unit of the present invention, and the operations of the CPU 13 in steps S510 to S540 with the use of the equation [8], for example, correspond to a calculating unit of the present invention.

Incidentally, in each embodiment and each modification of the present invention, the A/D converter 19 can convert the various analog signals sequentially outputted from the MPX 31 in addition to the combustion signals, in other words, the A/D converter 19 also can serve as analog-to-digital conversion of each of the various signals. In this case, the CPU 13 can select any one of two different ways A and B to use the A/D converter 19 as follows.

Figure 30A:
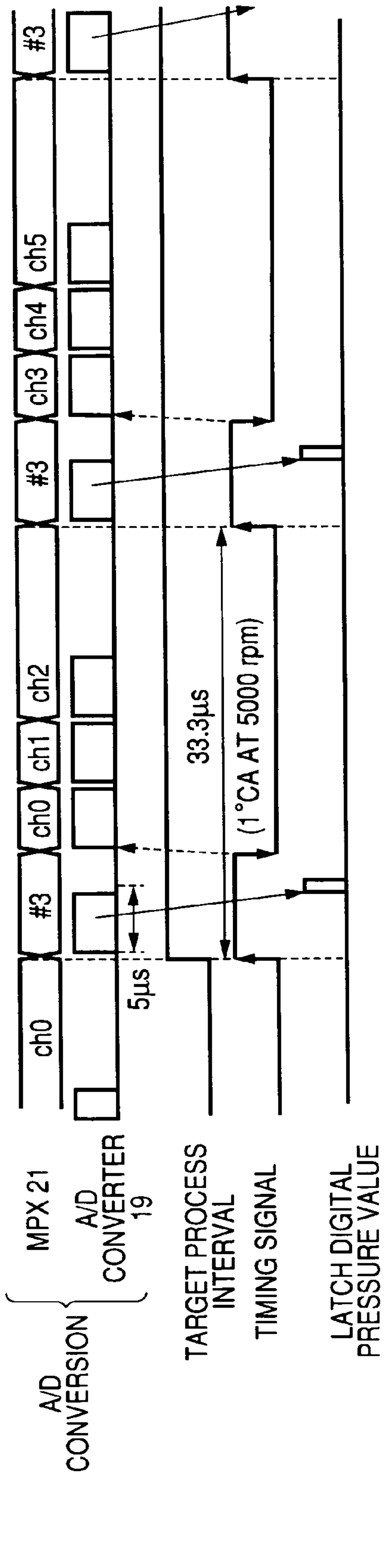
FIG. 30A is a time chart schematically illustrating an example of operation timings of the A/D converter according to the first to fourth embodiments and their modifications.

As the first way "A", the CPU 13 causes the A/D converter 19 to convert the combustion pressure signal of any one cylinder, which is cylinder #3 in FIG. 30A, corresponding to the target process interval, that is, whose crank angle is within the range between the BTDC 80° (CA) and the ATDC 80° (CA) into the digital pressure values each time the timing signal is generated. When the A/D conversion is completed, the CPU 13 reads out the digital pressure values, and causes the A/D converter 19 to convert one of the various signals selected by the MPX 31 into digital data until the next timing signal rises in the rotation signal NE.

Specifically, in an example shown in FIG. 30A, the high level period of the timing signal is set to 8.3 μs, and low level period to 25 μs. The the A/D converter 19 converts the combustion pressure signal of any one cylinder into the digital pressure values each time the timing signal is generated, and converts one of the various signals selected by the MPX 31 into digital during the low level period between the falling timing of the timing signal and the rising timing of the next timing signal.

Figure 30B:
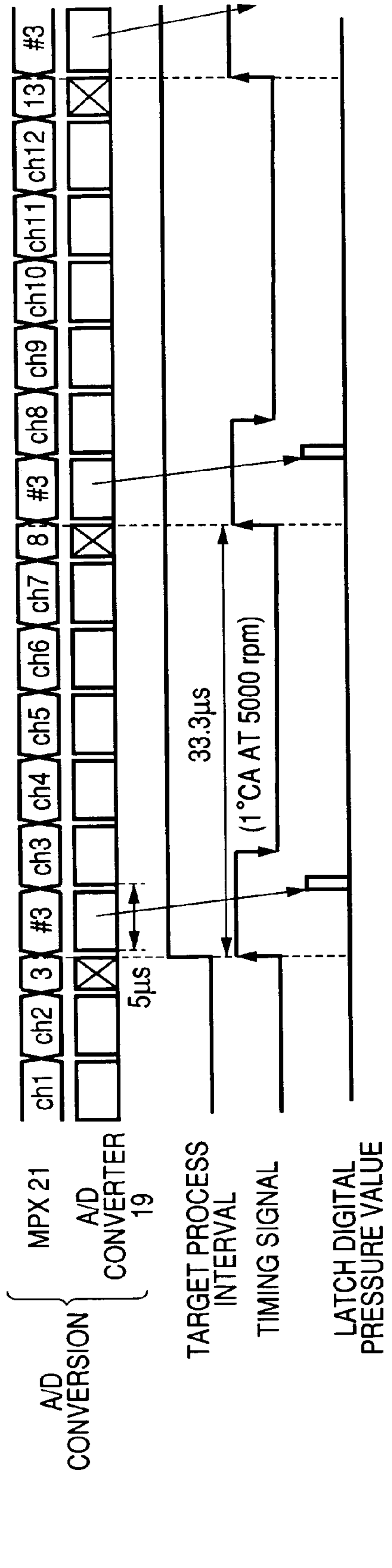
FIG. 30B is a time chart schematically illustrating another example of operation timings of the A/D converter according to the first to fourth embodiments and their modifications.

Incidentally, in FIGS. 30A and 30B, reference characters ch0, ch1, ch2, ch3, ch4, . . . show periods during which the various signals except for the combustion signal are selected to be converted into digital data. In this example, when a conversion time required to convert each various signal into the digital data is, for example, 5 μs, it is possible to perform the A/D converting operations up to five times during the low level period. In this example, the engine speed is set to 5000 rpm, that is, the time period required for the rotation of the crank shaft CS at 1° (CA) is 33.3 μs. If the engine speed is set to 1000 rpm, the time period required for the rotation of the crank shaft CS at 1° (CA) is 166.6 μs, which is five times 33.3 μs. This allows the low lever period of each timing signal to increase, making it possible to increase the number of A/D conversions to the various signals during each low level period.

As the second way "B", the CPU 13 causes the A/D converter 19 to convert one of the various signals selected by the MPX 31 into digital data every period shorter than the output period of the timing signal. When the timing signal rises, the CPU 13 causes the A/D converter 19 to interrupt the A/D conversions to one of the various signals selected by the MPX 31 and to convert the combustion pressure signal of any one cylinder, which is cylinder #3 in FIG. 30B, corresponding to the target process interval. When the A/D conversion is completed, the CPU 13 causes the A/D converter 19 to reexecute the A/D conversions to the signal being interrupted. Incidentally, when the A/D conversion rate of the A/D converter 19 is fast, and/or the late of the A/D conversion of the combustion signal is allowable, the CPU 13 can cause the A/D converter 19 to convert the combustion pressure signal of any one cylinder after the A/D conversion of one of the various signals is completed without interrupting the A/D conversion of one of the various signals.

Fifth Embodiment

An engine control unit 11D according to a fifth embodiment of the present invention will be described hereinafter.

The engine control unit 11D according to the fifth embodiment has different points as compared with each of the engine control units 11A and 11D according to the second and fourth embodiments as follows.

Figure 31:
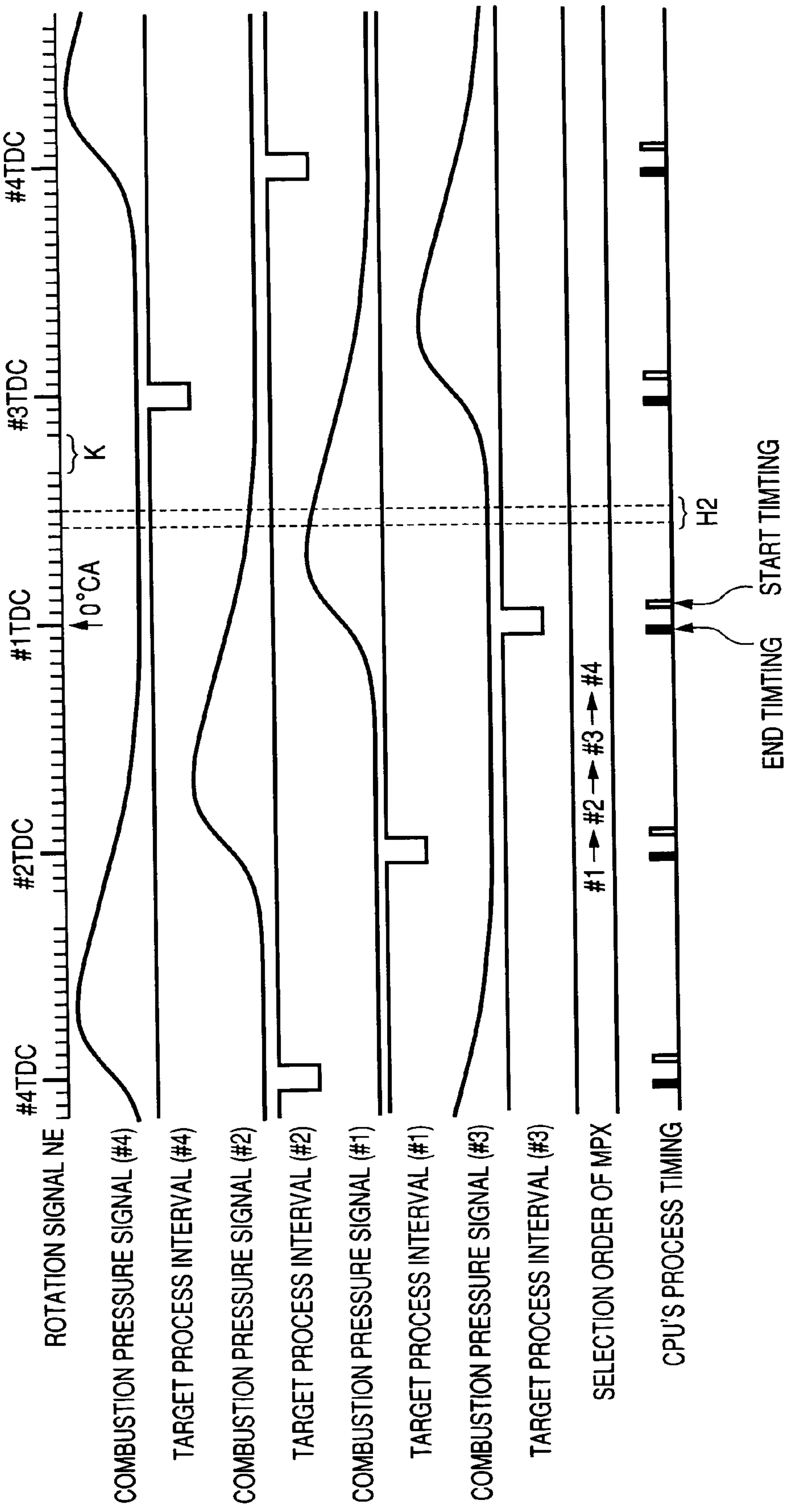
FIG. 31 is a time chart schematically illustrating an example of operation timings of the CPU with a combustion pressure signal of each cylinder according to a fifth embodiment of the present invention.

In the fifth embodiment, as shown in FIG. 31, the target process intervals of the cylinders #1 to #4 during each of which the combustion pressure signal is detected are established so that they are partially overlapped.

Specifically, each period ranging from the BTDC 170° (CA) to 700° (CA) of each of the cylinders #1 to #4 is set to a target process interval of each of the cylinders #1 to #4; the timing generator 17 therefor constantly operates.

Figures 32A, 32B:
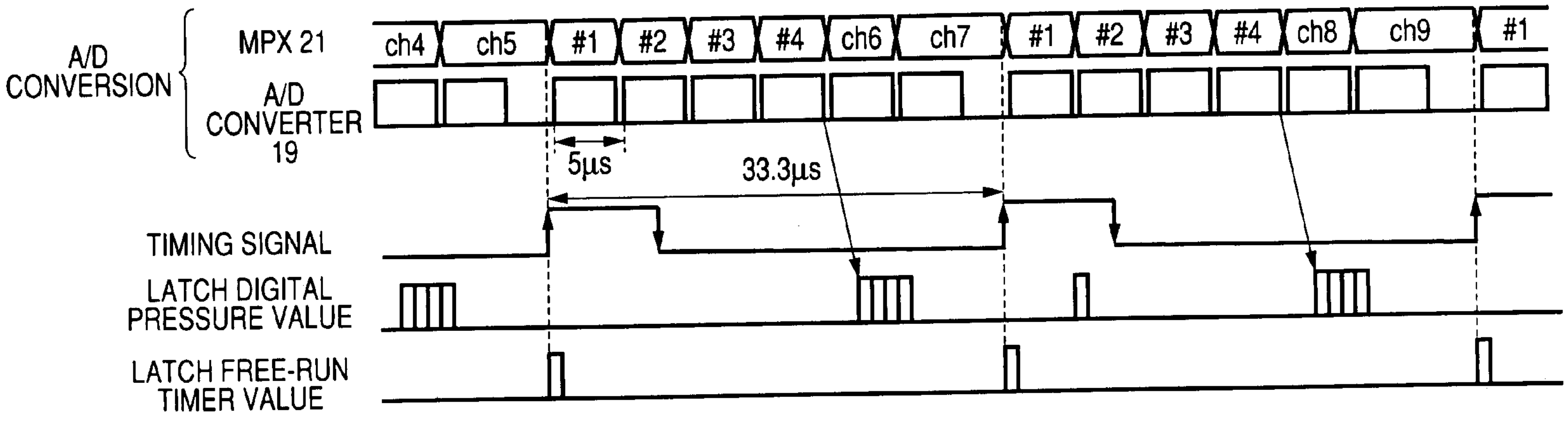
FIG. 32A is a time chart schematically illustrating an example of operation timings of the CPU and that of operation timings of the A/D converter according to the fifth embodiment.
FIG. 32B is an explanation view schematically explaining the process executed by the CPU according to the fifth embodiment.
Figure 33:
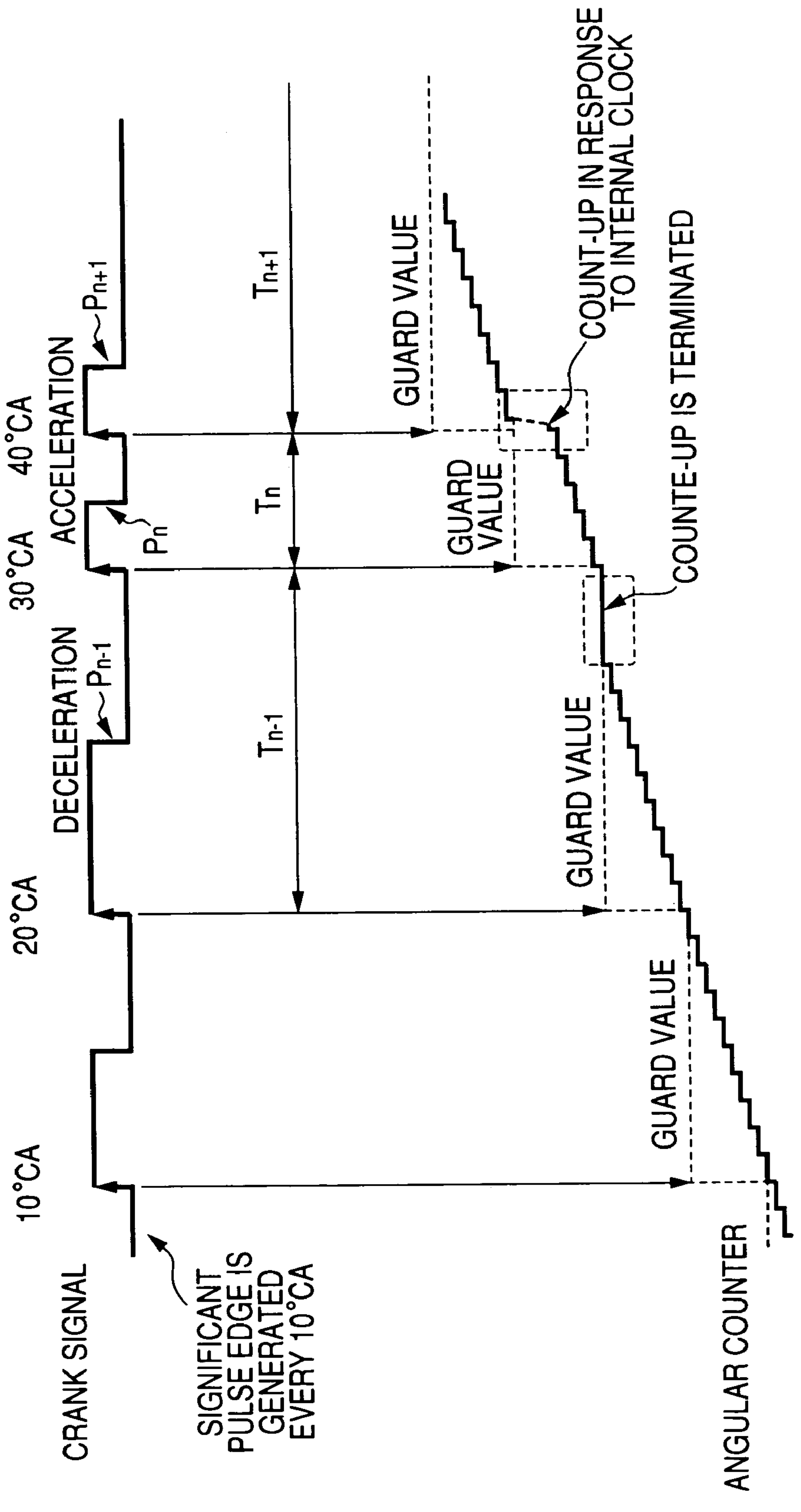
FIG. 33 (RELATED ART)
FIG. 33 is a view illustrating operations of an engine control unit with the use of a crank counter.
Figure 34:
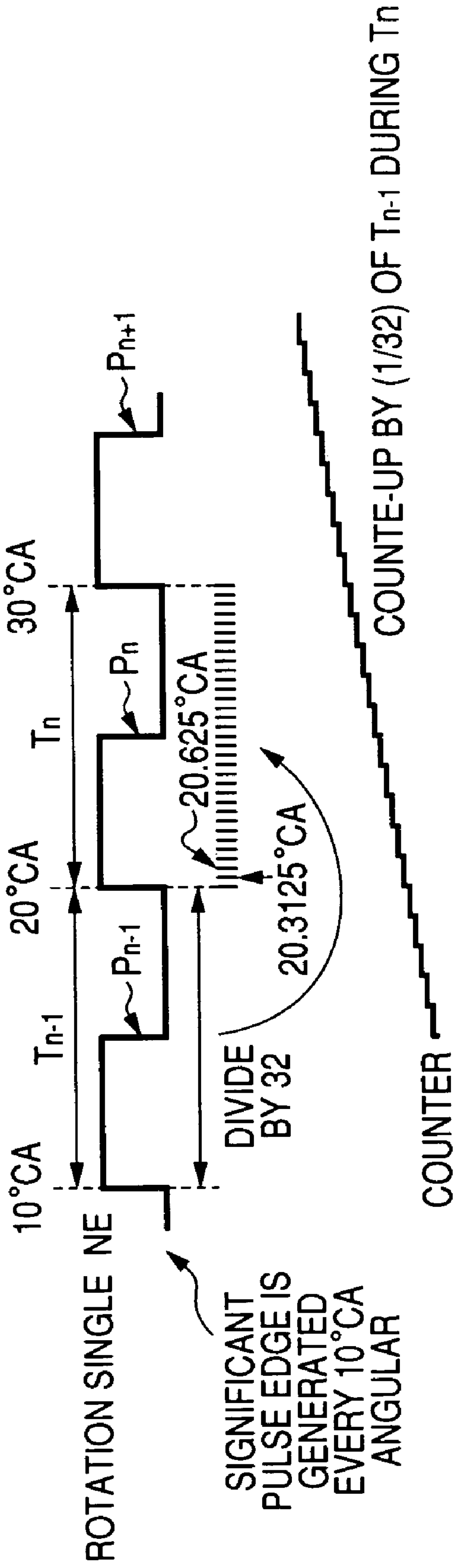
FIG. 34 (RELATED ART)
FIG. 34 is a view illustrating the operations of the engine control unit with the use of the crank counter shown in FIG. 33.

In the fifth embodiment, as shown in FIG. 32A, each time the timing signal is outputted from the timing generator 17, in other words, the timing signal rises, the MPX 21 sequentially selects one of the combustion pressure signals of the cylinders #1 to #4 in the order of #1, #2, #3, and #4 so that the A/D converter 19 converts selected signal into the digital process values in the order.

Moreover, in the fifth embodiment, the second memory M2 is provided for each of the cylinders #1 to #4.

In addition, in the fifth embodiment, the CPUL 13 executes the operations in step S200 to initialize the pointer Mem2A and the pointer Mem2*b* for each of the second memories M2 at a start timing of the target process interval of each of the cylinders #1 to #4. Subsequently, the CPU 13 executes the operations shown in FIG. 19 to read out the digital pressure values of the pressure combustion signal of each of the cylinders #1 to #4. The CPU 13 stores each digital pressure value of each cylinder and each free-run timer value when each timing signal is outputted in each second memory M2 to be associated with each other.

Regarding the second memories M2 for cylinders #1 to #4 as one second memory M2D, in the second memory M2D, as shown in FIG. 32B, each free-run timer value corresponding to each output timing of the timing signal is sampled to be stored in the integrated second memory M. In addition, each of the digital pressure values converted by the A/D converter 19 from the combustion signal of each of the cylinders #1 to #4 is sequentially sampled to be stored in the second memory M2D so that the free-run timer values and the digital pressure values are associated with each other in the substantially identical sampled timings.

In FIG. 32A, as with the first way "A" of the fourth embodiment, the CPU 13 causes the A/D converter 19 to convert the combustion pressure signal of each cylinder, and to convert one of the various signals selected by the MPX 31 into digital data until the next timing signal rises in the rotation signal NE. As shown in FIG. 1, in a case where the A/D converter 33 is provided for A/D conversion of the various signals, it is unnecessary for the A/D converter 19 to convert the various signals into digital data during the period from which a series of the combustion signals #1 to #4 are completely converted into the digital pressure signals to the rising timing of the next timing signal. FIG. 32B represents the state of the second memory M2D when the crank angle is in the state shown in reference character "H2" in FIG. 31.

In the fifth embodiment, the CPU 13 executes the operations in steps S420 (steps 610 to S680 and/or steps S810 and S820) and S430 with respect to each of the second memory M2 at the end timing of the corresponding target process interval.

Especially, when executing the operations with respect to the n (an integer not less than 2)-th cylinder, it is assumed that the time length required for executing the A/D conversion of one combustion signal is Tad, such as 28 μs in FIGS. 32A and 32B, the free-run timer values stored in each second memory M2 are converted into corrected free-run timer values to which the time length Td is added based on the delay of Tad, which is represented as the following equation:

$$Td = Tad \times (n-1)$$

For example, in FIGS. 32A and 32B, when executing the operations with respect to the second cylinder, the free-run timer values stored in each second memory M2 are converted into corrected free-run timer values to which the 5 μs is added. When executing the operations with respect to the third cylinder, the free-run timer values stored in each second memory M2 are converted into corrected free-run timer values to which the 10 μs is added. When executing the operations with respect to the fourth cylinder, the free-run timer values stored in each second memory M2 are converted into corrected free-run timer values to which the 15 μs is added.

In the fifth embodiment, it is possible to sequentially select one of the combustion pressure signals of the cylinders #1 to #4 to convert the selected signal into the digital process values with keeping the accuracy of each of the digital process values. This is because the free-run timer accurately represents the A/D conversion timings of each of the cylinders #1 to #4.

In each of the first to fifth embodiments and modifications, the free-run timer values can be stored in the first memory M1 during only each target process interval.

Each of the memories M1 to M4, Mst, and the like can be configured to physically different memories, such as RAMs, or different storage areas of single memory.

The time information stored in the first memory M1 and that stored in the second memory M2 are not limited to the same free-run timer 15. Specifically, a plurality of timers which are synchronized with each other can be used as the free-run timer because the time information stored in the first memory M1 and that stored in the second memory M2 have a constant relationship with each other.

In the first to fifth embodiments and their modifications, as time information, the free-run timer values are used. This is because the free-run timer values can represent temporally distinct timings each representing each crank angle corresponding to each leading edge and allow the time interval therebetween to be calculated.

In the present invention, therefore, in place of the free-run timer values, time information representing temporally distinct timings each of which can represent each crank angle corresponding to each leading edge can be used. For example, in place of the free-run timer, other clocked digital device capable of counting temporally distinct timings can be used.

The AD converter 19 may serve as capturing analog signals, such as power source voltage and so on, which are generated in the engine control unit 11, to convert them into digital data.

In each of the first to fifth embodiments and their modifications, as each significant edge in the rotation signal NE, a falling edge therein or both of leading and falling edges can be used.

As the engine, a diesel engine or a gasoline engine can be applied.

Each of the combustion pressure signals outputted from the combustion pressure sensors P1 to P4 can be converted into the digital pressure values at the exterior of the engine control unit so that the engine control unit receives the digital pressure values through, for example, the communications circuit 41.

In addition, for example, in the first embodiment, in step S210 of FIG. 9, the CPU 13 establishes the time interval between each timing signal outputted from the timing generator 17 depending on the engine speed, in other words, the rotational speed of the crankshaft CS. The A/D converter 19 can perform the A/D conversion operations in response to a fixed constant time.

In addition, the A/D converter 19 can convert a combustion pressure signal into the digital pressure values in response to a fixed constant time, such as 10 μs, and the CPU 13 can thin the digital pressure values to execute the process shown in FIG. 13 based on the thinned digital pressure values.

Specifically, in step S530 of FIG. 13, the CPU 13 increments the pointer M2Ad by "y" that can be set to a value depending on the engine speed, that is, the rotational speed of the crank shaft CS. For example, the "y" is set to a value that decreases with the increase in engine speed and increases with the decrease in engine speed.

This data-thinning operation provides the following effects.

Specifically, when performing digital filtering, it is preferable that the sampling interval of the digital filtering, that is, the A/D conversion interval of the A/D) converter 13 is constant because, if the sampling interval is set to be variable, the filter coefficients would vary.

When the sampling interval becomes excessively short, however, the CPU load required to execute the process shown in FIG. 13 may increase.

Thinning the digital pressure values, therefore, allows the CPU load required to execute the process shown in FIG. 13 to decrease with the sampling interval kept constant.

This modification of the first embodiment can be applied to the remaining second to fifth embodiments and the already described modifications of the first to fifth embodiments.

In each of the first to fifth embodiments and their modifications, the CPU 13 collectively executes the processes shown in FIGS. 12–14 and the like at the end timing in the target process interval, but the present invention is not limited to the structure.

Specifically, in the present invention, the CPU 13 can execute the processes shown in FIGS. 12–14 and the like in a distributed manner in response to, for example, each significant edge in the rotation signal NE.

In each of the first to fifth embodiments and their modifications, the present invention is applied to an engine control unit and is configured to detect the crank angle of a crankshaft, but the present invention is not limited to the structure. That is, the present invention can be applied to another control unit for controlling a mechanism including a rotating shaft and a unit for detecting a rotation angle of a rotating shaft.

In each of the first to fifth embodiments and their modifications, as a sensor signal, a combustion pressure signal indicative of combustion pressure in a cylinder of the engine is used, but other sensor signals each indicative of physical quantity related to a target, such as an engine or the like can be applied to the present invention.

In each of the first to fifth embodiments and their modifications, the counter unit is designed to be incremented, but can be designed to be decremented.

In each of the first to fifth embodiments and their modifications, the counter unit, the timing generator, and the free-run timer can be installed in a microcomputer, or they can be independent electronic devices.

In addition, the combustion pressure signal processing apparatuses according to the first to fifth embodiment and their modifications can be implemented in at least one of various electronic devices as hardware or software.

Moreover, the processes executed by the CPU 13 can be implemented by hard-wired logic circuits.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for sampling a sensor signal indicative of physical quantity related to a target based on a pulse signal whose pulse appears each time a rotating shaft rotates at a predetermined angle, the apparatus comprising:

a timing signal outputting unit outputting a timing signal every time interval, the time interval being shorter than a pulse time interval of the pulse signal;

a first storage unit configured to store first information relative to the pulse time interval of the pulse signal;

a second storage unit configured to:

sample a value of the sensor signal each time the timing signal is outputted, and store the sampled values so that the sampled values are associated with pieces of second information, respectively, each of the pieces of second information being relative to each of sampled timings of the values; and a calculating unit configured to calculate a rotation angle of the rotation shaft corresponding to each of the values of the sensor signal based on a relationship between the first information and the pieces of second information.

2. A combustion pressure signal processing apparatus for sampling a combustion pressure signal indicative of combustion pressure in a cylinder of an engine using a pulse signal whose pulse appears each time a crankshaft rotates at a predetermined angle, the apparatus comprising:

a counter unit having a counter whose count value is indicative of each of the predetermined angles of the crankshaft, the counter unit being configured to calculate a first time interval that is a positive integer submultiple of a second pulse time interval of the pulse signal, and to cause the counter to count every calculated first pulse time interval;

a timing signal outputting unit outputting a timing signal every time interval, the time interval being shorter than each pulse time interval of the pulse signal;

a first storage unit configured to store time information relative to a time interval between each of the predetermined angles of the crankshaft;

a second storage unit configured to:

sample a value of the combustion pressure signal each time the timing signal is outputted, obtain the count values of the counter unit when the values of the combustion pressure signal are sampled by the sampling unit, and store the sampled values so that the sampled values are associated with the corresponding count values of the counter unit, respectively; and a correcting unit configured to correct each of the count values stored in the second storage unit based on the time information stored in the first storage unit.

3. A combustion pressure signal processing apparatus according to claim 2, wherein each of the predetermined angles of the crankshaft is represented as a train of bits, and the counter comprises:

a first counter indicative of a higher-order of the train of bits, the first counter counting up or down in synchronization with the second pulse time interval of the pulse signal; and a second counter indicative of a lower-order of the train of bits, the second counter counting up or down in synchronization with the calculated first pulse time interval and being cleared in synchronization with the second pulse time interval of the pulse signal.

4. A combustion pressure signal processing apparatus according to claim 2, wherein the time interval is set depending on a rotational speed of the crankshaft.

5. A combustion pressure signal processing apparatus according to claim 2, wherein the time interval s set in inverse proportion to a rotational speed of the crankshaft and is kept constant during which the second storage unit samples the value of the combustion pressure signal each time the timing signal is outputted.

6. A combustion pressure signal processing apparatus for sampling a combustion pressure signal indicative of combustion pressure in a cylinder of an engine using a pulse signal whose pulse appears each time a crankshaft rotates at a predetermined angle, the apparatus comprising:

a timing signal outputting unit outputting a timing signal every time interval, the time interval being shorter than each pulse time interval of the pulse signal;

a first storage unit configured to store first time information indicative of a temporally distinct tiring when each pulse appears in the pulse signal;

a second storage unit configured to:

sample a value of the combustion pressure signal each time the timing signal is outputted, and store the sampled values so that the sampled values are associated with pieces of second time information, respectively, each of the pieces of second time information being relative to a sampled timing of each of the sampled values; and a calculating unit configured to calculate a rotation angle of the crankshaft when each of the values of the combustion pressure signal is sampled by the second storage unit based on the first time information and the pieces of second information.

7. A combustion pressure signal processing apparatus according to claim 6, wherein the combustion pressure signal consists of plurality of analog pressure signals, the second storage unit comprises a converting unit that sequentially selects one of the analog pressure signals in a predetermined order and converts the value of selected one of the analog pressure signals each time the timing signal is outputted into the sampled value, and, when the converting unit selects an n-th analog pressure signal from the plurality of analog pressure signals and converts the value of the n-th analog pressure signal each time the timing signal is outputted into the sampled value, the calculating unit is configured to calculate a rotation angle of the crankshaft when each of the values of the n-th analog pressure signal is sampled by the second storage unit based on the first time information and the pieces of second time information corresponding to the n-th analog pressure signal, the n being a positive integer not less than 2, the pieces of second time information including additional time information of "$Tad \times (n-1)$", the Tad being a time length required to convert by the converting unit the value of selected one of the analog pressure signals each time the timing signal is outputted into the sampled value.

8. A combustion pressure signal processing apparatus according to claim 6, wherein the time interval is set depending on a rotational speed of the crankshaft.

9. A combustion pressure signal processing apparatus according to claim 6, wherein the time interval is set in inverse proportion to a rotational speed of the crankshaft and is kept constant during which the second storage unit samples the value of the combustion pressure signal each time the timing signal is outputted.

10. A combustion pressure signal processing apparatus for sampling a combustion pressure signal indicative of combustion pressure in a cylinder of an engine using a pulse signal whose pulse appears each time a crankshaft rotates at a predetermined angle, the apparatus comprising:

a timing signal output unit outputting a timing signal every time interval, the time interval being shorter than each pulse time interval of the pulse signal;

a first storage unit configured to store first time information indicative of a temporally distinct timing when each pulse appears in the pulse signal;

a second storage unit configured to:

sample a value of the combustion pressure signal each time the timing signal is outputted; and store the sampled values;

a start time storing unit configured to store second time information indicative of a temporally distinct timing when the timing signal is outputted first from the timing signal outputting unit;

a time calculating unit configured to calculate third time information indicative of a temporally distinct timing at which each of the timing signals is outputted from the timing signal outputting unit based on the time interval and the second time information; and a rotation angle calculating unit configured to calculate a rotation angle of the crankshaft based on the first time information and the calculated third time information.

11. A combustion pressure signal processing apparatus according to claim 10, wherein the combustion pressure signal consists of plurality of analog pressure signals, the second storage unit comprises a converting unit that sequentially selects one of the analog pressure signals in a predetermined order and converts the value of selected one of the analog pressure signals each time the timing signal is outputted into the sampled value, and, when the converting unit selects an n-th analog pressure signal from the plurality of analog pressure signals and converts the value of the n-th analog pressure signal each time the timing signal is outputted into the sampled value, the rotation angle calculating unit is configured to calculate the rotation angle of the crankshaft when each of the values of the n-th analog pressure signal is sampled by the second storage unit based on the first time information and the calculated third time information, the n being a positive integer not less than 2, the third time information including additional time information including an additional time value of "Tad×(n−1)", the Tad being a time length required to convert by the converting unit the value of selected one of the analog pressure signals each time the throng signal is outputted into the sampled value.

12. A combustion pressure signal processing apparatus for sampling a combustion pressure signal indicative of combustion pressure in a cylinder of an engine using a pulse signal whose pulse appears each time a crankshaft rotates at a first predetermined angle, the apparatus comprising:

a counter unit having a counter whose count value is indicative of each of the first predetermined angles of the crankshaft, the counter unit being configured to calculate a time interval that is a positive integer submultiple of a pulse time interval of the pulse signal, and to cause the counter to count every calculated pulse time interval;

a timing signal outputting unit outputting a timing signal every time interval, the time interval being shorter than each pulse time interval of the pulse signal;

a first storage unit configured to store time information relative to a time interval between each of the predetermined angles of the crankshaft;

a second storage unit configured to:

sample a value of the combustion pressure signal each time the timing signal is outputted, obtain the count values of the counter unit when the values of the combustion pressure signal are sampled by the sampling unit, and store the sampled values so that the sampled values are associated with the corresponding count values of the counter unit, respectively; and a calculating unit configured to calculate a value of the combustion pressure signal when the crankshaft rotates at a second predetermined angle based on the sampled values and the count values stored in the second storage unit, and the time information stored in the first storage unit, the second predetermined angle being smaller than the first predetermined angle.

13. A combustion pressure signal processing apparatus for sampling a combustion pressure signal indicative of combustion pressure in a cylinder of an engine using a pulse signal whose pulse appears each time a crankshaft rotates at a first predetermined angle, the apparatus comprising:

a timing signal outputting unit outputting a timing signal every time interval, the time interval being shorter than each pulse time interval of the pulse signal;

a first storage unit configured to store first time information indicative of a temporally distinct timing when each pulse appears in the pulse signal;

a second storage unit configured to:

sample a value of the combustion pressure signal each time the timing signal is outputted, and store the sampled values so that the sampled values are associated with pieces of second time information, respectively, each of the pieces of second time information being relative to a sampled timing of each of the sampled values; and a calculating unit configured to calculate a value of the combustion pressure signal when the crankshaft rotates at a second predetermined angle based on the sampled values and the pieces of second time information stored in the second storage unit, and the first time information stored in the first storage unit, the second predetermined angle being smaller than the first predetermined angle.

14. A combustion pressure signal processing apparatus according to claim 13, wherein the combustion pressure signal consists of plurality of analog pressure signals, the second storage unit comprises a converting unit that sequentially selects one of the analog pressure signals in a predetermined order and converts the value of selected one of the analog pressure signals each time the timing signal is outputted into the sampled value, and, when the converting unit selects an n-th analog pressure signal from the plurality of analog pressure signals and converts the value of the n-th analog pressure signal each time the timing signal is outputted into the sampled value, the calculating unit is configured to calculate the value of the n-th analog pressure signal based on the sampled values and the pieces of second time information corresponding to the n-th analog pressure signal, and the first time information, the n being a positive integer not less than 2, the pieces of second time information including additional time information of "Tad×(n−1)", the Tad being a time length required to convert by the converting unit the value of selected one of the analog pressure signals each time the tiring signal is outputted into the sampled value.

15. A combustion pressure signal processing apparatus for sampling a combustion pressure signal indicative of combustion pressure in a cylinder of an engine using a pulse signal whose pulse appears each time a crankshaft rotates at a first predetermined angles the apparatus comprising:

a timing signal output unit outputting a timing signal every time interval, the time interval being shorter than each pulse time interval of the pulse signal;

a first storage unit configured to store first time information indicative of a temporally distinct timing when each pulse appears in the pulse signal;

a second storage unit configured to:

sample a value of the combustion pressure signal each time the timing signal is outputted, and store the sampled values;

a start time storing unit configured to store second time information indicative of a temporally distinct timing when the timing signal is outputted first from the timing signal outputting unit;

a time calculating unit configured to calculate third tire information indicative of a temporally distinct timing at which each of the timing signals is outputted from the timing signal outputting unit based on the time interval and the second time information; and a calculating unit configured to calculate a value of the combustion pressure signal when the crankshaft rotates at a second predetermined angle based on the sampled values stored in the second storage unit, the third time information, and the first time information stored in the first storage unit, the second predetermined angle being smaller than the first predetermined angle.

16. A combustion pressure signal processing apparatus according to claim 15, wherein the combustion pressure signal consists of plurality of analog pressure signals, the second storage unit comprises a converting unit that sequentially selects one of the analog pressure signals in a predetermined order and converts the value of selected one of the analog pressure signals each time the timing signal is outputted into the sampled value, and, when the converting unit selects an n-th analog pressure signal from the plurality of analog pressure signals and converts the value of the n-th analog pressure signal each time the timing signal is outputted into the sampled value, the calculating unit is configured to calculate the value of the n-th analog pressure signal when the crankshaft rotates at the second predetermined angle based on the sampled values, the third time information, and the first time information, the third time information including additional time information of "Tad×(n−1)", the Tad being a time length required to convert by the converting unit the value of selected one of the analog pressure signals each time the timing signal is outputted into the sampled value.

17. A method of sampling a sensor signal indicative of physical quantity related to a target based on a pulse signal whose pulse appears each time a rotating shaft rotates at a predetermined angle, the method comprising:

outputting a timing signal every time interval, the time interval being shorter than a pulse time interval of the pulse signal;

first storing first information relative to the pulse time interval of the pulse signal;

sampling a value of the sensor signal each tune the timing signal is outputted;

secondary storing the sampled values so that the sampled values are associated with pieces of second information, respectively, each of the pieces of second information being relative to each of sampled timings of the values; and calculating a rotation angle of the rotation shaft corresponding to each of the values of the sensor signal based on a relationship between the first information and the pieces of second information.

* * * * *